United States Patent
Kishi

(10) Patent No.: US 12,460,319 B2
(45) Date of Patent: Nov. 4, 2025

(54) TISSUE SPATIAL OMICS

(71) Applicant: Digital Biology Inc., Watertown, MA (US)

(72) Inventor: Jocelyn Kishi, Watertown, MA (US)

(73) Assignee: Digital Biology Inc., Watertown, MA (US)

( * ) Notice: Subject to any disclaimer, the term of this patent is extended or adjusted under 35 U.S.C. 154(b) by 0 days.

(21) Appl. No.: 18/643,523

(22) Filed: Apr. 23, 2024

(65) Prior Publication Data

US 2024/0263169 A1    Aug. 8, 2024

Related U.S. Application Data

(63) Continuation of application No. PCT/US2023/064873, filed on Mar. 23, 2023.

(60) Provisional application No. 63/346,454, filed on May 27, 2022, provisional application No. 63/326,384, filed on Apr. 1, 2022, provisional application No. 63/323,290, filed on Mar. 24, 2022.

(51) Int. Cl.
| | |
|---|---|
| *C40B 50/06* | (2006.01) |
| *C12N 15/10* | (2006.01) |
| *C12Q 1/6806* | (2018.01) |
| *C12Q 1/6881* | (2018.01) |

(52) U.S. Cl.
CPC .......... *C40B 50/06* (2013.01); *C12N 15/1065* (2013.01); *C12N 15/1096* (2013.01); *C12Q 1/6806* (2013.01); *C12Q 1/6881* (2013.01)

(58) Field of Classification Search
None
See application file for complete search history.

(56) References Cited

U.S. PATENT DOCUMENTS

| | | |
|---|---|---|
| 7,941,279 B2 | 5/2011 | Hwang |
| 8,241,854 B2 | 8/2012 | Yin |
| 8,318,921 B2 | 11/2012 | Pierce |
| 8,415,102 B2 | 4/2013 | Geiss |
| 8,497,364 B2 | 7/2013 | Pierce |
| 8,519,115 B2 | 8/2013 | Webster |
| 8,877,438 B2 | 11/2014 | Yin |

(Continued)

FOREIGN PATENT DOCUMENTS

| | | |
|---|---|---|
| EP | 2794928 B1 | 2/2019 |
| EP | 3425063 B1 | 6/2023 |

(Continued)

OTHER PUBLICATIONS

Kim et al. (2019) Nano Letters vol. 19 pp. 6035 to 6042 (Year: 2019).*

(Continued)

*Primary Examiner* — Christian C Boesen
(74) *Attorney, Agent, or Firm* — Greenberg Traurig, LLP

(57) ABSTRACT

Provided herein are compositions, kits, and methods for collection, integration, and analysis of spatially based information from tissues at the cellular or subcellular level. Layers of information include, without limitation, gene expression, morphology, nucleic acids, and proteins. In some workflows, light-based technologies are incorporated for selective spatial barcoding of regions. In further steps, such barcoded tags are optionally analyzed by high throughput Next Generation Sequencing.

29 Claims, 19 Drawing Sheets

Specification includes a Sequence Listing.

(56) References Cited

U.S. PATENT DOCUMENTS

| | | |
|---|---|---|
| 8,962,241 B2 | 2/2015 | Yin |
| 8,986,926 B2 | 3/2015 | Ferree |
| 9,217,151 B2 | 12/2015 | Yin |
| 9,284,602 B2 | 3/2016 | Zhang |
| 9,371,563 B2 | 6/2016 | Geiss |
| 9,714,446 B2 | 7/2017 | Webster |
| 9,834,439 B2 | 12/2017 | Yin |
| 10,006,917 B2 | 6/2018 | Dai |
| 10,041,108 B2 | 8/2018 | Barish |
| 10,227,639 B2 | 3/2019 | Levner |
| 10,240,146 B2 | 3/2019 | Zhuang |
| 10,246,700 B2 | 4/2019 | Dunaway |
| 10,472,669 B2 | 11/2019 | Chee |
| 10,501,777 B2 | 12/2019 | Beechem |
| 10,640,816 B2 | 5/2020 | Beechem |
| 10,961,566 B2 | 3/2021 | Chee |
| 10,983,113 B2 | 4/2021 | Chee |
| 10,996,219 B2 | 5/2021 | Chee |
| 11,001,878 B1 | 5/2021 | Chee |
| 11,008,607 B2 | 5/2021 | Chee |
| 11,021,737 B2 | 6/2021 | Church |
| 11,098,303 B2 | 8/2021 | Zhuang |
| 11,193,163 B2 | 12/2021 | Daugharthy |
| 11,293,051 B2 | 4/2022 | Church |
| 11,293,052 B2 | 4/2022 | Church |
| 11,293,054 B2 | 4/2022 | Levner |
| 11,293,917 B2 | 4/2022 | Chee |
| 11,542,554 B2 | 1/2023 | Daugharthy |
| 2005/0112594 A1 | 5/2005 | Grossman |
| 2010/0021901 A1 | 1/2010 | Yin |
| 2010/0021904 A1 | 1/2010 | Pierce |
| 2015/0176071 A1 | 6/2015 | Fisher |
| 2017/0267997 A1 | 9/2017 | Nicol |
| 2017/0327876 A1 | 11/2017 | Khafizov |
| 2019/0360044 A1 | 11/2019 | Chen |
| 2020/0291389 A1 | 9/2020 | Seelig |
| 2021/0040551 A1 | 2/2021 | Mikkelsen |
| 2021/0095331 A1 | 4/2021 | Fan |
| 2021/0310052 A1 | 10/2021 | Daugharthy |
| 2022/0002790 A1 | 1/2022 | Kishi |
| 2022/0056498 A1 | 2/2022 | Kishi |
| 2022/0180975 A1 | 6/2022 | Regev |

FOREIGN PATENT DOCUMENTS

| | | |
|---|---|---|
| WO | 2012106385 A2 | 8/2012 |
| WO | WO 2014/012010 | 1/2014 |
| WO | WO 2017/143006 | 2/2017 |
| WO | WO 2018/175296 | 3/2018 |
| WO | WO 2020/115511 A2 | 6/2020 |
| WO | WO 2021/119402 | 6/2021 |

OTHER PUBLICATIONS

Sheng et al. (2017) Nature Methods vol. 14 pp. 267 to 270 (Year: 2017).*

Castellanos-Rueda, Rocío, et al. "speedingCARs: accelerating the engineering of CAR T cells by signaling domain shuffling and single-cell sequencing." Nature Communications 13.1 (2022): 6555.

Chong, Zheng-Shan, et al. "Pooled extracellular receptor-ligand interaction screening using CRISPR activation." Genome biology 19 (2018): 1-16.

Goodman DB, Azimi CS, Kearns K, Talbot A, Garakani K, Garcia J, Patel N, Hwang B, Lee D, Park E, Vykunta VS, Shy BR, Ye CJ, Eyquem J, Marson A, Bluestone JA, Roybal KT. Pooled screening of CAR T cells identifies diverse immune signaling domains for next-generation immunotherapies. Sci Transl Med. Nov. 9, 2022;14(670):eabm1463.

Kang, Emily, et al. "A functional mammalian display screen identifies rare antibodies that stimulate NK cell-mediated cytotoxicity." Proceedings of the National Academy of Sciences 118.31 (2021): e2104099118.

Rios, Xavier, et al. "Refining chimeric antigen receptors via barcoded protein domain combination pooled screening." Molecular Therapy 31.11 (2023): 3210-3224.

Valldorf, Bernhard, Hinz, Steffen C., Russo, Giulio, Pekar, Lukas, Mohr, Laura, Klemm, Janina, Doerner, Achim, Krah, Simon, Hust, Michael and Zielonka, Stefan. "Antibody display technologies: selecting the cream of the crop" Biological Chemistry, vol. 403, No. 5-6, 2022, pp. 455-477.

Askary, A., et al., "In situ readout of DNA barcodes and single base edits facilitated by in vitro transcription" Nat Biotechnol. Jan. 2020 ; 38(1): 66-75. doi:10.1038/s41587-019-0299-4.

Bystrykh, L.V., "Generalized DNA Barcode Design Based on Hamming Codes" PLoS One. May 2012;7(5):e36852. doi: 10.1371/journal.pone.0036852.

Conrad, T. et al., "Maximizing transcription of nucleic acids with efficient T7 promoters" Commun Biol 3, 439 (2020). https://doi.org/10.1038/s42003-020-01167-x.

Gibson, D.G., et al., "Enzymatic assembly of DNA molecules up to several hundred kilobases" Nat Methods. May 2009;6(5):343-5. doi: 10.1038/nmeth.1318.

Gopalkrishnan, Nikhil, et al. "A DNA nanoscope that identifies and precisely localizes over a hundred unique molecular features with nanometer accuracy." bioRxiv (2020): Aug. 2020.

International Search Report issued Jan. 31, 2024 in PCT/US2023/070424.

International Search Report issued in PCT/US2023/064873 on Sep. 12, 2023.

Kershaw, C.J., et al., "Splint ligation of RNA with T4 DNA ligase" Methods Mol Biol. 2012; 941:257-69. doi: 10.1007/978-1-62703-113-4_19.

Kishi, J., "Programmable autonomous synthesis of single-stranded DNA" Nat Chem. Feb. 2018;10(2):155-164. doi: 10.1038/nchem.2872.

Kishi, J., et al., Supplementary information—"Light-Seq: light-directed in situ barcoding of biomolecules in fixed cells and tissues for spatially indexed sequencing" Nat Methods. Nov. 2022;19(11):1393-1402. doi: 10.1038/s41592-022-01604-1.

Kishi, J., et al., "Light-Seq: light-directed in situ barcoding of biomolecules in fixed cells and tissues for spatially indexed sequencing" Nat Methods. Nov. 2022;19(11):1393-1402. doi: 10.1038/s41592-022-01604-1.

Li, N., et al., "Tn5 Transposase Applied in Genomics Research" Int J Mol Sci. Nov. 6, 2020;21(21):8329. doi: 10.3390/ijms21218329.

Liu, N., et al., "Super-resolution labelling with Action-PAINT" Nat Chem. Nov. 2019; 11(11):1001-1008. doi: 10.1038/s41557-019-0325-7.

Liu, N., et al., "Super-resolution labelling with Action-PAINT" Supplementary Information, Nat Chem. Nov. 2019;11(11), 43 pages, doi: 10.1038/s41557-019-0325-7.

Liu, Y., et al., "High-plex protein and whole transcriptome co-mapping at cellular resolution with spatial CITE-seq" Nat Biotechnol. Feb. 23, 2023. doi: 10.1038/s41587-023-01676-0.

Liu, Yang, et al. "High-spatial-resolution multi-omics sequencing via deterministic barcoding in tissue." Cell 183.6 (2020): 1665-1681.

Moore M.J., & Sharp, P.A., "Site-specific modification of pre-mRNA: the 2'-hydroxyl groups at the splice sites" Science. May 15, 1992;256(5059):992-7. doi: 10.1126/science.1589782.

Piepenburg, O., et al. "DNA detection using recombination proteins" PLoS Biol. Jul. 2006;4(7):e204. doi: 10.1371/journal.pbio.0040204.

Rodriques, S.G., et al., "Slide-seq: A scalable technology for measuring genome-wide expression at high spatial resolution" Science. Mar. 29, 2019;363(6434):1463-1467. doi: 10.1126/science.aaw1219.

Rubanov, M., et al., "Sequential Activation of Spatially Localized Oligonucleotides" ACS Materials Letters 2022 4 (9), 1807-1814 DOI: 10.1021/acsmaterialslett.2c00286.

Schaus, T.E., "A DNA nanoscope via auto-cycling proximity recording" Nat Commun. Sep. 25, 2017;8(1):696. doi: 10.1038/s41467-017-00542-3.

(56) References Cited

OTHER PUBLICATIONS

Sountoulidis, A., et al., "SCRINSHOT enables spatial mapping of cell states in tissue sections with single-cell resolution" PLoS Biol. Nov. 20, 2020;18(11):e3000675. doi: 10.1371/journal.pbio. 3000675.

Stickels, R.R., et al., "Highly sensitive spatial transcriptomics at near-cellular resolution with Slide-seqV2" Nat Biotechnol. Mar. 2021;39(3):313-319. doi: 10.1038/s41587-020-0739-1.

Vandereyken, K., Sifrim, A., Thienpont, B. et al. Methods and applications for single-cell and spatial multi-omics. Nat Rev Genet 24, 494-515 (2023). https://doi.org/10.1038/s41576-023-00580-2.

Vincent, M., et al., "Helicase-dependent isothermal DNA amplification" EMBO Rep. Aug. 2004;5(8):795-800. doi: 10.1038/sj.embor. 7400200.

Wang, L., et al., "3' Branch ligation: a novel method to ligate non-complementary DNA to recessed or internal 3'OH ends in DNA or RNA" DNA Res. Feb. 1, 2019;26(1):45-53. doi: 10.1093/dnares/dsy037.

Wei, H., et al., "Production of dumbbell probe through hairpin cleavage-ligation and increasing RCA sensitivity and specificity by circle to circle amplification" Sci Rep 6, 29229 (2016). https://doi.org/10.1038/srep29229.

Weinstein, J.A., "DNA Microscopy: Optics-free Spatio-genetic Imaging by a Stand-Alone Chemical Reaction" Cell. Jun. 27, 2019;178(1):229-241.e16. doi: 10.1016/j.cell.2019.05.019.

Xu, M., et al., "DNA Origami Nanostructures with Scaffolds Obtained from Rolling Circle Amplification" ACS Materials Letters 2020 2 (10), 1322-1327, DOI: 10.1021/acsmaterialslett.9b00484.

Fujimoto, Kenzo, et al. "RNA fluorescence in situ hybridization using 3-cyanovinylcarbazole modified oligodeoxyribonucleotides as photo-cross-linkable probes." Bioorganic & Medicinal Chemistry Letters 26.21 (2016): 5312-5314.

Wu, Lucia R., et al. "Continuously tunable nucleic acid hybridization probes." nAture methods 12.12 (2015): 1191-1196.

\* cited by examiner

TISSUE SPATIAL OMICS

CROSS REFERENCE

This application is a continuation of International Application No. PCT/US2023/064873, filed Mar. 23, 2023, which claims the benefit of U.S. Provisional Application No. 63/323,290, filed Mar. 24, 2022, U.S. Provisional Application No. 63/326,384, filed Apr. 1, 2022, and U.S. Provisional Application No. 63/346,454, filed May 27, 2022, the entire contents of each of which are incorporated herein by reference.

SEQUENCE LISTING

The instant application contains a Sequence Listing which has been submitted electronically in ST 0.26 xml format and is hereby incorporated by reference in its entirety. Said xml copy, created on Mar. 11, 2024, is named 205590-701301_SL.xml and is 3,510 bytes in size.

BACKGROUND

The integration of imaging-based analysis and high-throughput screening of cells allows for spatial selection of information from a tissue sample. In many published methodologies, limitations around the number of visual features recorded or the manner of pooling information from such features results in loss of certain cell or subcellular location-specific information, including spatial information relating one feature relative to another feature. Thus, there is a need for improved compositions, devices, methods, and systems for collection of multiple channels of spatial information, including but not limited to morphological, genomic, transcriptomic, and proteomic data, at cellular and subcellular levels.

SUMMARY

Provided herein are methods of biological cell information generation, the methods comprising: contacting a population of cells with a nucleic acid polymerase and a primer to generate amplification products; depositing DNA barcodes onto the population of cells, wherein the DNA barcodes comprise a region complementary to a region of the amplification products, and wherein the DNA barcodes comprise a photo-reactive nucleobase capable of crosslinking to another nucleobase; selectively radiating the population of cells to form covalently linked DNA barcode-amplification product complexes; washing the population of cells to remove the DNA barcodes that are not complexed to amplification products; and repeating the depositing, selectively radiating, and washing steps, wherein: the DNA barcodes in a first of the depositing steps comprise a different sequence than the DNA barcodes in a second of the depositing steps, and the selectively radiating occurs at different locations for a first selectively radiating step and a second selectively radiating step.

Provided herein are methods of biological cell spatial information generation, the methods comprising: contacting a population of cells with a capture probe, wherein the capture probe comprises a DNA-binding region and a target binding region; depositing DNA barcodes onto the population of cells, wherein the DNA barcodes comprise a region that binds to the DNA-binding region, and wherein the DNA barcodes comprise a photo-reactive nucleobase capable of crosslinking to another nucleobase; selectively radiating the population of cells to form DNA barcode-amplification product complexes; washing the population of cells to remove the DNA barcodes that are not complexed to amplification products; and repeating the depositing, selectively radiating, and washing steps, wherein: the DNA barcodes in a first of the depositing steps comprise a different sequence than the DNA barcodes in a second of the depositing steps, and the selectively radiating occurs at different locations for a first selectively radiating step and a second selectively radiating step.

Provided herein are methods of biological cell spatial information generation, the methods comprising: capturing an image of a tissue sample in 3-dimensions; contacting the tissue sample with a nucleic acid polymerase and a primer to generate amplification products; depositing DNA barcodes onto the tissue sample wherein the DNA barcodes comprise a region complementary to a region of the amplification products, and wherein the DNA barcodes comprise a photo-reactive nucleobase capable of crosslinking to another nucleobase; selectively radiating the tissue sample in 3-dimensions to form DNA barcode-amplification product complexes; washing the tissue sample to remove the DNA barcodes that are not complexed to amplification products; and repeating the depositing, selectively radiating, and washing steps, wherein: the DNA barcodes in a first of the depositing steps comprise a different sequence than the DNA barcodes in a second of the depositing steps, and the selectively radiating occurs at different locations of the tissue sample for a first selectively radiating step and a second selectively radiating step.

Provided herein are methods of biological cell spatial information generation, comprising: capturing an image of a population of cells, wherein the population of cells are fixed onto a substrate; reverse transcribing RNA from the population of cells to generate cDNA; depositing DNA barcodes onto the population of cells; hybridizing DNA barcodes to the cDNA, wherein the DNA barcodes comprise a photo-reactive nucleobase capable of crosslinking to another nucleobase; selectively radiating the population of cells to form crosslinked barcodes; washing to remove DNA barcodes that are not crosslinked; and repeating the depositing, hybridizing, selectively radiating, and washing steps, wherein the DNA barcodes in the depositing steps are varied.

Provided herein are methods of biological cell spatial information generation, the methods comprising: depositing DNA barcodes onto a population of cells, wherein the DNA barcodes hybridize to a target region; and wherein the DNA barcodes comprise a photo-reactive nucleobase capable of crosslinking to another nucleobase; selectively radiating the population of cells at a region of interest to form covalently linked DNA barcode-target complexes, wherein the radiating is selectively varied by intensity or duration; washing the population of cells to remove the DNA barcodes that are not complexed to the target region; and repeating the depositing, selectively radiating, and washing steps, wherein the DNA barcodes in a first of the depositing steps comprise a different sequence than the DNA barcodes in a second of the depositing steps.

Provided herein are methods of biological information generation, the methods comprising: depositing a primer on a population of nucleic acids that hybridizes to a target sequence of the nucleic acid to form nucleic acid primer-complexes; depositing DNA barcodes on the nucleic acid-primer complexes, wherein the DNA barcodes hybridize to the primer to form nucleic acid concatemers; wherein the DNA barcodes comprise a photoreactive nucleobase capable of crosslinking to another nucleobase; radiating the nucleic acid concatemers to form covalently linked concatemers; and removing the DNA barcodes that are not in covalently linked concatemers.

Provided herein are methods of biological cell information generation, the methods comprising: depositing DNA barcodes on a population of cells, wherein the DNA barcodes comprise a photo-reactive nucleobase capable of crosslinking to another nucleobase; forming concatemers via light-based steps comprising repeating the steps below: a) selectively radiating the population of cells at a first wavelength to form covalently linked complexes of DNA barcode hybridized to a substrate nucleic acid sequence; and b) selectively radiating the population of cells at a second wavelength to de-link the DNA barcode hybridized to a substrate nucleic acid sequence; and collecting the concatemers, wherein the collecting step is before or after the selectively radiating the population of cells at a second wavelength, and wherein the concatemers comprise information about the population of cells.

Provided herein are methods of spatial tissue information generation, the method comprising: at least partial removal of paraffin from a sample comprising paraffin embedded tissue; heating the sample to at least a temperature of about 50° C.; contacting the sample with a nucleic acid polymerase and a primer to generate amplification products; depositing DNA barcodes onto the sample, wherein the DNA barcodes comprise a region complementary to a region of the amplification products, and wherein the DNA barcodes comprise a photo-reactive nucleobase capable of crosslinking to another nucleobase; selectively radiating the sample to form covalently linked DNA barcode-amplification product complexes, wherein the selectively radiating occurs at different locations for a first selectively radiating step and a second selectively radiating step; washing the sample to remove the DNA barcodes that are not complexed to amplification products; and determining spatial tissue information based at least in part on the generate amplification products and the DNA barcodes.

Provided herein are methods of biological cell spatial information generation, the methods comprising: depositing DNA barcodes, wherein the DNA barcodes comprise a photo-reactive nucleobase capable of crosslinking to another nucleobase onto a population of cells, and wherein the DNA barcodes hybridize to a target region; selectively radiating the population of cells in at least one region of interest (ROI) to form covalently linked DNA barcode-target complexes, wherein the radiating is selectively varied by intensity or duration; washing the population of cells to remove the DNA barcodes that are not complexed to the target region; and repeating the depositing, selectively radiating, and washing steps, wherein the DNA barcodes in a first of the depositing steps comprise a different sequence than the DNA barcodes in a second of the depositing steps and wherein the second selectively radiating step is applied at a same or different duration or intensity than the first selectively radiating step.

Provided herein are nucleic acid libraries produced according to methods described herein.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

(FIG. 13A) and 95° C. (FIG. 13B).

DETAILED DESCRIPTION

Provided herein are compositions, devices, methods, and systems for use in accessible and scalable visual selection methods that can directly link multi-dimensional and high-resolution cellular phenotypes (including morphology, protein markers, and spatial organization) to transcriptomic, genomic, or proteomic profiles for diverse sample types. Processes described herein are applicable to analysis of cellular states in tissue, in synthetic tissue, or in solution. Described herein are methods of sample preparation providing for imaging and region selection, methods for in situ barcoding and imaging, and methods of record extraction and sequencing to provide spatially-defined data from a sample.

Provided herein are methods for spatial indexing of transcribed nucleic acids in selected regions of interest (ROIs) in cells and tissues. In some embodiments, the transcribed nucleic acid is a reverse transcribed DNA or a transcribed RNA. In some embodiments, barcode sequences from sequencing reads provide spatial indexing data. In some embodiments, spatial indexing data combined with imaging methods described earlier herein provides a link between cellular phenotype information and transcriptome information.

Workflows

Figure 1A:
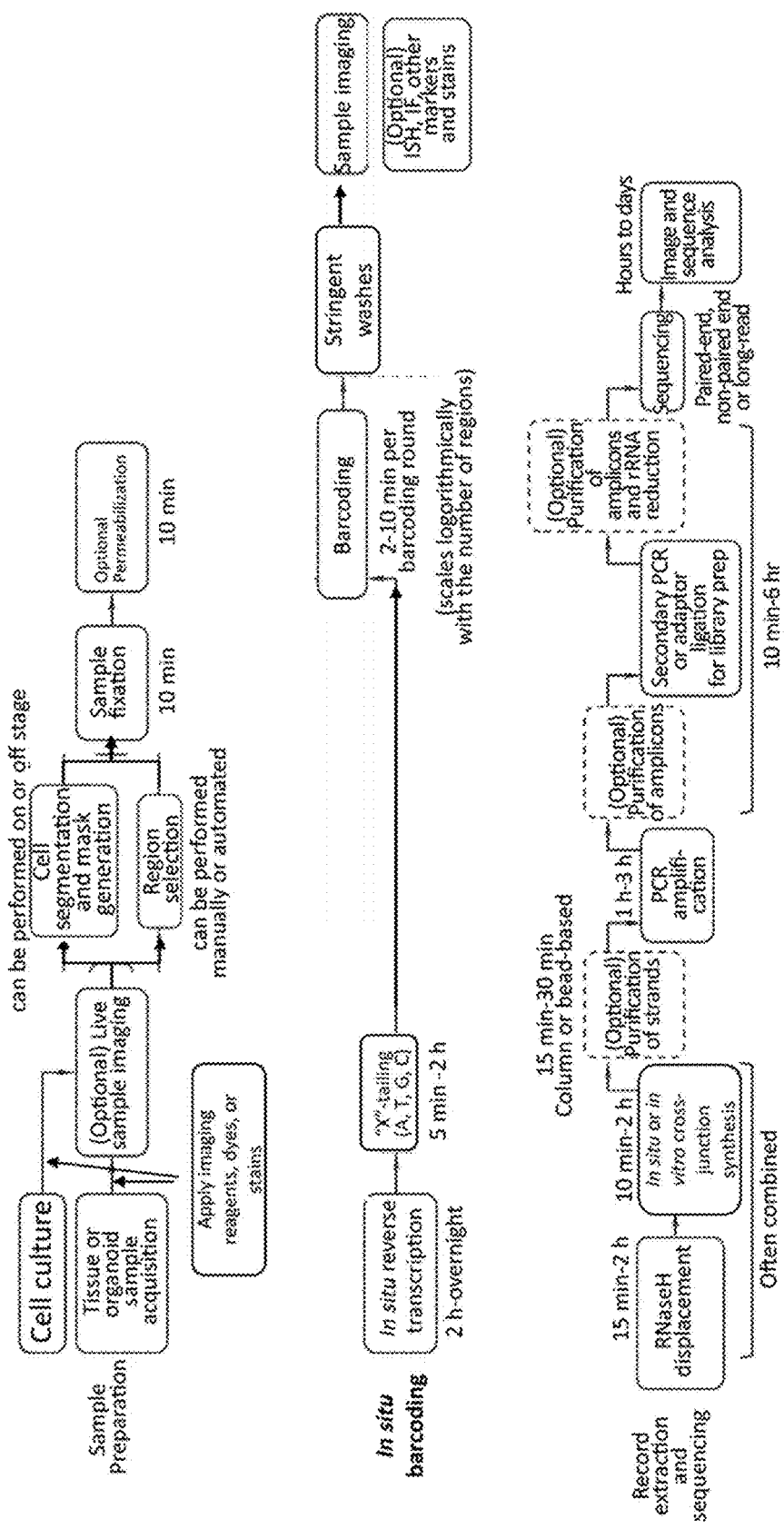
FIGS. 1A and 1B illustrate a process workflow, incorporating sample preparation, light-based in situ barcoding of a population of cells, and record extraction and sequencing.

An exemplary workflow for analysis of a biological cell is provided in FIG. 1A. Briefly, a step of sample preparation (e.g., a tissue sample or a population of cells) is performed. The sample preparation step may include culture of cells or acquisition of tissue or organoids followed by imaging. Dyes and/or probes to enhance visualization of cells and/or structures therein may be applied to the sample. Subsequent imaging provides morphological and architectural information of the sample to assist with region selection, cell segmentation, and mask generation. The sample is then optionally permeabilized. Permeabilization can be performed before imaging the sample or concurrently with fixation of a sample.

Following the workflow, to analyze the biological cell in situ, reverse transcription of sample RNA is performed, optionally followed by tailing of the resulting target cDNA. Tailing adds non-templated nucleotides to the 3' end of a nucleic acid strand. In some embodiments, tailing comprises ligation of a nucleic acid fragment. In some embodiments, tailing comprises extension of a nucleic acid strand. In some instances, spatially directed barcoding within selected regions of interest is then performed utilizing photomasks, with region selection for de-masking based on the earlier sample imaging. The biological cell is, optionally, further imaged to show incorporation of barcodes. Following the process described in FIG. 1A, Record extraction and sequencing comprises displacement of barcoded nucleic acids. Displacement is optionally achieved with application of RNaseH. Cross-junction synthesis to generate continuous nucleic acids can also effect displacement of the barcoded nucleic acids. Enzymatic displacement and synthesis reactions can be combined or performed sequentially in any order. After sequences have been extracted from the sample, further imaging or other assays (e.g., mass spectrometry, H&E staining) may be performed on the sample. Subsequent Polymerase Chain Reaction (PCR) amplification and optional purification is followed by optional library preparation and next generation sequencing. The resulting sequence analysis is merged with the captured imaging data to provide integrated spatial and sequence-based information output.

Figure 1B:
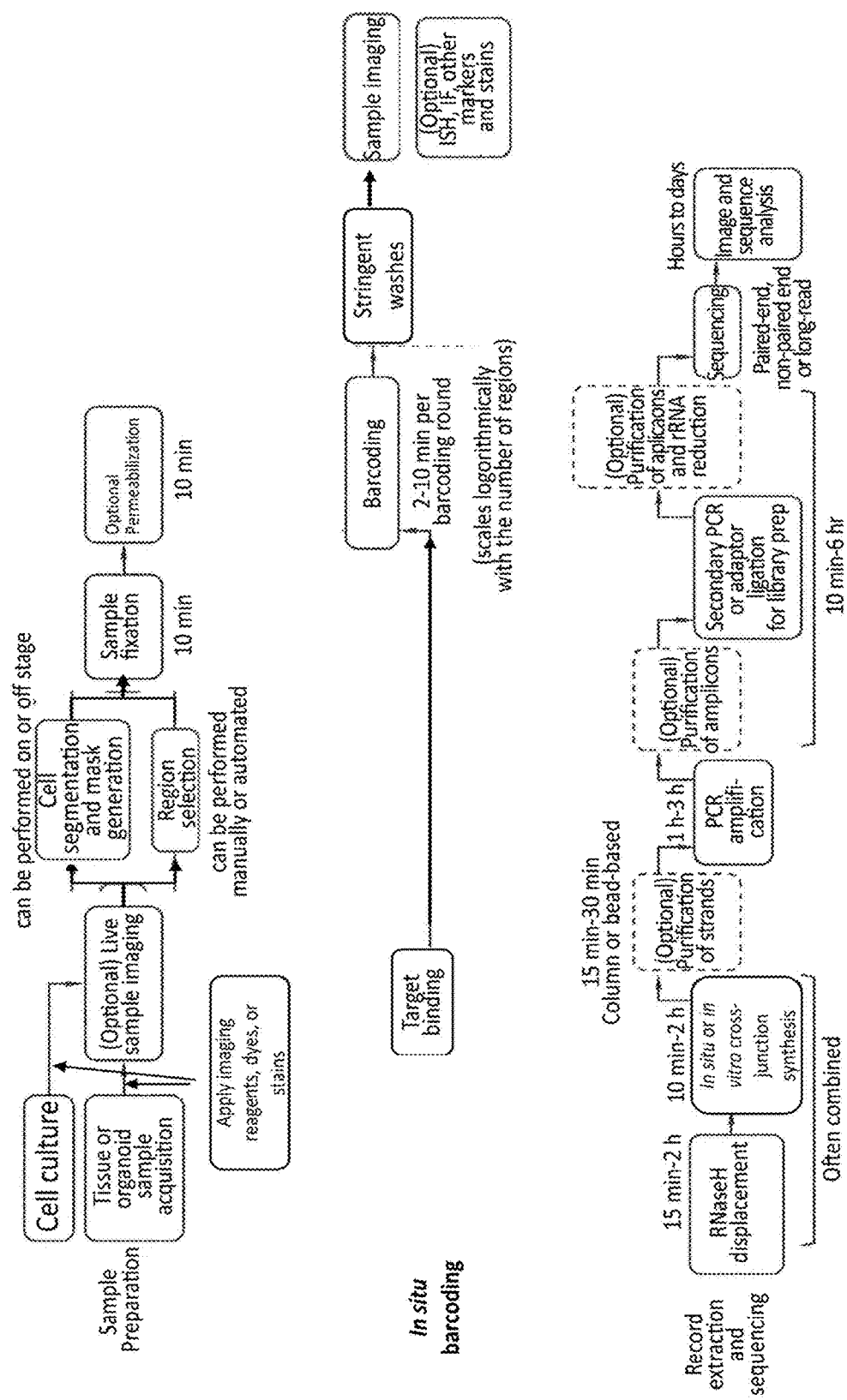

A further exemplary workflow is illustrated in FIG. 1B. Briefly, a step of sample preparation (e.g., a tissue sample or a population of cells) is performed. The sample preparation step may include culture of cells or acquisition of tissue or organoids followed by imaging. Dyes and/or probes to enhance visualization of cells and/or structures therein may be applied to the sample. Subsequent imaging provides morphological and architectural information of the sample to assist with region selection, cell segmentation, and mask generation. The sample is then optionally permeabilized. In this exemplary embodiment, a reverse transcription step is not performed. Alternatively, a target in the sample is bound with a recognition binding agent, which may be fused or otherwise connected to a nucleic acid, which is then barcoded as described in FIG. 1A.

Figure 1C:
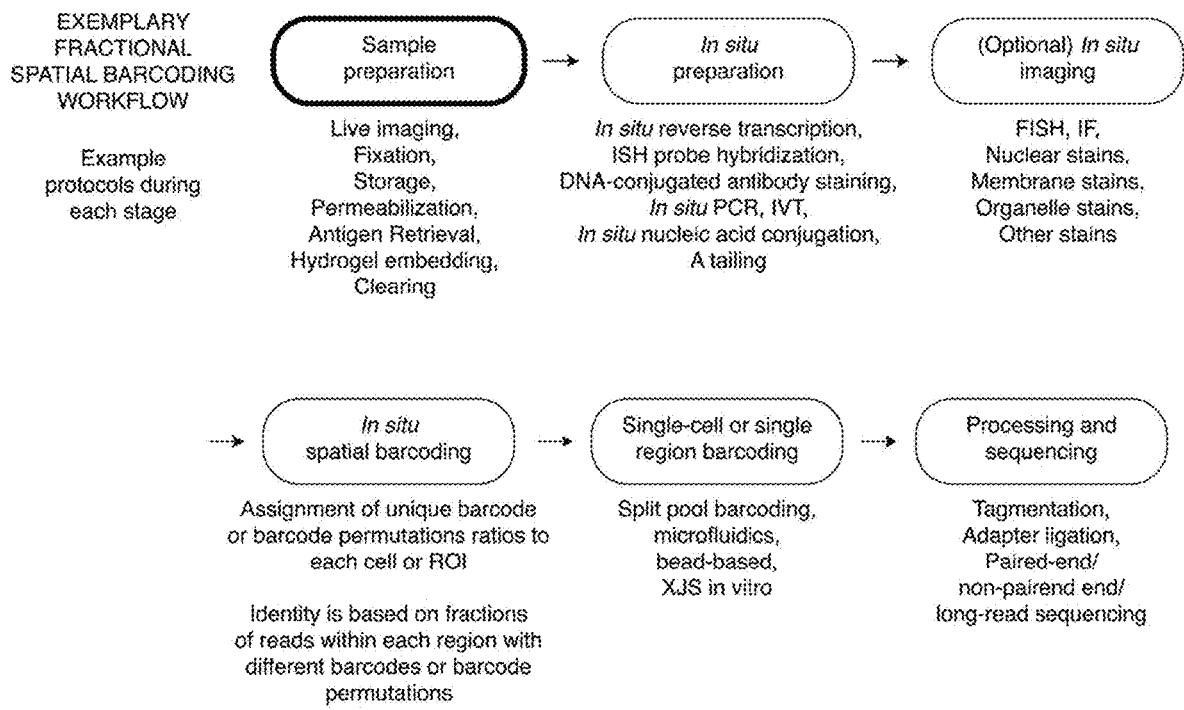
FIG. 1C illustrates a workflow providing for fractional spatial barcoding.
Figure 2A:
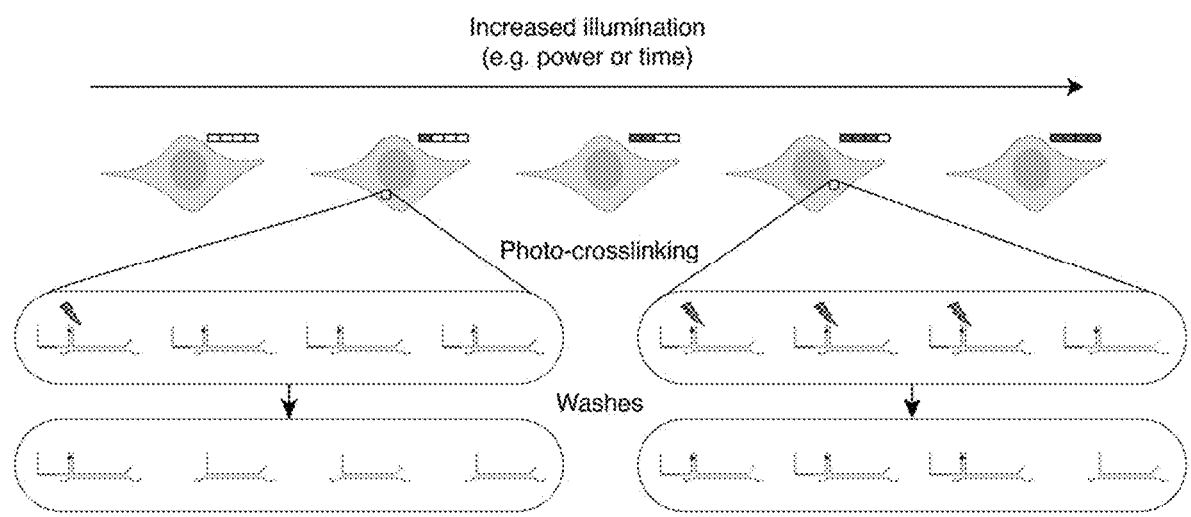
FIGS. 2A and 2B illustrate a fractional barcoding schema following the workflow described in FIG. 1C.
Figure 2B:
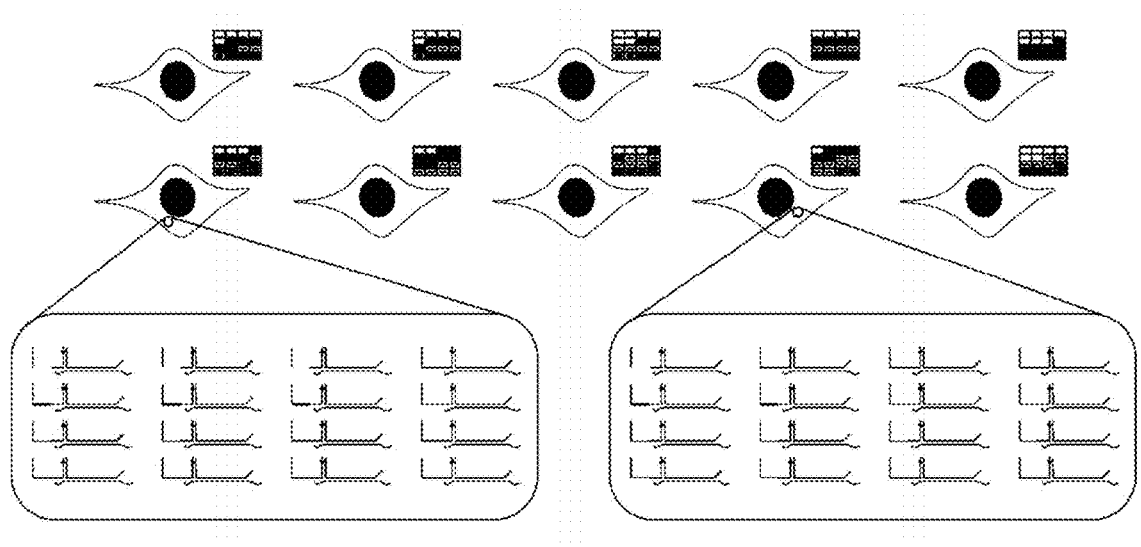

A fractional spatial barcoding workflow is illustrated in FIG. 1C. Sample preparation and optional imaging steps comprise methodologies similar to previous workflows. In this case, a unique ratio of barcode or barcode permutations is assigned to a specific cell or region of interest (ROI). Duration or power of applied radiation energy is controlled in order to define the fraction of available targets which will crosslink with the contacted barcode. FIG. 2A is an exemplary depiction of controllably increasing illumination power or time to induce more crosslinking events in a specific region, in this case, a cell. Multiple rounds of fractional barcode crosslinking can be applied across a sample, allowing differentiation and identification of cells or regions of interest. FIG. 2B illustrates example combinations of four different barcode sequences applied across a cell or region. Each cell or region of interest can be assigned an individualized split of barcode sequences across its reads, so that after subsequent single cell or region barcoding and sequencing, the original spatial location of cells can be recovered based on the fraction of reads from each barcode measured with next generation sequencing. In some instances, cells or regions are separately barcoded after dissociation of the sample. In some embodiments, sorting methods to separate distinct regions are applied, for example split pool barcoding, microfluidics, barcoded beads, or other single-cell barcoding techniques, prior to sequencing. Each cell or ROI can be identified based on the fraction of photo-crosslinked barcodes or combinations thereof.

Sample Preparation

Cell Culture Sample acquisition

Spatial barcoding methods described herein can be applied to a broad range of materials. Provided herein are methods for preparing samples for downstream biological analysis steps. In some embodiments, samples as described herein comprise a population of cells. In some embodiments, samples described herein comprise a tissue sample. In some embodiments, samples described herein comprise a laminar cell culture. Non-limiting examples of samples that can be used include: intact tissue, dissected tissue, dissociated cells, an organoid, engineered tissue, cultured cells, sub-cellular compositions, a suspension of cells, organs, tissue biopsies, or any combination thereof. In some embodiments, samples described herein comprise a population of cultured cells. An organoid comprises a tiny, self-organized, three-dimensional tissue culture. In some embodiments, the organoid is derived from stem cells. Cultured cells can include but are not limited to primary cell cultures, dissociated cells, dissected cells, passaged cell lines, and/or transformed cells. In some embodiments, the population of cells provided herein comprise an engineered tissue. In some embodiments, the engineered tissue comprises a population of human in vitro-differentiated cells. In some embodiments, the human in vitro-differentiated cells are derived from human induced pluripotent stem cells (hiPSCs), embryonic stem cells, or adult stem cells. In some embodiments, the human in vitro-differentiated cells are in vitro-differentiated cardiomyocytes, in vitro-differentiated neurons, in vitro-differentiated hepatocytes, in vitro-differentiated endothelial cells, in vitro-differentiated epithelial cells, in vitro-differentiated smooth muscle cells, in vitro-differentiated skeletal muscle cells, or in vitro-differentiated kidney cells. In some embodiments, the population of cells provided herein comprise retinal cells. In some embodiments, the population of cells provided herein are obtained from a subject. In some embodiments, the subject is a mammal. In some embodiments, the mammal is a primate, a non-human primate, a human, a mouse, a rat, a goat, a rabbit, a dog, a camelid, or a cat.

In some embodiments, the population of cells comprises a homogeneous population of cells (e.g., cells of the same type or of the same species). In embodiments, the population of cells comprise a heterogenous population of cells (e.g., cells of different types, different species, or any combination thereof). In some embodiments, the population of cells comprises cells from one species. In some embodiments, the population of cells comprises cells from two or more species. In some embodiments, the population of cells comprises one cell type. In some embodiments, the population of cells comprises cells from two or more different cell types. In some embodiments the population of cells comprises cells from at least 2, at least 3, at least 4, at least 5, at least 6, at least 7, at least 8, at least 9, at least 10, at least 15, at least 20, at least 25, at least 30, at least 35, at least 40, at least 45, at least 50, at least 60, at least 70, at least 80, at least 90, at least 100, at least 250, at least 500, at least 1000 or more species. In some embodiments the population of cells comprises cells from at least 2, at least 3, at least 4, at least 5, at least 6, at least 7, at least 8, at least 9, at least 10, at least 15, at least 20, at least 25, at least 30, at least 35, at least 40, at least 45, at least 50, at least 60, at least 70, at least 80, at least 90, at least 100, at least 250, at least 500, at least 1000 or more different cell types.

In some embodiments, samples used in methods described herein are a tissue sample. In some embodiments, tissue samples provided herein comprise connective tissue, epithelial tissue, muscle tissue, or nervous tissue. In some embodiments, tissue samples provided herein comprise a combination of tissues. An organ comprises tissues of different types and has a specific function. In some embodiments, a combination of tissues is an organ. In some embodiments, a combination of tissues is an organoid. In some embodiments, the tissue sample is obtained from a subject. In some embodiments, tissues samples provided herein are obtained from a brain, an eye, a lung, a liver, a bladder, a kidney, a heart, a stomach, an intestine, a lymph node, a skeletal muscle, a smooth muscle, a pharynx, a larynx, an artery, a liver, a gallbladder, a bone, a spleen, a vein, a pancreas, a reproductive organ, a tumor, an infected tissue, or any combination thereof. In some embodiments, tissue samples provided herein are a whole organ or a biopsy tissue. In some embodiments, the biopsy tissue comprises a tissue that has or is suspected of having abnormal proliferation or growth. In some embodiments, the biopsy tissue comprises cancer cells.

In some embodiments, a population of cells described herein comprises one or more microorganisms. In some embodiments, the population of cells comprises prokaryotic or eukaryotic cells. In some embodiments, a population of cells provided herein comprise bacterial cells, fungal cells, archaic cells, eukaryotic cells, or any combination thereof. In some embodiments, the population of cells comprises mammalian cells. In some embodiments, the mammalian cells are human, non-human primate, primate, pig, horse, sheep, cat, rat, mouse, dog, llama, rabbit, or goat cells. In some embodiments, the population of cells further comprises a virus. In some embodiments, the virus is a pathogenic virus. In some embodiments, the population of cells comprise a viral vector. In some embodiments, the population of cells have been genetically modified. Non-limiting examples of genetic modifications include base editing, gene silencing (e.g., by CRISPR/Cas9 systems), gene insertions, and gene deletions.

In some embodiments, a sample comprises cells. In some embodiments, a sample comprises cells from a suspension. In some embodiments, a sample comprises a whole organism. In some embodiments, the whole organism is a multicellular organism. In some embodiments, the whole organism is a single cell organism. Example multicellular organisms include, without limitation, roundworm (*Cae-*

*norhabditis elegans*), zebrafish (*Danio rerio*), and a *Drosophila*. Example single cell organisms include, without limitation, bacteria and yeast.

Imaging

Imaging of samples is used to guide photomasking for light-directed barcoding. Imaging is also used to visualize barcoding with fluorophore-labeled barcodes. Provided herein are methods for image capture and enhancement thereof which incorporate application of imaging reagents. Imaging reagents can be used for distinguishing cells, cell types, and/or subcellular structures. In some embodiments, a tissue sample or a population of cells provided herein is contacted with imaging reagents. In some embodiments the imaging reagent is a dye or stain. In some embodiments, the dye or stain comprises 7-AAD, Acridine orange, Bismarck brown Calcein, CFSE, Carmine, Coomassie blue, Cresyl violet, Crystal violet, DAPI, Eosin, Ethidium bromide, Acid fuchsin, Haematoxylin, Hoechst stains, Iodine, Malachite green, Methyl green, Methylene blue, Neutral red, Nile blue, Nile red, Osmium tetroxide (formal name: osmium tetraoxide), Propidium iodide, Resazurin, Rhodamine, Safranine, Trypan Blue, Tetrazolium salts, or any combination thereof.

In some embodiments, samples are visualized with immunofluorescent (IF) staining. In some embodiments, the IF staining reagent comprises a fluorophore conjugated streptavidin. In some embodiments, the imaging reagent is a fluorophore. Exemplary fluorophores for inclusion in workflows described herein include, but are not limited to, 1,5 IAEDANS; 1,8-ANS; 4-Methylumbelliferone; 5-carboxy-2, 7-dichlorofluorescein; 5-Carboxyfluorescein (5-FAM); 5-Carboxynapthofluorescein (pH 10); 5-Carboxytetramethylrhodamine (5-TAMRA); 5-FAM (5-Carboxyfluorescein); 5-Hydroxy Tryptamine (HAT); 5-ROX (carboxy-X-rhodamine); 6-Carboxyrhodamine 6G; 6-CR 6G; 6-JOE; 7-Amino-4-methylcoumarin; 7-Aminoactinomycin D (7-AAD); 7-Hydroxy-4-methylcoumarin; 9-Amino-6-chloro-2-methoxyacridine; ABQ; Acid Fuchsin; ACMA (9-Amino-6-chloro-2-methoxyacridine); Acridine Orange; Acridine Red; Acridine Yellow; Acriflavin; Acriflavin Feulgen SITSA; Aequorin (Photoprotein); Alexa Fluor 350™; Alexa Fluor 430™; Alexa Fluor 488™; Alexa Fluor 532™; Alexa Fluor 546™; Alexa Fluor 568™; Alexa Fluor 594™; Alexa Fluor 633™; Alexa Fluor 647™; Alexa Fluor 660™; Alexa Fluor 680™; Alizarin Complexon; Alizarin Red; Allophycocyanin (APC); AMC, AMCA-S; AMCA (Aminomethylcoumarin); AMCA-X; Aminoactinomycin D; Aminocoumarin; Anilin Blue; Anthrocyl stearate; APC-Cy7; APTS; Astrazon Brilliant Red 4G; Astrazon Orange R; Astrazon Red 6B; Astrazon Yellow 7 GLL; Atabrine; ATTO-TAG™ CBQCA; ATTO-TAG™ FQ; Auramine; Aurophosphine G; Aurophosphine; BAO 9 (Bisaminophenyloxadiazole); BCECF (high pH); BCECF (low pH); Berberine Sulphate; Beta Lactamase; BFP blue shifted GFP (Y66H); BG-647; Bimane; Bisbenzamide; Blancophor FFG; Blancophor SV; BOBO™-1; BOBO™-3; Bodipy 492/515; Bodipy 493/503; Bodipy 500/510; Bodipy 505/515; Bodipy 530/550; Bodipy 542/563; Bodipy 558/568; Bodipy 564/570; Bodipy 576/589; Bodipy 581/591; Bodipy 630/650-X; Bodipy 650/665-X; Bodipy 665/676; Bodipy Fl; Bodipy FL ATP; Bodipy Fl-Ceramide; Bodipy R6G SE; Bodipy TMR; Bodipy TMR-X conjugate; Bodipy TMR-X, SE; Bodipy TR; Bodipy TR ATP; Bodipy TR-X SE; BO-PRO™-1; BO-PRO™-3; Brilliant Sulphoflavin FF; Calcein; Calcein Blue; Calcium Crimson™; Calcium Green; Calcium Green-1 Ca2+ Dye; Calcium Green-2 Ca2+; Calcium Green-5N Ca2+; Calcium Green-C18 Ca2+; Calcium Orange; Calcofluor White; Carboxy-X-rhodamine (5-ROX); Cascade Blue™; Cascade Yellow; Catecholamine; CFDA; CFP—Cyan Fluorescent Protein; Chlorophyll; Chromomycin A; CMFDA; Coelenterazine; Coelenterazine cp; Coelenterazine f; Coelenterazine fcp; Coelenterazine h; Coelenterazine hep; Coelenterazine ip; Coelenterazine 0; Coumarin Phalloidin; CPM Methylcoumarin; CTC; Cy2™; Cy3.1 8; Cy3.5™; Cy3™; Cy5.1 8; Cy5.5™; Cy5™; Cy7™; Cyan GFP; cyclic AMP Fluorosensor (FiCRhR); d2; Dabcyl; Dansyl; Dansyl Amine; Dansyl Cadaverine; Dansyl Chloride; Dansyl DHPE; Dansyl fluoride; DAPI; Dapoxyl; Dapoxyl 2; Dapoxyl 3; DCFDA; DCFH (Diehl orodihydrofluorescein Diacetate); DDAO; DHR (Dihydorhodamine 123); Di-4-ANEPPS; Di-8-ANEPPS (non-ratio); DiA (4-Di-16-ASP); DIDS; Dihydorhodamine 123 (DHR); DiO (DiOC18(3)); DiR; DiR (DiIC18(7)); Dopamine; DsRed; DTAF; DY-630-NHS; DY-635-NHS; EBFP; ECFP; EGFP; ELF 97; Eosin; Erythrosin; Erythrosin ITC; Ethidium homodimer-1 (EthD-1); Euchrysin; Europium (III) chloride; Europium; EYFP; Fast Blue; FDA; Feulgen (Pararosaniline); FITC; FL-645; Flazo Orange; Fluo-3; Fluo-4; Fluorescein Diacetate; Fluoro-Emerald; Fluoro-Gold (Hydroxy stilbamidine); Fluor-Ruby; FluorX; FM 1-43™; FM 4-46; Fura Red™ (high pH); Fura-2, high calcium; Fura-2, low calcium; Genacryl Brilliant Red B; Genacryl Brilliant Yellow 10GF; Genacryl Pink 3G; Genacryl Yellow 5GF; GFP (S65T); GFP red shifted (rsGFP); GFP wild type, non-UV excitation (wtGFP); GFP wild type, UV excitation (wtGFP); GFPuv; Gloxalic Acid; Granular Blue; Haematoporphyrin; Hoechst 33258; Hoechst 33342; Hoechst 34580; HPTS; Hydroxycoumarin; Hydroxystilbamidine (FluoroGold); Hydroxytryptamine; Indodicarbocyanine (DiD); Indotricarbocyanine (DiR); Intrawhite Cf; JC-1; JO-JO-1; JO-PRO-1; LaserPro; Laurodan; LDS 751; Leucophor PAF; Leucophor SF; Leucophor WS; Lissamine Rhodamine; Lissamine Rhodamine B; LOLO-1; LO-PRO-1; LuciferYellow; Mag Green; Magdala Red (Phloxin B); Magnesium Green; Magnesium Orange; Malachite Green; Marina Blue; Maxilon Brilliant Flavin 10 GFF; Maxilon Brilliant Flavin 8 GFF; Merocyanin; Methoxy coumarin; Mitotracker Green FM; Mitotracker Orange; Mitotracker Red; Mitramycin; Monobromobimane; Monobromobimane (mBBr-GSH); Monochlorobimane; MPS (Methyl Green Pyronine Stilbene); NBD; NBD Amine; Nile Red; Nitrobenzoxadidole; Noradrenaline; Nuclear Fast Red; Nuclear Yellow; Nylosan Brilliant Iavin E8G; Oregon Green™; Oregon Green 488-X; Oregon Green™ 488; Oregon Green™ 500; Oregon Green™ 514; Pacific Blue; Pararosaniline (Feulgen); PE-Cy5; PE-Cy7; PerCP; PerCP-Cy5.5; PE-TexasRed (Red 613); Phloxin B (Magdala Red); Phorwite AR; Phorwite BKL; Phorwite Rev; Phorwite RPA; Phosphine 3R; Photo-Resist; Phycoerythrin B [PE]; Phycoerythrin R [PE]; PKH26; PKH67; PMIA; Pontochrome Blue Black; POPO-1; POPO-3; PO-PRO-1; PO-PRO-3; Primuline; Procion Yellow; Propidium Iodid (PI); PyMPO; Pyrene; Pyronine; Pyronine B; Pyrozal Brilliant Flavin 7GF; QSY 7; Quinacrine Mustard; Resorufm; RH 414; Rhod-2; Rhodamine; Rhodamine 110; Rhodamine 123; Rhodamine 5 GLD; Rhodamine 6G; Rhodamine B 540; Rhodamine B 200; Rhodamine B extra; Rhodamine BB; Rhodamine BG; Rhodamine Green; Rhodamine Phallicidine; Rhodamine Phalloidine; Rhodamine Red; Rhodamine WT; Rose Bengal; R-phycoerythrin (PE); red shifted GFP (rsGFP, S65T); S65A; S65C; S65L; S65T; Sapphire GFP; Serotonin; Sevron Brilliant Red 2B; Sevron Brilliant Red 4G; Sevron Brilliant Red B; Sevron Orange; Sevron Yellow L; sgBFP™; sgBFP™ (super glow BFP); sgGFP™; sgGFP™ (super glow GFP); SITS; SITS (Primuline); SITS (Stilbene Isothiosulphonic Acid); SPQ (6-methoxy-N-(3-sulfopropyl)-quinolinium); Stilbene; Sulphorhodamine B can C; Sulphorhodamine G Extra; Tetracycline; Tetramethylrhodamine; Texas Red™; Texas Red-X™ conjugate; Thiadicarbocyanine (DiSC3); Thiazine Red R; Thiazole Orange; Thioflavin 5; Thioflavin S; Thioflavin TCN; Thiolyte; Thiozole Orange; Tinopol CBS (Calcofluor White); TMR; TO-PRO-1; TO-PRO-3; TO-PRO-5; TOTO-1; TOTO-3; Tricolor (PE-Cy5); TRITC (TetramethylRodamineIsoThioCyanate); True Blue; Tru-Red; Ultralite; Uranine B; Uvitex SFC; wt GFP; WW 781; XL665; X-Rhodamine; XRITC; Xylene Orange; Y66F; Y66H; Y66W; Yellow GFP; YFP; YO-PRO-1; YO-PRO-3; YOYO-1; YOYO-3; or any combination thereof. Many suitable forms of these fluorescent compounds are available and can be used.

In some embodiments, samples described herein are imaged using a microscope. In some embodiments, a microscope used in methods described herein includes a compound microscope, a fluorescent microscope, a confocal microscope, a light sheet microscope, a Raman microscope, a digital microscope, or any combination thereof.

Sample Fixation

Methods described herein are not limited by sample fixation conditions. In some embodiments, the population of cells is fixed and then frozen. In some embodiments, the population of cells is frozen, then fixed after thawing and/or sectioning. In some embodiments, the fixed population of cells is sectioned and then fixed a second time. In some embodiments, the population of cells is stored at room temperature after fixing. In some embodiments, the population of cells is fixed with organic solvents, such as alcohols and acetones. In some embodiments, the population of cells (e.g., tissue) are embedded in paraffin prior to fixing. In some embodiments, the population of cells are fixed with cross-linking reagents. In some embodiments, the cross-linking reagent comprises formalin, formaldehyde, paraformaldehyde, dithio-bis(succinimidyl propionate) (DSP), or any combination thereof.

In some embodiments, samples provided herein are frozen at $-5°$ C.--$200°$ C. In some embodiments, samples provided herein are frozen at about $-5°$ C., about $-10°$ C., about $-15°$ C., about $-20°$ C., about $-25°$ C., about $-30°$ C., about $-35°$ C., about $-40°$ C., about $-45°$ C., about $-50°$ C., about $-55°$ C., about $-60°$ C., about $-65°$ C., about $-70°$ C., about $-75°$ C., about $-80°$ C., about $-85°$ C., about $-90°$ C., about $-95°$ C., about $-100°$ C., or any combination thereof. In some embodiments, a tissue sample or a population of cells provided herein is flash frozen. In some embodiments, a tissue sample or a population of cells provided herein are frozen by slow, or equilibrium, freezing.

In some embodiments, a sample comprises tissue. In some embodiments, the sectioned tissue is sliced. In some embodiments, the slices are up to about 5 um, about 10 um, about 15 um, about 20 um, about 25 um, about 30 um, about 35 um, about 40 um, about 45 um, about 50 um, or more in thickness.

In some embodiments, a sample described herein comprises a cell. In some embodiments, the cell is bound to a surface. In some embodiments, the cell is in solution. In some embodiments, the cell is connected to a hydrogel. In some embodiments, the cell is connected to a synthetic scaffold. In some embodiments, the cell is attached directly or indirectly to a synthetic scaffold. In some embodiments, the synthetic scaffold comprises a bead or semi-solid gel. In some embodiments, the synthetic scaffold comprises an extracellular matrix protein. In some embodiments, the extracellular matrix protein comprises collagen or fibronectin.

In some embodiments, samples provided herein are fixed on a microscope slide or coverslip. In some embodiments, the microscope slide is a chamber slide. In some embodiments, the chamber slide comprises one or more chambers. In some embodiments, the slide comprises polystyrene. In some embodiments, the slide comprises glass.

In some embodiments, the slide comprises a coating to promote adherence of a tissue sample or a population of cells provided herein to a surface of the slide. In some embodiments, the coating comprises poly-L-lysine or poly-D-lysine. In some embodiments, the coating comprises a gelatin. In some embodiments, the coating comprises a 3-aminopropyltriethoxysilane (APES). In some embodiments, samples are adhered to the slide using an adhesive tape. In some embodiments, the adhesive tape is polyvinylidene chloride, polyester/silicone, polypropylene film, cellophane, synthetic rubber-resin hot melt, low density polyethylene film, polyester film, or any combination thereof.

In some embodiments, samples are incorporated in a hydrogel. In some embodiments, the hydrogel comprises a synthetic gel or polyepoxide. In some embodiments, embedding a sample generates at tissue-hydrogel matrix. In some embodiments, embedding a sample provides for expansion of a tissue sample or a population of cells provided herein. In some embodiments, the hydrogel is a natural hydrogel, a synthetic hydrogel, or a synthetic/natural hybrid hydrogel. In some embodiments, the natural hydrogel is a protein, a polysaccharide, a protein/polysaccharide, DNA, or any combination thereof. In some embodiments, the protein hydrogel comprises collagen, elastin, fibrin, silk, lysozyme, Matrigel® (Corning Inc., Corning, NY), genetically engineered proteins, or any combination thereof. In some embodiments, the polysaccharide comprises hyaluronic acid (HA), alginate, chitosan, dextran, or any combination thereof. In some embodiments, the protein/polysaccharide comprises collagen/HA, laminin/cellulose, fibrin/alginate, gelatin/agarose, chitosan, alginate, dextran, or any combination thereof. In some embodiments, the DNA hydrogel comprises X-DNA, Y-DNA, T-DNA, linear plasmid DNA, or any combination thereof. In some embodiments, the synthetic hydrogel is a nonbiodegradable hydrogel, a biodegradable hydrogel, a bioactive hydrogel, or any combination thereof. In some embodiments, the nonbiodegradable hydrogel comprises poly(2-hydroxyethyl methacrylate) (PHEMA), 2-hydroxyethyl methacrylate (HEMA), poly(2-hydroxypropyl methacrylate) (PHPMA), poly(N-isopropylacrylamide (PNIPAm), poloxamer (Pluronic®, ThermoFisher Scientific, Inc., Waltham, MA), acrylate-modified PEG, acrylate-modified hyaluronic acid, amine end-functionalized 4-arm star-PEG, poly(ethylene glycol) diacrylate (PEGDA), poly(vinyl alcohol (PVA), polyvinylpyrrolidone (PVP), acrylamide/acrylic acid copolymer, linear cationic polyallylammonium chloride, poly(N-isopropyl acrylamide) (PNIPAM), or any combination thereof. In some embodiments, the biodegradable hydrogel comprises degradable polyethylene glycol (PEG), polypropylene fumarate-PEG (PPF-PEG), poly(2-hydroxyethyl methacrylate-poly(E-caprolactone (PHEMA-PCL), methacrylic acid (MAA), PEG-PEGMA, carboxymethyl cellulose (CMC), synthetic peptides, or any combination thereof. In some embodiments, the bioactive hydrogel comprises a cell-adhesive hydrogel, an enzyme-sensitive hydrogel, a growth factor-bearing hydrogel, another bioactive hydrogel, or any combination thereof. In some embodiments, the synthetic/natural hybrid hydrogel comprises PEG/dextran, heparin, HA, chondroitin sulfate (CS), one or more proteins, PNIPAm/proteins, chitosan, alginate, synthetic peptides/proteins, polysaccharides, PVA/DNA, Pluronic/dextran, PHPMA/protein, or any combination thereof.

In some embodiments, a sample described herein comprises a nucleic acid. In some embodiments, a sample comprises nucleic acid bound or tethered directly or indirectly to a surface.

In some embodiments, a sample comprises nucleic acid in solution. In some embodiments, a sample comprises nucleic acid is connected to a hydrogel. In some embodiments, a sample comprises nucleic acid in a scaffold. In some embodiments, the nucleic acid is attached directly or indirectly to a synthetic matrix. In some embodiments, the synthetic matrix comprises a bead or semi-solid gel.

Analysis using methods described herein can be applied to an immobilized nucleic acid. In some embodiments, the immobilized nucleic acid is fixed to a substrate. In some embodiments, the fixation is via formalin/formaldehyde treatment. In some embodiments, the fixation is via ethanedial or oxalaldehyde treatment. In some embodiments, the fixed nucleic acids are present in tissue that has been formalin-fixed and paraffin-embedded (FFPE), paraformaldehyde (PFA) fixed, or fixed using PFA with Triton X-100 (PFA-Tx). Analysis using methods described herein can be applied to any fixed nucleic acid. Described methods can be used to characterize nucleic acids, proteins, or any combination thereof.

Fixed nucleic acids can be conjugated to an affinity molecule or immobilized to a scaffold, a substrate, a surface, a bead, or a column. Methods described herein can be used to profile in situ hybridization (ISH) probes, DNA conjugated to antibodies, DNA encoded libraries, CRISPR libraries, viral libraries and/or genomes, nucleic acids covalently linked to cleared hydrogels, nucleic acid conjugated proteins, nucleic acids localized on a surface (e.g., glass slide or micro-array), or in situ generated sequences (e.g., by in vitro transcription (IVT)).

In some embodiments, the fixed nucleic acid is conjugated to an affinity molecule. In some embodiments, an affinity molecule comprises a component of a ligand/receptor complex. In some embodiments, an affinity molecule comprises an antibody or component thereof. In some embodiments, the antibody component is an antibody fragment, a nanobody, or other affinity reagent. In some embodiments, an antibody fragment, as described herein, is a F(ab')$_2$ fragment, an Fab' fragment, an Fab fragment, an Fv fragment, an IgG fragment, an Fc fragment, or any combination thereof. In some embodiments, the antibody is an IgA, IgG, or IgM antibody or a functional fragment thereof. In some embodiments, the affinity molecule is an aptamer, probe, siRNA, or peptide small molecule.

In some embodiments, the fixed nucleic acid is conjugated to a scaffold. In some embodiments, a scaffold is biodegradable. In some embodiments, a scaffold is non-biodegradable.

In some embodiments, a scaffold is biocompatible. In some embodiments, a scaffold comprises synthetic materials. In some embodiments, the synthetic materials comprise silicone, polylactic acid (PLA), polyglycolic acid (PGA), polycaprolactone (PCL), poly-lactic-co-glycolic acid (PLGA), or any combination thereof. In some embodiments, the scaffold comprises natural materials. In some embodiments, the natural materials comprise derivatives of the extracellular matrix, collagen, fibrin, polysaccharides including chitosan or glycosaminoglycans (GAGs), or any combination thereof. In some embodiments, glycosaminoglycans (GAGs) comprise hyaluronic acid.

In some embodiments, the fixed nucleic acid is conjugated to a surface comprising a flexible material. In some embodiments, the flexible material comprises, without limitation, modified nylon, unmodified nylon, nitrocellulose, polypropylene or any combination thereof. In some embodiments, the surface comprises a rigid material. In some embodiments, the rigid material comprises, without limitation, glass, fuse silica, silicon, silicon dioxide, silicon nitride, plastics (for example, polytetrafluoroethylene, polypropylene, polystyrene, polycarbonate, and blends thereof, metals (for example, gold, platinum), or any combination thereof. Surfaces described herein may be fabricated from a material comprising silicon, polystyrene, agarose, dextran, cellulosic polymers, polyacrylamides, polydimethylsiloxane (PDMS), glass, or any combination thereof.

In some embodiments, the fixed nucleic acid is conjugated to a bead. In come embodiments, the bead is a magnetic bead. In some embodiments, the bead is an immunoaffinity bead.

Optimization

Additional steps may be applied to optimized hybridization or barcoding in analyzed samples. In some embodiments, a permeabilization step is performed on the sample. In some embodiments, no permeabilization is performed. In some embodiments, permeabilization occurs concurrently with fixation. In some embodiments, permeabilization is performed following fixation. In some embodiments, a permeabilization reagent comprises acetone, alcohol, detergent, or any combination thereof.

Fixation may impact protein biochemistry in some cases, masking an epitope or binding site. Methods described herein can provide for unmasking of a binding site, making it more available for binding. In some embodiments, a sample described herein is further treated with an antigen retrieval method. In some embodiments, the antigen retrieval method is protease-induced epitope retrieval (PIER). PIER treatment can utilize enzymes such as proteinase K, trypsin, or pepsin to unmask antigens in a sample. In some embodiments, the antigen retrieval method is heat-induced epitope retrieval (HIER). Samples can be heated using a microwave, pressure cooker, steamer, autoclave, heat block, hot plate, water bath, or another heat source. HIER-treated samples can be heated from 50° C. to 120° C. In some embodiments, the samples are heated from 75° C. to 100° C. In some embodiments, the samples are heated to about 50° C., about 55° C., about 60° C., about 65° C., about 70° C., about 75° C., about 80° C., about 85° C., about 90° C., about 95° C., about 100° C., about 105° C., about 110° C., about 115° C., or about 120° C. In some embodiments, the antigen retrieval method is any other method capable of reversing the masking of an epitope. In some embodiments, the antigen retrieval step is combined with a permeabilization step.

In some embodiments, the antigen retrieval step is performed independently. Additional treatment may be performed in conjunction with epitope retrieval. For example, paraffin-embedded samples may be de-paraffinized prior to PIER or HIER. Deparaffinization can be achieved with application of an organic solvent, for example xylene, naphthenic solvents, d-limonenes, or any appropriate solvent.

Barcoding

Barcoding can be applied directly to a target in a sample, to a transcription product of a sample, to a reverse transcribed product of a sample, or to another element (e.g., antibody) that specifically binds to the target or to the transcription product of a sample. A target, as described herein, can be anything to which a specific binding product can be applied. Specific binding can be affinity binding, hybridization, ligand/receptor binding, aptamer binding, immunobinding, or any other type of specific binding or combination thereof. In some embodiments, a nucleic acid in a sample is transcribed to generate a target nucleic acid. In some embodiments, the sample nucleic acid is an mRNA. In some embodiments, the target nucleic acid is DNA. In some embodiments, the DNA is nuclear DNA. In some embodiments, the DNA is mitochondrial DNA. In some embodiments, the target nucleic acid is RNA. In some embodiments, the target nucleic acid is an intron. In some embodiments, the target nucleic acid is an exon. In some embodiments, the RNA is messenger RNA (mRNA). In some embodiments, the target nucleic acid is a regulatory RNA.

In some embodiments, the RNA is circular RNA (circRNA), ribosomal RNA (rRNA), 16S ribosomal RNA (16S rRNA), transfer RNA (tRNA), small nucleolar RNA (snoRNA), small nuclear RNA (snRNA), a non-coding RNA, long non-coding RNA (lncRNA), or microRNA (miRNA).

In some embodiments, the target nucleic acid is an amplification product. Nucleic acid amplification can be carried out at constant temperature ("isothermal"), to reduce the use of complex external equipment. In some embodiments, the target nucleic acid is generated by isothermal amplification. In some embodiments, isothermal amplification is performed at ambient temperature and/or room temperature. In some embodiments, ambient temperature and/or room temperature is about 20° C. to 25° C. In some embodiments, the isothermal amplification is rolling circle amplification (RCA), Loop-Mediated Isothermal Amplification (LAMP), Helicase-Dependent Amplification (HDA), Multiple Displacement Amplification (MDA), Recombinase Polymerase Amplification (RPA), Nucleic Acid Sequence-Based Amplification (NASBA). In some embodiments, the target nucleic acid is generated by signal amplification by exchange reaction (SABER). In some embodiments, the target nucleic acid is generated from a synthesis reaction. In some embodiments, the target nucleic acid is generated by a primer exchange reaction (PER) or RCA. In some embodiments, the PER is a Terminal deoxynucleotidyl transferase (Tdt)-based PER assay. In some embodiments, the target nucleic acid is a long repetitive single-stranded RNA or DNA sequence. In some embodiments, the amplification is performed at multiple temperatures, for example in a cycle. In some embodiments, the amplification is performed using non-isothermal, linear, or exponential amplification methods. In some embodiments, the amplification is PCR. In some embodiments, the PCR is asymmetric PCR. In some embodiments, the amplification is isothermal. Example isothermal amplification methods include strand-displacement amplification (SDA), rolling-circle amplification (RCA), whole-genome amplification (WGA), loop-mediated isothermal amplification (LAMP), helicase-dependent amplification (HDA), and multiple displacement amplification (MDA).

In some embodiments, the target nucleic acid is conjugated to a molecule. In some embodiments, the target nucleic acid and/or a molecule conjugated to said target nucleic acid is detected by a proximity ligation assay (PLA). PLA permits detection of protein-protein interactions in situ at distances of about less than 40 nanometers. In some embodiments, the target nucleic acid is a PLA oligonucleotide. In some embodiments, a barcode nucleic acid provided herein further comprises a PLA oligonucleotide. In some embodiments, the target nucleic acid comprises a first PLA oligonucleotide, wherein the first PLA oligonucleotide is conjugated to a first protein of interest. In some embodiments, the first PLA oligonucleotide hybridizes to a second PLA oligonucleotide, wherein the second PLA oligonucleotide is conjugated to a second protein of interest. In some embodiments, the first protein of interest or the second protein of interest are selected from the group consisting of: an antibody, an antibody fragment, a cell surface receptor, a cell surface protein, and intracellular protein, a mitochondrial protein, a nuclear protein, a transcription factor, or a scaffold protein. In some embodiments, the first PLA oligonucleotide and the second PLA oligonucleotide are ligated to form a circular DNA. In some embodiments, the circular DNAs are amplified. In some embodiments, the circular DNA comprises a barcode strand provided herein. In some embodiments, the circular DNA is contacted with a barcode strand provided herein. In a PLA reaction, the barcodes can be used to identify particular protein-protein or nucleic acid and protein interactions within a sample.

In some embodiments, a target nucleic acid is exposed to a DNA or RNA polymerase. In some embodiments, a polymerase refers to an enzyme that performs template-directed synthesis of polynucleotides. In some embodiments, a DNA polymerase is isolated or derived from *Pyrococcus furiosus, Thermococcus litoralis*, and *Thermotoga maritime*, or modified versions thereof. In some embodiments, polymerase enzymes include, but are not limited to: Klenow fragment (New England Biolabs Inc.), Taq DNA polymerase (QIAGEN), 9° N™ DNA polymerase (New England Biolabs Inc.), Deep Vent™ DNA polymerase (New England Biolabs Inc.), Manta DNA polymerase (Enzymatics), Bst DNA polymerase (New England Biolabs Inc.), or phi29 DNA polymerase (New England Biolabs Inc.). In some embodiments, a polymerase is DNA-dependent. In some embodiments, a polymerase is RNA-dependent. In some embodiments, the polymerase is reverse transcriptase.

In some embodiments, the primer is attached to an affinity molecule, a scaffold, a substrate, a surface, a bead, or a column. In some embodiments, the primer is in suspension, in solution, or in a hydrogel.

Reverse Transcription

Generation of cDNA complementary to target mRNA can comprise in situ reverse transcription. In some embodiments, in situ reverse transcription comprises incorporation of a primer. In some embodiments, a primer describes a short nucleic acid sequence. In some embodiments, the primer is DNA. In some embodiments, the primer is RNA. In some embodiments, the primer has a region complementary to a strand of DNA or RNA. In some embodiments, the primer provides a free 3-OH at which a DNA polymerase starts synthesis of a deoxyribonucleotide chain. In some embodiments, the primer contains from about 5 to about 50 or more nucleotides. In some embodiments, the primer contains about 10 to about 30 nucleotides. In some embodiments, a primer as described herein comprises the 3' sequence N,NNNNN (7N's), NNNNNGGG (5N's and 3G's), NNNNNCCC (5N's and 3C's), NNNNNAAA (5N's and 3A's), or NNNNNTTT (5N's and 3T's).

In some embodiments, an overhang is added to the cDNA by adding a poly-A tail. In some embodiments a 3' overhang is added to the cDNA transcript. In some embodiments a 5' overhang is added to the cDNA transcript. In some embodiments, tailing is achieved through the use of a terminal transferase enzyme and dXTP (dATP, dCTP, dGTP, dTTP, or any combination thereof). Adding ddXTP (ddATP, ddCTP, ddGTP, ddTTP, or any combination thereof) or another terminating nucleotide at the 3' end or 5' end prevents subsequent extension during the later cross-junction synthesis step. In some embodiments, ddXTP or another terminating nucleotide is included at a low concentration to randomly terminate the 3' end or 5' end. In some embodiments, other strategies are used to add a 3' or 5' overhang. In some embodiments, an overhang is added by ligation. In some embodiments, an overhang is added by extension.

Target Binding

As described in FIG. 1B, barcoding of a sample comprises target binding. In some embodiments, the target binding is affinity binding. Affinity binding can comprise binding to a ligand, an epitope, an aptamer, a protein, a receptor, a small molecule, or any other specific recognition binding. In some embodiments, the target binding is hybridization. Hybridization can comprise hybridization of nucleic acid strands, including but not limited to deoxyribonucleic acid (DNA) strands, ribonucleic acid (RNA) strands, peptide nucleic acid (PNA) strands, locked nucleic acid (LNA) strands, and combinations thereof. For example, hybridization can comprise hybridization of RNA to RNA, DNA to DNA, LNA to LNA, RNA to DNA, RNA to PNA, RNA to LNA, DNA to LNA, DNA to PNA, PNA to PNA, etc.

In some embodiments, a target is recognized by an antibody, antibody fragment, protein, peptide, nanobody, small molecule, nucleic acid, probe, aptamer, siRNA, lipid, nanoparticle, lipid nanoparticle or other affinity reagent.

Barcodes

Provided herein are methods of information labeling with nucleic acids. Information labeling, as described herein, provides nongenetic information. In some embodiments, nongenetic information comprises spatial information in a sample. In some embodiments, a sample is a 2-dimensional sample. In some embodiments, a sample is a 3-dimensional sample. In some embodiments, nongenetic information comprises sample information, such as tube number, well number, sample source, charge, mass, or other sample characteristics, or any combination thereof. In some embodiments, nongenetic information comprises digital information. Methods provided herein allow for deposition of barcodes onto a surface. Such barcodes can convey information about the identity of the target, substrate, timing, location, intensity, charge, affinity, etc. As such, the barcode provides for a nucleic acid medium for digital information storage. Barcodes further comprise, in some embodiments, a unique molecular identifier (UMI).

In some embodiments, a population of cells for analysis as provided herein are live cells. In some embodiments, the live cells are contacted directly with a barcode sequence, or indirectly via a linking molecule. In some embodiments, the linking molecule binds to cell surface receptors. In some embodiments, the linking molecule binds a cell surface molecule. In some embodiments, the cell surface molecule is a protein or nucleic acid. The nucleic acid may be RNA or DNA. The protein may be a cell receptor. In some embodiments, the cell surface molecule is located at cell adhesion points. In some embodiments, barcode sequences are introduced intracellularly into live cells. In some embodiments, barcode sequences are attached to lipid nanoparticles (LNPs) as carriers for delivery into the cell. In some embodiments, cells are transfected or transformed to receive barcode sequences. In some embodiments, cells are mechanically perturbed to enable cellular uptake of barcode sequences.

In some embodiments described herein, methods comprise barcoding a target in a sample. In some embodiments, the target is a nucleic acid, a protein, an antigen, a lipid, a sugar, a cellular structure, a scaffold, or any combination thereof. In some embodiments, the target is a nucleic acid and is generated in situ. In some embodiments, cDNA is generated from nucleic acid in a sample through in situ transcription. In some embodiments, the in situ transcription is reverse transcription. In some embodiments, RNA is generated in situ from partially or completely double-stranded DNA through transcription.

Barcodes provided herein generally encode non-genetic data. In some embodiments, the barcode strand is a single-stranded nucleic acid. Introduction of hybridization domains to the barcode strand allows for arbitrary arrangement of barcodes through iterative hybridization, crosslinking, and washing steps. In some embodiments, the nucleic acid barcode strand comprises a barcode domain. In some embodiments, the barcode domain is about 5 to about 10 bases in length. In some embodiments, the barcode domain is flanked by a set of two alternating hybridization domains. In some embodiments, the barcode domain is flanked by distinct hybridization domains. In some embodiments, the barcode domain is flanked by an alternating set of 3, 4, 5, 6 or more hybridization domains. In some embodiments, a hybridization domain is a crosslinking domain. In some embodiments, a hybridization domain is a complementary strand. In some embodiments, a set of two alternating hybridization domains comprise one crosslinking strand and one complementary strand. In some embodiments, a nucleic acid barcode comprises a barcode domain linked to (i) a crosslinking strand that comprises a photo-activated nucleotide and (ii) a complementary strand. In some embodiments, the alternating hybridization domains can be at least 5, at least 10, at least 15, or at least 20 bases in length. In some embodiments, the alternating hybridization domains comprise bases to hybridize to a hybridization domain of a second nucleic acid barcode. In some embodiments, a crosslinking strand of one nucleic acid barcode hybridizes with a complementary strand of another.

Methods for barcode deposition provided herein include, without limitation, application of a force to transfer barcodes from a reservoir to the sample. Example forces for application include laminar pressure, capillary pressure, slip flow pressure, magnetic force, electrostatic force, peristaltic force, acoustic force, vibrational force, centripetal force, centrifugal force, or any combination thereof.

In some embodiments, a buffer exchange process is employed for barcode deposition. In some embodiments, an electrophoresis process is employed for barcode deposition. In such a process, migration of charged particles (e.g. nucleic acid barcode molecules) in an electric field is due to electrophoresis, and an electrode is near the substrate comprising cells. In some embodiments, electrophoresis is applied to remove a nucleic acid from a surface. In some embodiments, electrophoresis is applied to remove a concatemer described herein from a surface. The electrode may create a uniform field across a surface, or specific electrodes may be used for each region of interest. In some embodiments, a temperature change is employed for barcode disposition. In further embodiments, the barcode sequences comprise a temperature sensitive feature and an increase in temperature can render available a hybridization region unavailable at a lower temperature. In some embodiments, a ROI comprises a warming unit or electrode adjacent to the ROI sufficient to increase temperature at the ROI. In some embodiments, the barcodes comprise a melting temperature and the ROI is heated to reach the barcode melting temperature, thereby allowing for selective hybridization of the barcode(s).

Exemplary methods described herein may be further combined to incorporate any combination of described methods. For example, samples barcoded with iterative construction of barcodes can be further tagged using fractional barcoding methods described herein.

Nucleic acids described herein can be non-specifically or specifically conjugated to another molecule (e.g., a protein, an epitope, or another nucleic acid) in a sample. In some embodiments, the barcode is conjugated to the molecule. In some embodiments, a barcode comprises a nucleic acid conjugated to an antibody, antibody fragment, protein, peptide, nanobody, small molecule, nucleic acid therapeutic, probe, aptamer, siRNA, lipid, nanoparticle, lipid nanoparticle or other affinity reagent. In some embodiments, an antibody fragment, as described herein, is an F(ab')$_2$ fragment, an Fab' fragment, an Fab fragment, an Fv fragment, an IgG fragment, an Fc fragment, or any combination thereof. In some embodiments, the lipid is an emulsion, a liposome, a particle, or any combination thereof. In some embodiments, the antibody is an IgA, IgG, or IgM antibody or a functional fragment thereof. In some embodiments, the tissue samples or population of cells provided herein are imaged after barcoding.

In some embodiments, barcodes provided herein are deposited onto a sample with a concentration from about 20 nM to about 500 nM. In some embodiments, barcodes described herein are deposited onto a sample with a concentration up to about 1 nM, 10 nM, 20 nM, 100 nM, 250 nM, 500 nM, 1000 nm, or more. Barcode binding to a target region may be stable or transient.

In some embodiments, a nucleic acid barcode domain is about 5-10 bases in length. In some embodiments, a nucleic acid barcode domain is 4, 5, 6, 7, 8, 9, 10 or more bases in length. In some embodiments, a nucleic acid barcode domain is about 10 or about 10-15 bases in length. Individual barcode domains can be assigned a bit value of '0' or '1'. In some embodiments a concatenated string of nucleic acid barcodes is equivalent to a string of 0's and 1's.

Light-Directed Crosslinking

Nucleic acid barcode strands can be concatenated and covalently fixed together by a photo-chemical crosslinking reaction. In some embodiments, the crosslinking reaction is light driven. In some embodiments, the crosslinking reaction is chemically driven. In some embodiments, the crosslinking reaction is pH driven. In some embodiments, the crosslinking reaction can be performed in aqueous solution. In some embodiments, a photoreactive crosslinker is used in the reaction. In some embodiments, a photoreactive nucleobase is used in the reaction. In such embodiments, crosslinking strands of nucleic acid barcodes comprise at least one photo-reactive nucleobase. In some embodiments, the photo-reactive nucleobase can be any modified nucleobase that is capable of forming a crosslink with another nucleobase in the presence of light. In some embodiments, the photo-reactive nucleobase is a modified pyrimidine or purine nucleobase. In some embodiments, the photo-reactive nucleobase comprises 2-hydroxycarbazole, 3-cyanovinylcarbazole phosphoramidite (CNVK) or 3-cyanovinylcarbazole modified d-threoninol (CNVD). In some embodiments, the photo-reactive nucleobase comprises a vinyl, acrylate, N-hydroxysuccinimide, amine, carboxylate or thiol chemical group. In some embodiments, the photo-reactive nucleobase comprises a bromo-deoxyuridine. In some embodiments, the CNVK crosslinking base displays highest crosslinking efficiency with a thymine (T) base that is positioned adjacent to the base on the complementary strand and can be directly incorporated into the DNA hybridization domain itself as a base substitution.

Figure 3:
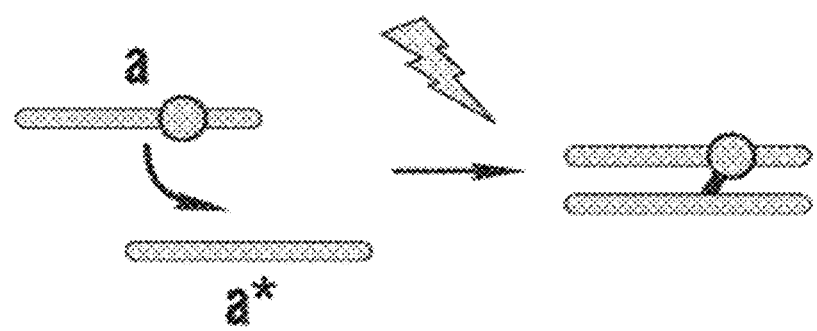
FIG. 3 illustrates the light-directed crosslinking reaction as described herein.

Nucleic acid barcode strands can be concatenated and covalently fixed together by a photo-chemical crosslinking reaction. In some embodiments, the crosslinking reaction is light driven. In some embodiments, the crosslinking reaction is chemically driven. In some embodiments, the crosslinking reaction is pH driven. In some embodiments, the crosslinking reaction can be performed in aqueous solution. In some embodiments, a photoreactive crosslinker is used in the reaction. In some embodiments, a photoreactive nucleobase is used in the reaction. In such embodiments, crosslinking strands of nucleic acid barcodes comprise at least one photo-reactive nucleobase. In some embodiments, the photo-reactive nucleobase can be any modified nucleobase that is capable of forming a crosslink with another nucleobase in the presence of light. In some embodiments, the photo-reactive nucleobase is a modified pyrimidine or purine nucleobase. In some embodiments, the photo-reactive nucleobase comprises 2-hydroxycarbazole, 3-cyanovinylcarbazole phosphoramidite (CNVK) or 3-cyanovinylcarbazole modified d-threoninol (CNVD). In some embodiments, the photo-reactive nucleobase comprises a vinyl, acrylate, N-hydroxysuccinimide, amine, carboxylate or thiol chemical group. In some embodiments, the photo-reactive nucleobase comprises a bromo-deoxyuridine. In some embodiments, the CNVK crosslinking base displays highest crosslinking efficiency with a thymine (T) base that is positioned adjacent to the base on the complementary strand and can be directly incorporated into the DNA hybridization domain itself as a base substitution. In some embodiments, a crosslinking reaction is performed using 365 nm wavelength of light and is completed within 1 second, as depicted in FIG. 3. In some embodiments, a plurality of photo-crosslinker molecules are incorporated, such that different barcodes comprise different photo-crosslinker molecules capable of crosslinking at different wavelengths. Such variance in the barcodes allows for methods varying crosslinking events at one or more regions of interest. In some embodiments, a reverse crosslinking reaction is performed. For example, application of a wavelength of 312 nm for a few minutes can provide for crosslink reversal. In some embodiments, a series of crosslink-then-decrosslink reactions is performed to form concatemers. In some embodiments, molecules are deposited on a substrate provided herein to locally generate a light wavelength to support the light sensitive crosslinking reaction.

In some embodiments, radiation is provided at a particular wavelength or range of wavelengths. A crosslinking reaction can be designed to use any wavelength of visible or ultraviolet light. In some embodiments, the radiation is ultraviolet (UV) radiation. In some embodiments, the radiation is provided at wavelengths in a range from about 300 nanometers (nm) to about 450 nm. In some embodiments, the radiation is provided at a wavelength of about 300 nm, about 305 nm, about 310 nm, about 315 nm, about 320 nm, about 325 nm, about 330 nm, about 335 nm, about 340 nm, about 345 nm, about 350 nm, about 355 nm, about 360 nm, about 365 nm, about 370 nm, about 375 nm, about 380 nm, about 385 nm, about 390 nm, about 395 nm, about 400 nm, about 405 nm, about 410 nm, about 415 nm, about 420 nm, about 425 nm, about 430 nm, about 435 nm, about 440 nm, about 445 nm, about 450 nm, or any combination thereof. In some embodiments, the radiation is provided at a wavelength of about 365 nm. In some embodiments, the radiation is provided at a wavelength of about 405 nm.

In some embodiments, radiation is provided for a particular amount of time. In some embodiments, the radiation is provided for about 1 second up to 10 seconds. In some embodiments, the radiation is provided for about 100 milliseconds (ms) up to 10 seconds. In some embodiments, the radiation is provided for at least about 10 ms or more, at least about 100 ms or more, at least about 500 ms or more, at least about 600 ms or more, at least about 700 ms or more, at least about 800 ms or more, at least about 900 ms or more, at least about 1 second or more, at least about 2 seconds or more, at least about 3 seconds or more, at least about 4 seconds or more, at least about 5 seconds or more, at least about 6 seconds or more, at least about 7 seconds or more, at least about 8 seconds or more, at least about 9 seconds or more, at least about 10 seconds or more, at least about 11 seconds or more, at least about 12 seconds or more, at least about 13 seconds or more, at least about 14 seconds or more, at least about 15 seconds or more, at least about 16 seconds or more, at least about 17 seconds or more, at least about 18 seconds or more, at least about 19 seconds or more, at least about 20 seconds or more, or at least about 30 seconds or more. In some embodiments, a crosslinking reaction can be completed within 0.01, 0.1, 0.25, 0.5, 1, 5, or 10 seconds. In some embodiments, a crosslinking reaction can be completed within 0.5, 1, 5, 10, 20, 30, 40, 50, or 60 minutes.

In some embodiments, a crosslinking reaction is performed using 365 nm wavelength of light and is completed within 1 second, as depicted in FIG. 3. In some embodiments, a plurality of photo-crosslinker molecules are incorporated, such that different barcodes comprise different photo-crosslinker molecules capable of crosslinking at different wavelengths. Such variance in the barcodes allows for methods varying crosslinking events at one or more regions of interest. In some embodiments, a reverse crosslinking reaction is performed. For example, application of a wavelength of 312 nm for a few minutes can provide for crosslink reversal. In some embodiments, a series of crosslink-then-decrosslink reactions is performed to form concatemers. In some embodiments, molecules are deposited on a substrate provided herein to locally generate a light wavelength to support the light sensitive crosslinking reaction.

In some embodiments, a crosslinking reaction has negligible effects on bases that neighbor the photoreactive nucleobase. In some embodiments, other photochemical nucleic acid crosslinking agents, including psoralen are used in combination with nucleic acid barcodes.

Figure 4:
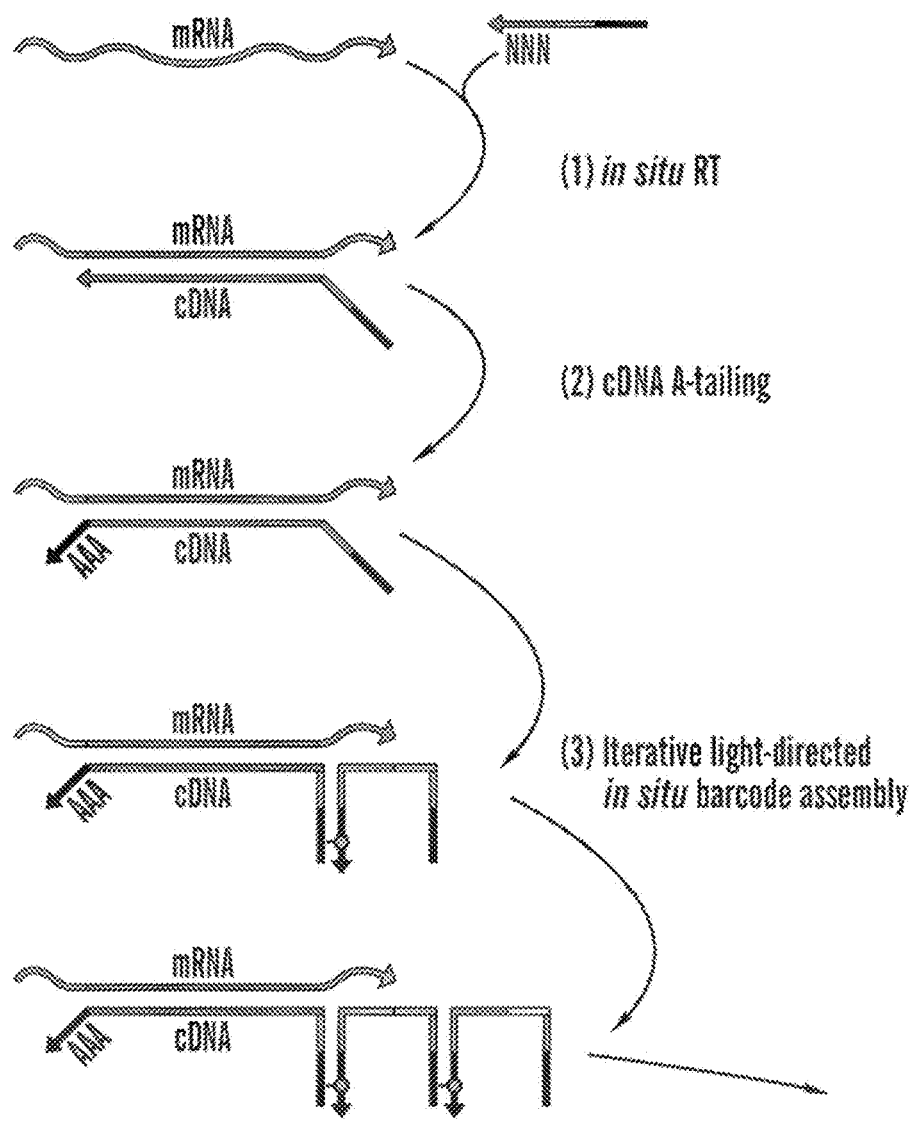
FIG. 4 illustrates an iterative barcode addition method, wherein barcode strands are added to the 5' end of a cDNA.

In some embodiments, a crosslinking reaction is applied to a nucleic acid barcode strand hybridized to the 5' end of a cDNA. In some embodiments, a crosslinking reaction is applied to a nucleic acid barcode strand hybridized to the 3' end of a cDNA. In some embodiments, additional barcode strands are iteratively added to either the 5' or 3' end of the cDNA-nucleic acid barcode structure, using binding and crosslinking as previously described. FIG. 4 shows a process comprising iterative addition of barcode strands to the 5' end of a cDNA according to methods described herein. In some embodiments, a crosslinking reaction occurs concurrently with hybridization.

Cycles of hybridization and crosslinking can be repeated without washing steps to remove barcode strands that are not crosslinked. In such embodiments, barcode strands are designed with different or alternating hybridization domains, such that only the subsequently added barcode strands will hybridize and crosslink to the existing target/barcode concatemer.

A crosslinking strand, in some embodiments, is a single-stranded nucleic acid that is 200 nucleotides or fewer in length. In some embodiments, a crosslinking strand may be 5-100, 5-75, 5-50, 5-25, 5-15, or 5-10 nucleotides in length. In some embodiments, a crosslinking strand may be 10-100, 10-50, 10-25, 10-20, 15-25, or 15-25 nucleotides in length. In some embodiments, a crosslinking strand may be 5, 6, 7, 8, 9, or 10 nucleotides in length. In some embodiments, a crosslinking strand comprises at least one photoreactive nucleotide. In some embodiments, a crosslinking strand comprises at least one 3-cyanovinylcarbazole nucleoside (CNVK) or 3-cyanovinylcarbazole modified d-threoninol (CNVD) nucleotide. In some embodiments, a crosslinking strand is complementary to a complementary strand, wherein the crosslinking strand is a component of a first nucleic acid barcode and the complementary strand is a component of a second nucleic acid barcode. In some embodiments, a crosslinking strand is DNA or RNA. In some embodiments, crosslinking strands are further functionalized with moieties such as fluorophores, quantum dots, biotin, streptavidin, functional chemical groups, acrydite, maleimide, lipids, metal isotopes, other tags (e.g., antibodies), or nanoparticles.

In some embodiments, a nucleic acid barcode strand is at least 15, 20, 25, 30, 40, 50, 60, 70, 80, 90, or 100 nucleotides in length. In some embodiments, a nucleic acid barcode strand is 20 nucleotides in length. In some embodiments, a nucleic acid barcode strand comprises a barcode domain that is from 2 to 10 nucleotides in length, a crosslinking strand that is from 2 to 12 nucleotides in length, and a complementary strand that is from 2 to 12 nucleotides in length. In some embodiments, a nucleic acid barcode strand comprises a structure in the 5' to 3' direction: 5'-crosslinking strand-to-barcode domain-to-complementary strand-3'. In some embodiments, the nucleic acid barcode strand comprises a structure in the 5' to 3' direction: 5'-complementary strand-to-barcode domain-to-crosslinking strand-3'.

A crosslinking strand can be designed to stably bind or transiently bind to a complementary strand. In some embodiments, a crosslinking strand can be covalently or non-covalently bound to a complementary strand. In some embodiments, a crosslinking strand can be complementary to a complementary strand. A crosslinking strand can be at least 20%, at least 30%, at least 40%, at least 50%, at least 60%, at least 70%, at least 80%, or at least 90% complementary to a complementary strand. Further, a crosslinking strand may bind to a complementary domain of a different nucleic acid barcode. In some embodiments, a crosslinking strand may bind to a complementary domain of a nucleic acid that comprises its own crosslinking strand but does not comprise a barcode strand.

Region Selection

Provided herein are methods, wherein cells (or subcellular compartments such as nuclei) of a sample are sorted by defined characteristics prior to or after barcoding or tagging. In some embodiments, cells are sorted prior to every iteration of barcoding. In some embodiments, cells are sorted prior to any barcoding steps. In some embodiments, cells are sorted after all barcoding steps. In some embodiments, cells are sorted in one step based on a characteristic, for example surface receptor. In further embodiments, cells are sorted in a second step based on a second characteristic, for example gene expression. In some embodiments, cells are sorted based on a first characteristic and barcoded using methods described herein. In a further embodiment, barcoded cells are further sorted based on a second characteristic and optionally further barcoded.

Provided herein are methods for nucleic acid barcoding comprising cell sorting. Cell sorting, in some embodiments, is performed using fluorescent activated cell sorting (FACS) analysis. In some embodiments, cell sorting is performed with a microfluidic device. In some embodiments, cell sorting is performed using flow cytometry. In some embodiments, cell sorting is performed using magnetic cell sorting. In some embodiments, nuclei or multi-cellular arrangements are sorted rather than individual cells.

In some embodiments, sample imaging provides a basis for identification of cellular regions of interest (ROI). An ROI, in some embodiments, comprises an area of a sample targeted for spatially defined barcoding of cDNAs. In some embodiments, the ROI is based on morphology of a sample, for example cells, cellular structures, tissue layers, or sub-cellular structures. In some embodiments, the ROI has a regular or irregular boundary. In some embodiments, the ROI describes a boundary for spatially-defined barcoding in a sample. In some embodiments, the ROI is grid-based. In some embodiments, the ROI is in two dimensions (2D). In some embodiments, the ROI is in three dimensions (3D).

In some embodiments, barcodes are deposited to an ROI in a preselected pattern across a surface provided herein. In some embodiments, the pattern forms a grid of repeating shapes spanning a region or alternating shapes are preselected for barcode deposition. In some embodiments, the pattern forms a grid of repeating shapes spanning a region and less than all shapes are preselected for barcode deposition. In some embodiments, the shapes are squares, rectangles, triangles, ovals, diamonds, or spheres. In other embodiments, the shapes can be complex geometric or non-geometric patterns (e.g., the outline of a tissue or cellular feature, alpha-numeric characters).

Light-directed crosslinking is, in some embodiments, selectively applied to a sample of cells. Crosslinking is selectively performed by shielding areas from radiation, allowing crosslinking only in unshielded areas. A photomask provides a template to shield areas of a sample that receive radiated light. In some embodiments, a photomask is generated to allow radiation of one or more regions of interest (ROIs). In some embodiments, the photomask is manually or machine generated. In some embodiments, one or more photomasks are generated. In some embodiments, a photomask is generated relevant to each ROI. In some embodiments, the photomask is generated according to sample imaging as previously described herein. In some embodiments a photomask is applied to a sample prior to radiation. In some embodiments, each crosslinking step comprises a different photomask. In some embodiments, multiple crosslinking steps use the same photomask.

ROIs define areas for crosslinking of one or more targets within the sample. In some embodiments, one or more ROIs define distinct areas. In some embodiments, one or more ROIs are congruent. In some embodiments, one or more ROIs are overlapping. In some embodiments, one or more ROIs are segregated. In some embodiments, one or more ROIs are not segregated.

In some embodiments, in addition or in lieu of a photomask, as described herein, light is focused on one or more ROIs. In some embodiments, light is focused using a digital micromirror device (DMD). In some embodiments, light is focused using a confocal microscope. In some embodiments, the confocal microscope is a laser scanning confocal microscope. In some embodiments, light is focused using a DVD writer. In some embodiments, light is focused using a Blu-ray disc writer. In some embodiments, a light source is an independent entity from another device, such as a microscope. In some embodiments, the light source is a laser. In some embodiments, the laser has a primary wavelength from about 180 nm to about 1 mm. In some embodiments, the laser has a primary wavelength from about 180 nm to about 400 nm. In some embodiments, the laser has a primary wavelength from about 400 nm to about 700 nm. In some embodiments, the laser has a primary wavelength from about 700 nm to about 1 mm.

An optical system used with methods described herein can provide for selective z-plane illumination. In some embodiments, the optical system can provide light in a z-plane that has from about 2 nm to about 10 µm resolution, from about 5 nm to about 9 µm resolution, from about 10 nm to about 8 µm resolution, from about 15 nm to about 7 µm resolution, from about 20 nm to about 6 µm resolution, from about 25 nm to about 5 µm resolution, from about 30 nm to about 4 µm resolution, from about 35 nm to about 3 µm resolution, from about 40 nm to about 2 µm resolution, from about 45 nm to about 1 µm resolution, from about 50 nm to about 800 nm resolution, from about 100 nm to about 600 nm resolution, from about 200 nm to about 400 nm resolution, or any range there between. In some embodiments, light in a z-plane has 10 µm or more resolution. In some embodiments, light is focused on a surface of the tissue samples or population of cells provided herein. In some embodiments, light is focused on a plane comprising at least one portion of the tissue samples or population of cells provided herein. In some embodiments, light is focused on one or more planar surfaces on or within the tissue samples or population of cells provided herein. In some embodiments, the light-directed crosslinking described herein is applied to a surface of the tissue samples or population of cells provided herein. In some embodiments, the light-directed crosslinking described herein is applied across multiple planes within the tissue samples or population of cells. In some embodiments, the light-directed crosslinking described herein is applied on multiple planes of a 3-dimensional tissue samples or population of cells provided herein. Exemplary devices for illumination restricted in a z-plane comprise a 2-photon microscope and a light sheet microscope.

In some embodiments, an optical system used with methods described herein can provide for selective xy-plane illumination. In some embodiments, the optical system can provide light in a xy-plane that has from about 2 nm to about 10 µm resolution, from about 5 nm to about 9 µm resolution, from about 10 nm to about 8 µm resolution, from about 15 nm to about 7 µm resolution, from about 20 nm to about 6 µm resolution, from about 25 nm to about 5 µm resolution, from about 30 nm to about 4 µm resolution, from about 35 nm to about 3 µm resolution, from about 40 nm to about 2 µm resolution, from about 45 nm to about 1 µm resolution, from about 50 nm to about 800 nm resolution, from about 100 nm to about 600 nm resolution, from about 200 nm to about 400 nm resolution, or any range there between. In some embodiments, light in a xy-plane has 10 µm or more resolution.

In some embodiments, a nucleic acid described herein is covalently linked to at least one other of nucleic acid through a single photoreactive element of a hybridization domain.

Fractional Barcoding

By radiating longer time duration or with higher intensity, the number of crosslinks formed in a 1D, 2D, or 3D region can be controllably increased in a specific region, cell, or on samples or strands in a test tube. Intensity is a radiometric quantity measured in watts per square centimeter (W/cm$^2$). Because radiation exposure time and power levels can be precisely controlled, the fraction of crosslinks formed within a specific area or volume can be precisely controlled (e.g., on a microscope, with an LED or other light source onto a sample or test tube). Such tuning allows for region specific photosensitive crosslinking of barcode events, thereby allowing for preselected gradation ("fractionation") for any given barcode (or tag) for affixing to a target within a particular region of interest (a tissue region, cell, subcellar region, microwell, tube, etc.). In some embodiments, the light intensity is about 1 to about 5000 W/cm$^2$. In some embodiments, the light intensity is up to about 1 W/cm$^2$. In some embodiments, the light intensity is up to about 5000 W/cm$^2$. In some embodiments, the light intensity is at least W/cm$^2$. In some embodiments, the light intensity is more than 5000 W/cm$^2$. The above intensities are for when intensity is focused on planar light. Similar intensities can be applied in 3D in which case W/cm$^3$ amounts are applied. When irradiating a solution, the volume of a sample is radiated. In such instances, intensity is applied per volume unit, such as with a UV gun.

The duration or power of the radiation exposure allows for controllable tuning the fraction of formed crosslinks in a particular region of interest (ROI). Otherwise stated, the fraction of sequences crosslinked to a barcode in a particular ROI can be controlled by the radiation exposure time or intensity level. In some embodiments, up to about 100% of barcodes are crosslinked following radiation. In some embodiments, 1, 5, 10, 15, 20, 25, 30, 40, 45, 50, 55, 60, 65, 70, 75, 80, 85, 90, 95, 99% or any percentage there between of barcode sequences in an ROI are photo crosslinked to target sequence(s) following radiation. In some embodiments, about 10% of barcodes in an ROI are photo crosslinked to one or more target sequences following radiation. In some embodiments, about 20% of barcodes in an ROI are photo crosslinked to one or more target sequences following radiation. In some embodiments, about 30% of barcodes in an ROI are photo crosslinked to one or more target sequences following radiation. In some embodiments, about 40% of barcodes in an ROI are photo crosslinked to one or more target sequences following radiation. In some embodiments, about 50% of barcodes in an ROI are photo crosslinked to one or more target sequences following radiation. In some embodiments, about 60% of barcodes in an ROI are photo crosslinked to one or more target sequences following radiation. In some embodiments, about 70% of barcodes in an ROI are photo crosslinked to one or more target sequences following radiation. In some embodiments, about 80% of barcodes in an ROI are photo crosslinked to one or more target sequences following radiation. In some embodiments, about 90% of barcodes in an ROI are photo crosslinked to one or more target sequences following radiation.

Duration or power of radiation, or both, can be modulated over a gradient to provide a graded series of increasing or decreasing fractions of barcoding reactions across one or more ROIs. A gradient of duration or power can range from 0% to 100%, from 0% to 50%, from 50% to 100%, from 0% to 20%, from 20% to 40%, from 40% to 60%, from 60% to 80% from 80% to 100%, from 0% to 35%, from 35% to 70%, from 70% to 100%, or any combination thereof or interval therein.

Barcoding can also be modulated through introduction of an amount of interfering nucleic acid strands in the solution during the hybridization step, the irradiation step, or both steps. In some embodiments, an interfering nucleic acid binds to a target nucleic acid to prevent a barcoding reaction. In some embodiments, an interfering nucleic acid binds to a barcode strand to prevent a barcoding reaction. Modulation of a barcoding reaction can be effected by varying the amount of added interfering nucleic acid strands. In some embodiments, the amount of interfering nucleic acid strands is a percentage of the calculated target nucleic acid in a sample. In some embodiments, the amount of interfering nucleic acid strands is a percentage of the added barcode strands. In some embodiments, the interfering nucleic acid strands are added in an amount of about 1% to about 1000% of either target nucleic acid or the barcode strands. In some embodiments, the interfering nucleic acid strands are added in an amount of about 1% to about 100%, about 100% to about 500%, about 500% to about 1000%, about 1T % to about 10%, about 10% to about 20%, about 20% to about 30%, about 40% to about 50%, about 50% to about 60%, about 60% to about 70%, about 70% to about 80%, about 80% to about 90%, about 90% to about 100% of either target nucleic acid or the barcode strands.

Populations of targets as described herein within a sample can be encoded for identification using one or more fractional application of barcodes. Binary, trinary, quaternary, or more, encodings can be used. In some embodiments, any combination of fractional application of distinct barcodes that allows for differentiation of barcode fractions can be used. Fractional barcodes can be read using sequencing techniques, fluorescence imaging, spectrophotometry, or any other detection method. In an exemplary embodiment, one ROI in a sample contains 40% of barcode 1+20% of barcode 2+20% of barcode 3, while another ROI contains 20% of barcode 1+40% of barcode 2+20% of barcode 3. In some embodiments, fractions do not add up to 100%. In some embodiments, fractions add up to 100%. In some embodiments, the fractions are differentiable and de-convolved.

Barcode Processing

Methods as described herein comprise application of reagents, including barcode strands, wash sequences, and the like, to a sample. In some embodiments, application methods comprise traditional microfluidics, passive diffusion, electrophoresis, digital microfluidics, acoustic liquid handlers (e.g., Echo Liquid Handler®, Beckman Coulter, Indianapolis, IN) for depositing new solutions, inkjet printers with modified contents, automatic liquid handlers, optionally incorporating pipettors, robotic arms for processing slides between solution baths, or any combination thereof. In some embodiments, application methods are performed on-stage of a device (e.g., microscope). In some embodiments, application methods are performed off-stage of a device (e.g., microscope).

In some embodiments, diffusion of nucleic acids are enhanced by addition of molecular crowding agents. In some embodiments, a crowding agent comprises a polymer, a protein, or any combination thereof. In some embodiments, the polymer comprises a polyethylene glycol. In some embodiments, the protein comprises a serum albumin, such as bovine serum albumin. In some embodiments, diffusion of nucleic acids are enhanced by heating the tissue samples or population of cells provided herein. In some embodiments, diffusion is enhanced by heating to more than 30° C., more than 35° C., more than 40° C., more than 45° C., more than 50° C. In some embodiments, diffusion is enhanced by heating to about 30° C., about 35° C., about 37° C., about 40° C., about 45° C., about 50° C.

Samples can be treated to prevent or reduce nonspecific binding of barcode strands. In some embodiments, a blocking agent is added to the tissue samples or population of cells provided herein prior to application of barcode strands. In some embodiments, a blocking agent is added to the tissue samples or population of cells provided herein concurrently to application of barcode strands. In some embodiments, the blocking agent comprises non-specific nucleic acid sequences, sheared salmon sperm DNA, tRNA, yeast tRNA, single-stranded oligonucleotides, double-stranded oligonucleotides, polysaccharides, charged polysaccharides, negatively charged polysaccharides, negatively charged molecules, charged molecules bovine serum albumin (BSA), dried milk, detergent, a nonionic polymeric surfactant (e.g., Poly (ethyleneoxide)/poly (propyleneoxide) triblock copolymers-PLURONIC™ F-127, Gibco® Pluronic® F-68), crowding agents, or any combination thereof. In some embodiments, ribosomal depletion or targeted depletion of high abundance sequences occurs prior to any of: reverse transcription, barcoding, sequence extraction, cross-junction synthesis, or PCR amplification. In some embodiments, ribosomal depletion or targeted depletion of high abundance sequences occurs after PCR amplification. In some embodiments, in situ hybridization (ISH) probes targeting high abundance sequences are included before or during reverse transcription to block specific high abundance sequences from acting as binding sites for reverse transcription primers. In some embodiments, ISH probe binding is combined with nuclease activity (e.g. RNaseH) to specifically digest high abundance sequences in situ prior to reverse transcription. In some embodiments, a double-strand specific nuclease (e.g. dsDNAse) is applied after PCR to specifically de-enrich high abundance sequences.

Following radiation and crosslinking reaction, in some embodiments, barcodes that are not crosslinked are removed. In some embodiments, barcodes that are not crosslinked are removed by washing. In some embodiments, barcodes that are not crosslinked are not removed prior to additional cycles of crosslinking. In some embodiments, a sample is washed with a chemical denaturant solution. In some embodiments, the chemical denaturant solution comprises one or more salts. In some embodiments, the salt is NaCl. In some embodiments, the salt concentration is from 0.1 M to 2 M. In some embodiments, the salt concentration is about 0.1 M, about 0.2 M, about 0.3 M, about 0.4 M, about 0.5 M, about 0.6 M, about 0.7 M, about 0.8 M, about 0.9 M, about 1.0 M, about 1.1 M, about 1.2 M, about 1.3 M, about 1.4 M, about 1.5 M, about 1.6 M, about 1.7 M, about 1.8 M, about 1.9 M, about 2.0 M. In some embodiments, the chemical denaturant is formamide. In some embodiments, the chemical denaturant is ethylene carbonate. In some embodiments, the formamide solution is 50-60% formamide. In some embodiments, the denaturant solution is in a PBS buffer. In some embodiments, the denaturant solution comprises a detergent. In some embodiments, the concentration of detergent in the denaturant solution is about 0.01%, about 0.05%, about 0.1%, about 0.5%, about 1.0%, about 2%, about 3%, about 4%, or about 5% by volume. In some embodiments, the detergent is a polysorbate. In some embodiments, the polysorbate is polysorbate 20 (TWEEN® 20, Merck KGaA, Darmstadt, Germany) or polysorbate 80 (TWEEN® 80, Merck KGaA, Darmstadt, Germany). In some embodiments, the detergent is a nonionic surfactant. In some embodiments, the non-ionic surfactant is a non-ionic polyoxyethylene detergent. In some embodiments, the detergent is polyethylene glycol (PEG), 2-[4-(2,4,4-trimethylpentan-2-yl)phenoxy]ethanol (CAS number: 9002-93-1), N,Ndimethyltetradecylamine N-oxide (TDAO, CAS number: 3332-27-2). In some embodiments, the detergent is Triton X-100, Nereid, TDAO, or a combination thereof. In some embodiments, the washing is performed at room temperature. In some embodiments, the washing is performed at a temperature warmer or cooler than room temperature. In some embodiments, the washing is performed at 4 degrees C., 16 degrees C., 25 degrees C., 37 degrees C., 40 degrees C., 45 degrees C., 50 degrees C., 55 degrees C., 60 degrees C., or higher temperature.

In Situ Hybridization

In some embodiments, in situ hybridization (ISH) is applied. The ISH step generally involves depositing small nucleic acids (e.g., 15-40 nucleotide oligomers). In some embodiments, nucleic acid probes recognize a region or regions of the genome. In some embodiments, the nucleic acid probes of ISH recognize RNA. In the case of single-molecule in situ hybridization (smISH), many small nucleic acids together recognize an RNA, where binding of a single probe results in weak signal, but the ability to obtain a signal from the ensemble of all the probes (directly or via linking of labels to the probes) results in a strong signal compared to the single probe binding. In some embodiments, an ISH, or modified ISH, reaction is applied to a sample described herein prior to or following antigen retrieval (e.g., an amplification reaction). In further embodiments, the probes used for ISH are further used for concatemer formation either as the barcode or for barcode binding, followed by methods described herein.

Figure 5A:
FIG. 5A illustrates light-directed crosslinking to generating barcode concatemers.
Figure 5B:
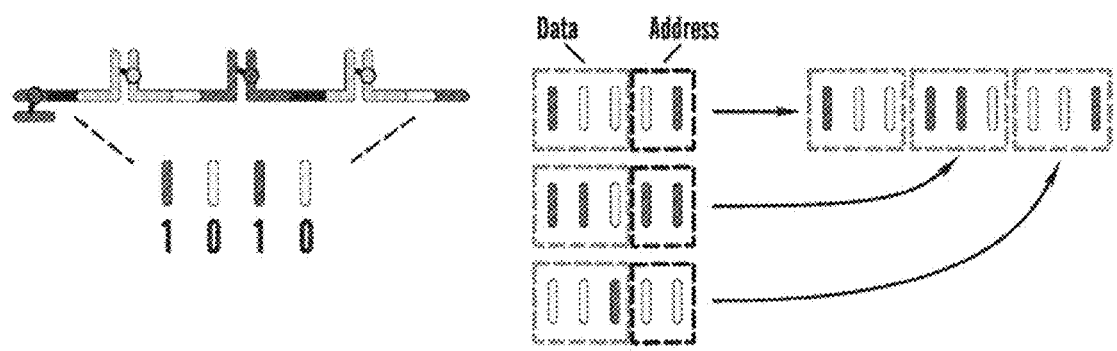
FIG. 5B illustrates data reconstruction from a barcode concatemer.

The iterative addition of nucleic acid barcodes to a cDNA can produce a nucleic acid concatemer. In some embodiments, nucleic acid concatemer comprises at least three nucleic acid barcode strands. A nucleic acid concatemer may comprise nucleic acid barcode strands that are covalently linked to one another via photoreactive nucleotides. In some embodiments, a nucleic acid concatemer may comprise at least 1, at least 2, at least 3, at least 4, at least 5, at least 6, at least 7, at least 8, at least 9, or at least 10 or more nucleic acid barcode strands. In some embodiments, a nucleic acid concatemer may comprise at least 1, at least 2, at least 3, at least 4, at least 5, at least 6, at least 7, at least 8, at least 9, or at least 10 or more barcode domains that each incorporate data (e.g., each barcode domain may uniquely/independently be assigned to a bit value). One embodiment of digital data storage using light-directed concatemerization of barcodes is shown in FIGS. 5A-5B. Concatemers of nucleic acid barcode can comprise at least two, at least three, at least four, at least five, at least ten, at least 15, at least 20, at least 25, at least 30, at least 50 nucleic acid barcodes, or any number of nucleic acid barcodes there between.

The number of additional barcode strands that can be added is not limited. For example, 1, 2, 3, 4, 5, 6, 7, 8, 9, 10, 11, 12, 13, 14, 15, 16, 17, 18, 19, 20, 21, 22, 23, 24, 25 or more additional barcode strands can be added. In some embodiments, 75, 100, 150, 200, 250 or more additional barcode strands can be added.

In some embodiments, CNVK-labeled strands can be hybridized to docking strands by 1 to 10 bases or by 10 to 20 bases. In some embodiments, salt concentrations, temperature, denaturant concentration, or strand concentration affects stability of strand binding. In some embodiments, stability of strand binding is adjusted such that CNVK-labeled strands bind for less than 1 second, between 1 and 10 seconds, or for less than 1 minute on average. In some embodiments, CNVK-labeled strands can have increased homology domains to docking strands. In some embodiments, a CNVK-labeled strand has homology across about 5, about 10, about 15, about 20, about 25, about 30, about 35, about 40, about 45, about 50, about 55, about 60, about 65, or more bases. In some embodiments, salt is increased, or temperature decreased, thereby adjusting strand binding on average for longer than one minute. In some embodiments, conditions can be adjusted to determine the average binding time of the CNVK-labeled strands to docking strands.

The concatemers of nucleic acid barcodes can be in various positions on the substrate as described herein. For example, concatemers can be in a linear relationship relative to each other, have two different orientations relative to the target, or multiple orientations in different directions. The barcodes can be positioned along x, y, and z coordinates in space.

In some embodiments, a concatemer described herein is linked to a protein. In further embodiments, a proteinase is applied to release the concatemer from the protein. In some embodiments, a barcode described herein is linked to a protein. In further embodiments, a proteinase is applied to release the barcode from the protein. An example proteinase for inclusion include, without limitation, proteinase K. In some embodiments, the proteinase is applied prior to an antigen retrieval reaction (e.g., reverse transcription), prior to a barcoding reaction, prior to a concatemerization reaction, and/or prior to the concatemer retrieval reaction.

Imaging

Nucleic acid barcodes optionally comprise additional detectable labels such as fluorophores, luminescent and bioluminescent markers (e.g., biotin, luciferase (e.g., bacterial, firefly, click beetle and the like), luciferin, and aequorin), radiolabels (e.g., 3H, 125I, 35S, 14C, 33P, or 32P), enzymes (e.g., galactosidases, glucorinidases, phosphatases (e.g., alkaline phosphatase), peroxidases (e.g., horseradish peroxidase), and cholinesterases), and calorimetric labels such as colloidal gold or colored glass or plastic (e.g., polystyrene, polypropylene, and latex) beads. In some embodiments, barcodes described herein are modified to comprise the addition of a detectable label as described herein.

Resolution of detection using barcoding methods described herein is not limited by light diffraction. Such barcoding methods allow for detection samples with very high density as well as very low density of targets. Additionally, barcoding methods described herein can be applied in two dimensions or three dimensions without loss of resolution or significant adaptation of methods.

In some embodiments, fluorescent in situ hybridization (FISH) is applied. The FISH step generally involves depositing small nucleic acids (e.g., 15-40 nucleotide oligomers) having a label (e.g., a fluorescent label). In some embodiments, nucleic acid fluorescent probes of a FISH recognize a region or regions of genome. In some embodiments, the nucleic acid fluorescent probes of FISH recognize RNA. In some embodiments, a FISH, or modified FISH, reaction is applied to a sample described herein prior to or following antigen retrieval (e.g., an amplification reaction). In further embodiments, the probes used for FISH are further used for concatemer formation either as the barcode or for barcode binding, followed by methods described herein.

Following washing to remove DNA barcodes that are not crosslinked, bound barcodes can be visualized or detected. In some embodiments, visualization or detection is by colorimetric, fluorescent, ultraviolet, radiometric, or other means.

Barcoding methods described herein can include single-cell or single-nucleus labeling methods. In some embodiments, split pool barcoding is used. In such embodiments, samples are repeatedly distributed into wells for barcoding and pooled. The final library comprises discrete combinations of barcodes.

Record Extraction and Sequencing

In some embodiments, barcoded DNA strands are pooled (e.g., combined for batch processing and/or analysis) across multiple ROIs. In some embodiments, DNA strands from individual ROI are collected in a region-specific manner. In some embodiments, DNA strands from individual cells are pooled separately. In some embodiments, DNA from individual cells or other defined ROIs are barcoded and sequenced separately.

In some embodiments, displacement of barcoded nucleic acids comprises application of a reagent to release a nucleic acid comprising a barcode from the surface. The reagent to release a nucleic acid comprising a barcode may comprise an RNAse, DNAse, and/or proteinase. In some embodiments, record extraction and sequencing comprises displacement of barcoded nucleic acids. Displacement is optionally achieved with application of an RNA hydrolyzing enzyme. In some embodiments, the RNA hydrolyzing enzyme is RNaseH. Cross-junction synthesis to generate continuous nucleic acids can also effect displacement of the barcoded nucleic acids. Enzymatic displacement and synthesis reactions can be combined or performed sequentially, in any order. After sequences have been extracted from the sample, further imaging or other assays (e.g., mass spectrometry, H&E staining) may be performed on the sample. Subsequent Polymerase Chain Reaction (PCR) amplification and optional purification is followed by optional library preparation and next generation sequencing. The resulting sequence analysis can be merged with the captured imaging data to provide integrated spatial and sequence-based information output.

Generated barcode concatemers are displaced from the tissue samples or population of cells provided herein and synthesized to a continuous DNA strand. These steps can occur sequentially, in any order, or simultaneously. Continuous DNA strands are optionally pooled. Nucleic acids are optionally then amplified and sequenced. Sequencing data is optionally incorporated with earlier imaging data to provide spatially defined sequencing information.

Provided herein are methods for concatemer displacement. In some embodiments, concatemers bound to RNA are displaced from the tissue samples or population of cells provided herein. In some embodiments, concatemers are displaced chemically. In some embodiments, concatemers are displaced enzymatically. In some embodiments, concatemers are displaced using an enzyme that specifically cleaves RNA (e.g., RNaseH). In some embodiments, concatemers are displaced using an enzyme that specifically cleaves DNA, a DNAse (e.g., DNAse I). In some embodiments, concatemers are displaced physically. In some embodiments, concatemers are displaced by an application of energy. In some embodiments, the energy is chemical, electrical, radiant, mechanical, thermal, nuclear, or any combination thereof. In some embodiments, concatemers are displaced by application of heat. In some embodiments, concatemers are displaced by electrophoresis. In some embodiments, concatemers are displaced through the process of cross-junction synthesis. In some embodiments, cross-junction synthesis is performed prior to displacement of the barcoded DNA. In some embodiments, cross-junction synthesis is performed after displacement of the barcoded DNA. In some embodiments, displacement and cross-junction synthesis occur concurrently.

Cross Junction Synthesis

Figure 6:
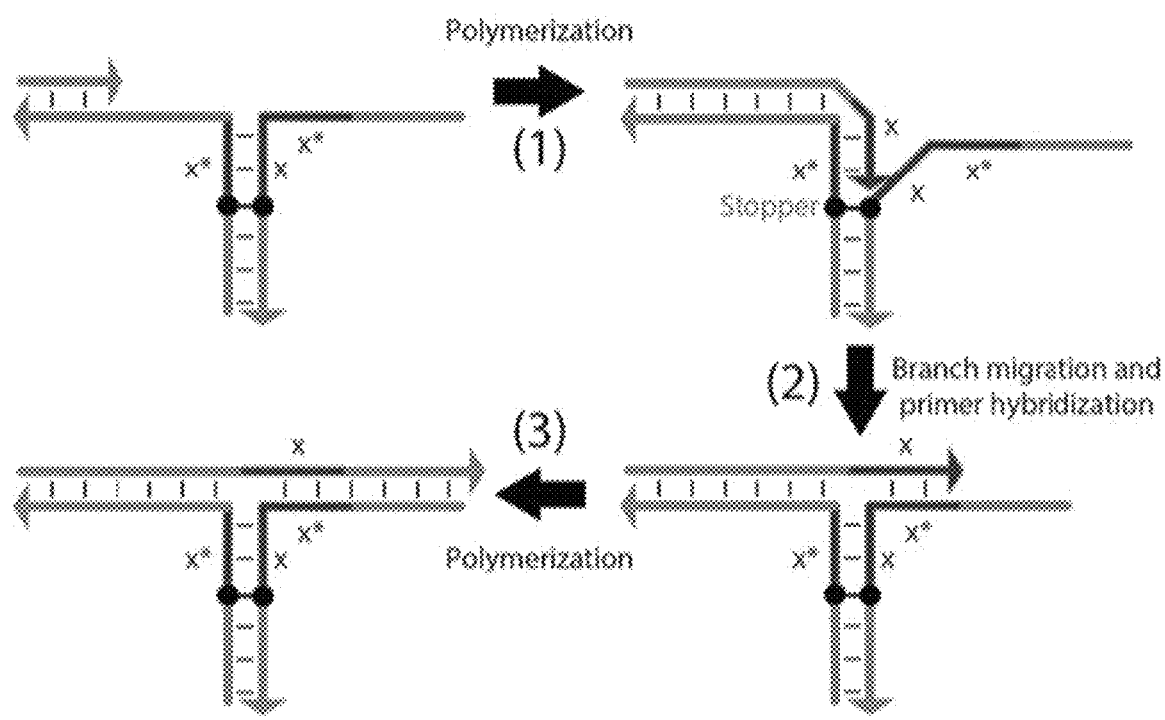
FIG. 6 illustrates the process of cross-junction synthesis.

Provided herein are methods for cross-junction synthesis, whereby a nucleic acid combined with one or more barcode sequences is copied to a new single strand of DNA. Cross-junction synthesis is performed directly in situ, or during/ after displacement. The fundamental strategy for cross-junction synthesis is depicted in FIG. 6. Shown are two nucleic acids that have been hybridized together to form a junction. A primer is bound in front of that junction on the first nucleic acid (left). A strand-displacing polymerase is used to copy the x domain (also referred to as a junction domain herein) until it reaches a stopper (shown in black and also referred to as a blocking domain herein). The new and old x domains compete in a random walk branch migration process. Ultimately, the new x domain can bind to the exposed x* domain on the second template strand (right, also referred to as a synthesis region herein). Polymerization can then continue on the second template strand, copying along a new backbone.

In some embodiments, cross-junction synthesis produces a DNA, an RNA, a PNA, or an LNA. In some embodiments, the method of cross-junction synthesis comprises contacting a target nucleic acid or a barcode provided herein with a strand-displacing polymerase. In some embodiments, cross-junction synthesis is performed at room temperature (e.g., from at least about 20° C. to about 25° C.). In some embodiments, cross-junction synthesis is performed at temperatures below room temperature (e.g., about 15° C., about 10° C., about 4° C.). In some embodiments, cross-junction synthesis is performed at temperatures above room temperature (e.g., about 30° C., about 37° C.). In some embodiments, nucleic acid amplification or cross-junction synthesis is performed at a constant temperature. In some embodiments, nucleic acid amplification or cross-junction synthesis is performed at different or varied temperatures.

Provided herein are methods, wherein a polymerase is prevented or stopped from continuing along the backbone of a template strand and/or copying the template strand by a blocking domain. In some embodiments, the blocking domain comprises one or more modified nucleotides known for increasing $T_m$ of double-stranded nucleic acids. In some embodiments, modified nucleotides include, but are not limited to, locked nucleic acids (LNAs), 2'-O-methoxy-ethyl (2'-MOE) nucleotides, 2,6-diaminopurine, G-clamp (an analog of C having 4 hydrogen bonds) and guanidinium G-clamp nucleotides, and the like.

Figure 7:
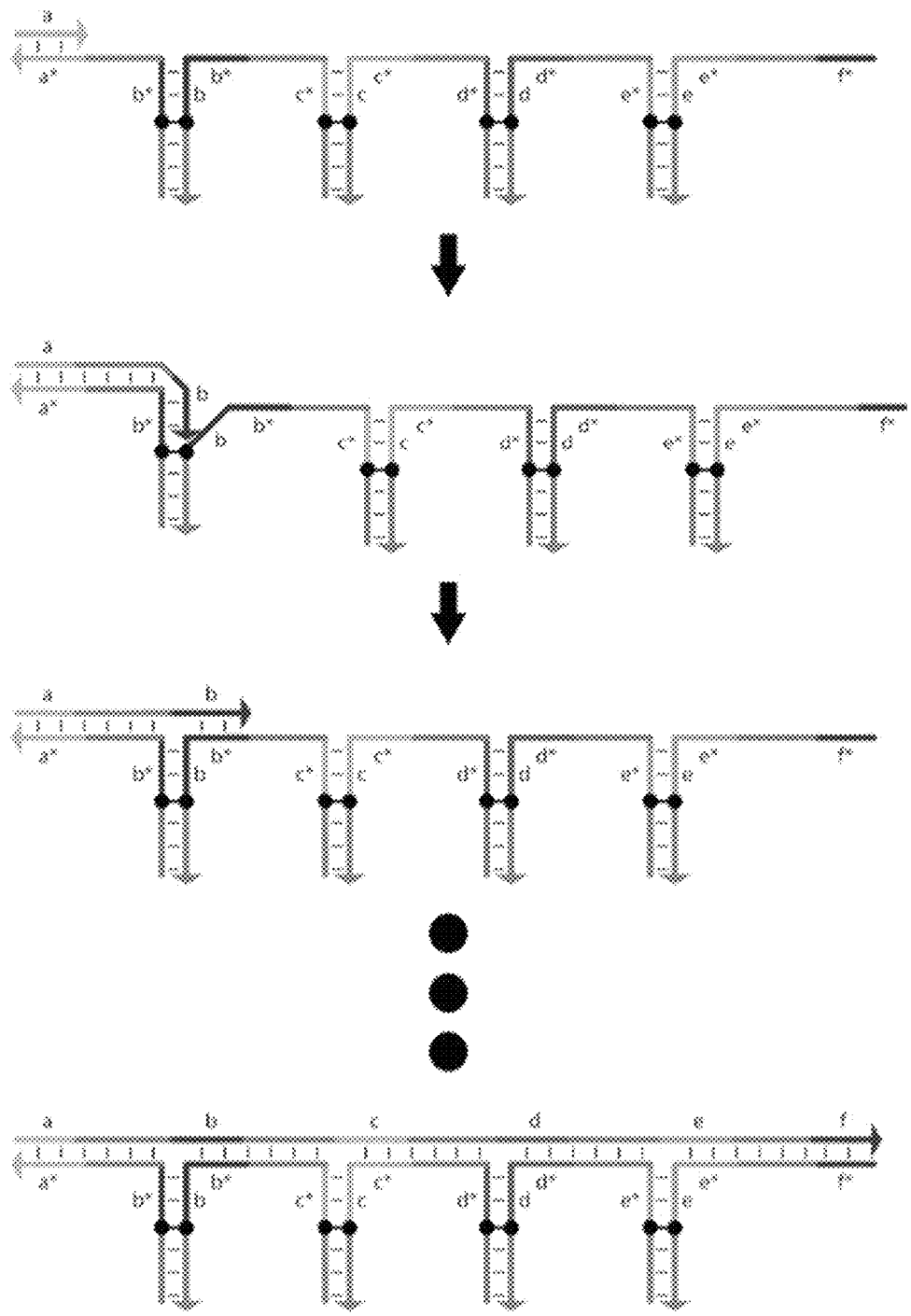
FIG. 7 illustrates a workflow for cross-junction synthesis across a concatemer of barcodes to generate a continuous nucleic acid.

The compositions and methods described herein can be used for synthesis of prescribed sequences. An exemplary embodiment is shown in FIG. 7. As shown in FIG. 7, by hybridizing multiple barcode strands together, cross-junction synthesis reactions can be cascaded to form longer sequences. Each junction between barcode strands shows the same domain motifs, whereby the strand domains copied on the 3' end of the growing strand before reaching a stopper (b, c, d, e) can reach across the junction and bind to the exposed complementary sequence (b*, c*, d*, e*) on the next barcode strand. Arbitrary nucleic acid sequences can be added in the template regions between the motif domains (shown in gray) to enable longer sequences to be assembled.

In some embodiments, at least one of the blocking domains comprise a poly monomer stretch. For example, the blocking domain can comprise a stretch of polyA, polyT, polyC, or polyG nucleotides.

In some embodiments, the blocking domain, or stopper, can comprise covalent cross-linking of two barcode strands. In some embodiments, the blocking domain, or stopper, comprises one or more proteins. In some embodiments, the one or more proteins are bound to one or more of the barcode strands. In some embodiments, the one or more proteins are crosslinked to one or more of the barcode strands. In some embodiments, the covalent cross-linking is a photo-crosslink or a chemical cross-link. In some embodiments, covalent cross-linking comprises cross-linking the nucleotide at the 5'-terminus of the first barcode strand to the nucleotide at the 3'-end of the second template strand. In some embodiments, the cross-linking is at an oligonucleotide or a single nucleic acid backbone linkage. In some embodiments, the cross-linking is by a phosphodiester bond. In some embodiments, the cross-linking reaction is between a CNVK nucleotide and a complementary nucleotide. In some embodiments, the crosslinked nucleotides act as a stopper to a polymerase.

In some embodiments, the blocking region comprises any desired nucleotide sequence or number of nucleotides. In some embodiments, each blocking domain can be of any length. In some embodiments, each blocking domain can be from one nucleotide to 100 nucleotides in length. In some embodiments, each blocking domain is independently one, two, three, four, five, six, seven, eight, nine, ten, or more nucleotides in length. It is noted that a blocking domain can be a single nucleotide.

In embodiments wherein the nucleic acid template comprises two or more cross-junctions, the first nucleic acid of a cross-junction and the second nucleic acid of the cross-junction can have complementary sequences (e.g., the 3' end of the first nucleic acid is complementary to the 5' end of the second nucleic acid). Likewise, the 3' end of the second nucleic acid of a cross-junction and the 5' end of a first nucleic acid of the cross-junction can have complementary sequences. As such, nucleic acids can be crosslinked in an alternating arrangement to generate concatemers as described herein.

It is noted that a nucleic acid described herein optionally comprises a barcode domain. In an exemplary embodiment, the second nucleic acid of a junction comprises a barcode domain at the 5'-terminus. In some embodiments, one of the first or second synthesis regions of a nucleic acid comprises a barcode domain.

Purification

Methods and systems described herein may comprise purification of a sample. In some embodiments, the barcoded samples are purified by chemical means, for example precipitating the nucleic acid. In some embodiments, barcoded samples are purified using column chromatography, for example ion exchange, reverse-phase, or size exclusion chromatography. In some embodiments, on-bead binding is used to purify barcoded samples. In some embodiments, barcoded samples are purified using electrophoretic properties.

PCR Amplification

Provided herein are methods of amplification. Provided herein are methods of PCR amplification. PCR amplification uses a DNA polymerase to synthesize DNA from deoxynucleotide substrates on a single-stranded template. In some embodiments described herein, the PCR method comprises Real-time PCR, Quantitative real time PCR (Q-RT PCR), Reverse Transcriptase PCR (RT-PCR), Multiplex PCR, Nested PCR, Long-range PCR, Single-cell PCR, Fast-cycling PCR, Methylation-specific PCR (MSP), Hot start PCR, High-fidelity PCR, In situ PCR, Variable Number of Tandem Repeats (VNTR) PCR, Asymmetric PCR, Repetitive sequence-based PCR, Overlap extension PCR, Assemble PCR, Intersequence-specific PCR (ISSR), Ligation-mediated PCR, Methylation-specific PCR, Miniprimer PCR, Solid phase PCR, Touch down PCR, or any combination thereof. In some embodiments, a reverse transcriptase is applied for an amplification described herein. In some embodiments, the reverse transcriptase is a MuLV reverse transcriptase, or Avian myeloblastosis virus (AMV) reverse transcriptase. In some embodiments, a DNA polymerase is applied for an amplification described herein. In some embodiments, the DNA polymerase is a T7 DNA polymerase, thermophilic eubacterial microorganism *Thermus aquaticus* DNA polymerase, Pfu DNA polymerase, or Bst DNA Polymerase. In some embodiments, a DNA ligase is applied for joining strands. In some embodiments, the DNA ligase is EC 6.5.1.1. In some embodiments, the DNA ligase is a T4 DNA ligase.

In some embodiments, barcode sequences, or primers complementary to such sequences, comprise a polymerase promoter sequence. In some embodiments, the promoter is an RNA polymerase promoter. In some embodiments, the polymerase promoter sequence comprises, without limitation, a T7 RNA polymerase promoter region (SEQ ID NO: 1: 5' TAATACGACTCACTATAG 3'), a T3 RNA polymerase promoter region (SEQ ID NO: 2: 5' AATTAACCCT-CACTAAAG 3'), or a SP6 RNA polymerase promoter region (SEQ ID NO: 3: 5' ATTTAGGTGACACTATAG 3').

Provided herein are methods for amplicon preparation. In some embodiments, amplicons are purified. In some embodiments, amplicons are analyzed through gel electrophoresis. In some embodiments, amplicons are isolated. In some embodiments, amplicons are fragmented. In some embodiments, amplicons are end-repaired. In some embodiments, amplicons are covalently linked to adapters.

Samples may be further prepared for sequencing with any combination of one or more of tagmentation, fragmentation, adaptor ligation, rRNA reduction, or other library preparation steps.

Sequencing

Provided herein are methods for sequencing. In some embodiments, sequencing comprises next-generation sequencing (NGS) technologies. In some embodiments, sequencing comprises parallel sequencing. Sequencing may comprise paired-end, non-paired end, or long-read sequencing. In some embodiments, sequencing comprises high-throughput sequencing, for example, single-molecule real-time sequencing, ion semiconductor sequencing (Ion Torrent), pyrosequencing, sequencing by synthesis, combinatorial probe anchor synthesis, sequencing by ligation (SOLiD), nanopore sequencing, genapsys sequencing, or chain termination (Sanger) sequencing. In some embodiments, sequencing comprises massive parallel sequencing.

Image and Sequence Analysis

A density of barcoded cDNA targets can be measured by the number of unique sequences detected. In some embodiments, raw sequencing reads are filtered for those that map only once to the transcriptome. Reads are "deduplicated", identifying identical molecules that have been sequenced as reads more than once according to those that have the same UMI sequence and map to the same transcript in the transcriptome. All identical sequencing reads are collapsed to a single "deduplicated" read. A gene expression matrix is generated, compiling unique counts sequenced for each gene in transcriptome. Differences in number of counts across all gene can thereby be compared across samples.

In some embodiments, the density of barcoded cDNA targets is the number of barcodes generated within one square micrometer ($\mu m^2$) of a tissue sample, a population of cells, or a population of cells. In some embodiments, the density of barcoded cDNA targets is the number of barcodes generated within a cubic micrometer ($\mu m^3$) of a tissue sample, a population of cells, an organoid, or an organ. In some embodiments, the methods provided herein generate about 55 tags or barcodes per square micrometer ($\mu m^2$). In some embodiments, the methods provided herein generate about 5, about 10, about 15, about 20, about 25, about 30, about 35, about 40, about 45, about 50, about 55, about 60, about 65, about 70, about 80, about 90, about 100, about 150, about 200, about 250, about 300, about, about 350, about 400, about 450, about 500, about 550, about 600, about 650, about 700, about 800, about 900, about 1000, about 1200, about 1400, about 1600, about 1800, about 2000, about 2250, about 2500, about 2750, about 3000, about 3500, about 4000, about 4500, about 5000 tags per $\mu m^2$.

In some embodiments, the methods provided herein generate up to about 5 tags per cubic micrometer ($\mu m^3$), up to about 10, up to about 15, up to about 20, up to about 25, up to about 30, up to about 35, up to about 40, up to about 45, up to about 50, up to about 55, up to about 60, up to about 65, up to about 70, up to about 80, up to about 90, up to about 100, up to about 150, up to about 200, up to about 250, up to about 300, up to about, up to about 350, up to about 400, up to about 450, up to about 500, up to about 550, up to about 600, up to about 650, up to about 700, up to about 800, up to about 900, up to about 1000, up to about 1200, up to about 1400, up to about 1600, up to about 1800, up to about 2000, up to about 2250, up to about 2500, up to about 2750, up to about 3000, up to about 3500, up to about 4000, up to about 4500, up to about 5000, up to about 6000, up to about 70000, up to about 8000, up to about 9000, up to about 10,000 tags per cubic micrometer ($m^3$).

Additional Analysis

Provided herein are methods for protein analysis. In some embodiments, a protein retrieved from a sample described herein is analyzed by mass spectrometry, an analytical tool for measuring the mass-to-charge ratio (m/z) of one or more molecules present in the sample. Such measurements can be used to calculate the molecular weight, the amount present, and/or identity of components in the sample.

Further provided herein are methods of screening regions of interest impacted by an intervention compared to regions of interest not impacted. In some embodiments, methods comprise screening one or more regions of interest within a sample. In some embodiments, methods comprise screening one or more regions of interest across one or more samples. In some embodiments, one or more regions of interest are impacted with an intervention prior to screening, after screening, or between multiple screens. In some embodiments, the impacting comprises application of a small molecule, a peptide, an antibody, cells, a protein, an energy, or any combination thereof. In some embodiments, the impacting comprises thermal energy, radiant energy, chemical energy, nuclear energy, electrical energy, motion energy, sound energy, or any combination thereof.

Application of methods described herein include and are not limited to identification of drug targets, identification of biomarkers, profiling, characterization of cells and disease models, characterization of differentiation status and cell state, tissue mapping, and multi-dimensional analysis.

EXEMPLARY EMBODIMENTS

Provided herein are methods of biological cell information generation, the method comprising: contacting a population of cells with a nucleic acid polymerase and a primer to generate amplification products; depositing DNA barcodes onto the population of cells, wherein the DNA barcodes comprise a region complementary to a region of the amplification products, and wherein the DNA barcodes comprise a photo-reactive nucleobase capable of crosslinking to another nucleobase; selectively radiating the population of cells to form covalently linked DNA barcode-amplification product complexes; washing the population of cells to remove the DNA barcodes that are not complexed to amplification products; and repeating the depositing, selectively radiating, and washing steps, wherein: the DNA barcodes in a first of the depositing steps comprise a different sequence than the DNA barcodes in a second of the depositing steps, and the selectively radiating occurs at different locations for a first selectively radiating step and a second selectively radiating step. Further provided herein are methods, further comprising determining biological cell spatial information based at least in part on the amplification products and the DNA barcodes. Further provided herein are methods, further comprising synthesizing a continuous DNA strand, wherein the synthesizing comprises contacting the DNA barcode-amplification product complexes with a polymerase. Further provided herein are methods, wherein the synthesizing comprises a cross-junction synthesis. Further provided herein are methods, further comprising displacing the continuous DNA strand from the population of cells.

Further provided herein are methods, wherein the synthesizing and displacing occur simultaneously. Further provided herein are methods, wherein the displaced continuous DNA strands are pooled (e.g., combined for batch processing and/or analysis). Further provided herein are methods, wherein the pooled continuous DNA strands are amplified. Further provided herein are methods, wherein the pooled continuous DNA strands are sequenced. Further provided herein are methods, further comprising identifying targets associated with the continuous DNA strands. Further provided herein are methods, further comprising mapping the targets to the different locations. Further provided herein are methods, wherein the primer is a random primer. Further provided herein are methods, wherein the primer is a non-random primer. Further provided herein are methods, wherein the photo-reactive nucleobase is 3-cyanovinylcarbazole phosphoramidite (CNVK). Further provided herein are methods, wherein the selectively radiating is performed using a photomask. Further provided herein are methods, wherein the photomask is varied in the different selectively radiating steps. Further provided herein are methods, wherein the photomask is generated manually. Further provided herein are methods, wherein the photomask is generated by machine. Further provided herein are methods, wherein the selectively radiating step comprises administering radiation at a wavelength of about 300 nm up to 450 nm. Further provided herein are methods, wherein the selectively radiating step comprises administering radiation at a wavelength of about 350 nm up to 420 nm. Further provided herein are methods, wherein the selectively radiating step comprises administering radiation at a wavelength of about 365 nm up to 405 nm. Further provided herein are methods, wherein the selectively radiating step comprises applying radiation to a preselected region of interest (ROI). Further provided herein are methods, wherein the ROI is cell-specific or sub-cellular specific. Further provided herein are methods, wherein the ROI is based on morphology. Further provided herein are methods, wherein the depositing is performed manually, automatically, robotically, or any combination thereof. Further provided herein are methods, wherein the depositing is performed with a modified inkjet printer.

Further provided herein are methods, wherein the depositing or washing is performed using microfluidics, passive diffusion, electrophoresis, digital microfluidics, an acoustic liquid handler, an inkjet printer, an automatic liquid handler, or any combination thereof. Further provided herein are methods, wherein the depositing or washing is performed with a pipettor. Further provided herein are methods, wherein the repeating is completed at least 1, at least 2, at least 3, at least 4, at least 5, at least 6, at least 7, at least 8, at least 9, at least 10, at least 15, at least 20, at least 25, at least 30, at least 35, at least 40, at least 45, at least 50, or more times. Further provided herein are methods, wherein at least 2, 3, 4, 5, 6, 7, 8, or 9 different DNA barcode strands are deposited. Further provided herein are methods, further comprising contacting the population of cells with a cell permeabilization agent. Further provided herein are methods, further comprising contacting the population of cells with an agent that generates a population of fixed cells. Further provided herein are methods, wherein the agent that generates the population of fixed cells comprises formalin, formaldehyde, paraformaldehyde, methanol, acetic acid, or any combination thereof. Further provided herein are methods, wherein the population of fixed cells are fixed to a substrate. Further provided herein are methods, wherein the fixed cells are formalin-fixed paraffin-embedded (FFPE) cells, paraformaldehyde fixed (PFA), or paraformaldehyde with Triton X-100 (PFA-Tx) fixed. Further provided herein are methods, wherein the population of cells comprises one or more of: cultured cells; a tissue obtained from a subject; an engineered tissue; or an organoid. Further provided herein are methods, wherein the tissue is intact tissue or dissected tissue. Further provided herein are methods, wherein the cultured cells are dissociated cells. Further provided herein are methods, wherein the engineered tissue comprises a population of human in vitro-differentiated cells. Further provided herein are methods, wherein the human in vitro-differentiated cells are derived from human induced pluripotent stem cells (hiPSCs), embryonic stem cells, or adult stem cells. Further provided herein are methods, wherein the population of cells are retinal cells. Further provided herein are methods, further comprising imaging the population of cells after the washing step. Further provided herein are methods, wherein the washing comprises depositing a solution comprising a chemical denaturant and a detergent. Further provided herein are methods, wherein the chemical denaturant comprises formamide. Further provided herein are methods, wherein the formamide is present in an amount of from about 40% (v/v) to about 60% (v/v). Further provided herein are methods, wherein the formamide is present in an amount of from about 50% to about 60%. Further provided herein are methods, wherein the detergent comprises polysorbate 20, polysorbate 80, or Triton X-100. Further provided herein are methods, wherein the detergent is present in an amount between about 0.05% and about 5% (v/v). Further provided herein are methods, wherein the DNA barcodes further comprise a detectable label. Further provided herein are methods, wherein the step comprising washing the population of cells is omitted.

Provided herein are methods of biological cell spatial information generation, the methods comprising: contacting a population of cells with a capture probe, wherein the capture probe comprises a DNA-binding region and a target binding region; depositing DNA barcodes onto the population of cells, wherein the DNA barcodes comprise a region that binds to the DNA-binding region, and wherein the DNA barcodes comprise a photo-reactive nucleobase capable of crosslinking to another nucleobase; selectively radiating the population of cells to form DNA barcode-amplification product complexes; washing the population of cells to remove the DNA barcodes that are not complexed to amplification products; and repeating the depositing, selectively radiating, and washing steps, wherein: the DNA barcodes in a first of the depositing steps comprise a different sequence than the DNA barcodes in a second of the depositing steps, and the selectively radiating occurs at different locations for a first selectively radiating step and a second selectively radiating step. Further provided herein are methods, further comprising determining biological cell spatial information based at least in part on the DNA barcode-amplification product complexes. Further provided herein are methods, wherein the capture probe comprises RNA or DNA. Further provided herein are methods, wherein the capture probe comprises a protein. Further provided herein are methods, further comprising synthesizing a continuous DNA strand, wherein the synthesizing comprises contacting the population of cells with a polymerase. Further provided herein are methods, wherein the synthesizing comprises a cross-junction synthesis. Further provided herein are methods, further comprising displacing the continuous DNA strand from the population of cells. Further provided herein are methods, wherein the synthesizing and displacing occur simultaneously. Further provided herein are methods, wherein the displaced continuous DNA strands are pooled. Further provided herein are methods, wherein the pooled continuous DNA strands are amplified. Further provided herein are methods, wherein the pooled continuous DNA strands are sequenced. Further provided herein are methods, further comprising identifying targets associated with the continuous DNA strands. Further provided herein are methods, further comprising mapping the targets to the different locations. Further provided herein are methods, wherein the photo-reactive nucleobase is 3-cyanovinylcarbazole phosphoramidite (CNVK). Further provided herein are methods, wherein the selectively radiating is performed using a photomask. Further provided herein are methods, wherein the photomask is varied in the different selectively radiating steps. Further provided herein are methods, wherein the photomask is generated manually. Further provided herein are methods, wherein the photomask is generated by machine. Further provided herein are methods, wherein the selectively radiating step comprises administering radiation at a wavelength of about 300 nm up to 450 nm. Further provided herein are methods, wherein the selectively radiating step comprises administering radiation at a wavelength of about 350 nm up to 420 nm. Further provided herein are methods, wherein the selectively radiating step comprises administering radiation at a wavelength of about 365 nm up to 405 nm. Further provided herein are methods, wherein the selectively radiating comprises applying radiation to a preselected region of interest (ROI). Further provided herein are methods, wherein the ROI is cell-specific or sub-cellular specific. Further provided herein are methods, wherein the ROI is based on morphology. Further provided herein are methods, wherein the depositing is performed manually, automatically, robotically, or any combination thereof. Further provided herein are methods, wherein the depositing is performed with a modified inkjet printer. Further provided herein are methods, wherein the depositing or washing is performed using microfluidics, passive diffusion, electrophoresis, digital microfluidics, an acoustic liquid handler, an inkjet printer, an automatic liquid handler, or any combination thereof. Further provided herein are methods, wherein the depositing or washing is performed with a pipettor. Further provided herein are methods, wherein the repeating is completed at least 1, at least 2, at least 3, at least 4, at least 5, at least 6, at least 7, at least 8, at least 9, at least 10, at least 15, at least 20, at least 25, at least 30, at least 35, at least 40, at least 45, at least 50, or more times. Further provided herein are methods, wherein at least 2, 3, 4, 5, 6, 7, 8, or 9 different DNA barcode strands are deposited. Further provided herein are methods, further comprising contacting the population of cells with a cell permeabilization agent. Further provided herein are methods, further comprising contacting the population of cells with an agent that generates a population of fixed cells. Further provided herein are methods, wherein the agent that generates a population of fixed cells comprises formalin, formaldehyde, paraformaldehyde, methanol, acetic acid, or any combination thereof. Further provided herein are methods, wherein the population of fixed cells are fixed to a substrate. Further provided herein are methods, wherein the fixed cells are formalin-fixed paraffin-embedded (FFPE) cells, paraformaldehyde fixed (PFA), or paraformaldehyde with Triton X-100 (PFA-Tx) fixed. Further provided herein are methods, wherein the population of cells comprises one or more of cultured cells; a tissue obtained from a subject; an engineered tissue; or an organoid. Further provided herein are methods, wherein the population of cells comprises a tissue, and the tissue is intact tissue or dissected tissue. Further provided herein are methods, wherein the population of cells comprises cultured cells, and the cultured cells are dissociated cells. Further provided herein are methods, wherein the engineered tissue comprises a population of human in vitro-differentiated cells. Further provided herein are methods, wherein the human in vitro-differentiated cells are derived from human induced pluripotent stem cells (hiPSCs), embryonic stem cells, or adult stem cells. Further provided herein are methods, wherein the population of cells comprise retinal cells. Further provided herein are methods, further comprising imaging the population of cells after the washing step. Further provided herein are methods, wherein the washing comprises depositing a solution comprising a chemical denaturant and a detergent. Further provided herein are methods, wherein the chemical denaturant comprises formamide. Further provided herein are methods, wherein the formamide is present in an amount of from about 40% (v/v) to about 60% (v/v). Further provided herein are methods, wherein the formamide is present in an amount of from about 50% to about 60%. Further provided herein are methods, wherein the detergent comprises polysorbate 20, polysorbate 80, or Triton X-100. Further provided herein are methods, wherein the detergent is present in an amount between about 0.05% and about 5% (v/v). Further provided herein are methods, wherein the DNA barcodes further comprise a detectable label. Further provided herein are methods, wherein the target binding region binds to a DNA, an RNA, a protein, or a combination thereof. Further provided herein are methods, further comprising a plurality of contacting steps. Further provided herein are methods, wherein the plurality of contacting steps comprise: contacting the population of cells with a first capture probe that recognizes a nucleic acid; and contacting the population of cells with a second capture probe that recognizes a protein. Further provided herein are methods, wherein the DNA-binding region comprises a DNA barcode binding region. Further provided herein are methods, wherein the DNA-binding region is RNA or DNA. Further provided herein are methods, further comprising contacting the population of cells with a DNA polymerase or an RNA polymerase; and a primer to generate amplification products. Further provided herein are methods, wherein the RNA polymerase is a reverse transcriptase. Further provided herein are methods, wherein the step comprising washing the population of cells is omitted.

Provided herein are methods of biological cell spatial information generation, the methods comprising: capturing an image of a tissue sample in 3-dimensions; contacting the tissue sample with a nucleic acid polymerase and a primer to generate amplification products; depositing DNA barcodes onto the tissue sample wherein the DNA barcodes comprise a region complementary to a region of the amplification products, and wherein the DNA barcodes comprise a photo-reactive nucleobase capable of crosslinking to another nucleobase; selectively radiating the tissue sample in 3-dimensions to form DNA barcode-amplification product complexes; washing the tissue sample to remove the DNA barcodes that are not complexed to amplification products; and repeating the depositing, selectively radiating, and washing steps, wherein: the DNA barcodes in a first of the depositing steps comprise a different sequence than the DNA barcodes in a second of the depositing steps, and the selectively radiating occurs at different locations of the tissue sample for a first selectively radiating step and a second selectively radiating step. Further provided herein are methods, further comprising determining biological cell spatial information based at least in part on the amplification products and the DNA barcodes. Further provided herein are methods, wherein the tissue sample is obtained from a subject. Further provided herein are methods, wherein the tissue sample is an engineered tissue or an organoid. Further provided herein are methods, wherein the tissue sample comprises a population of cells, wherein the population of cells are a heterogenous population of cells. Further provided herein are methods, wherein the tissue sample comprises dissected cells or intact cells. Further provided herein are methods, wherein the nucleic acid polymerase is an RNA polymerase or a DNA polymerase. Further provided herein are methods, wherein the RNA polymerase is a reverse transcriptase. Further provided herein are methods, wherein the primer is an RNA primer or a DNA primer. Further provided herein are methods, wherein the primer is conjugated to a protein. Further provided herein are methods, wherein the protein is an antibody or an antibody fragment. Further provided herein are methods, wherein the RNA polymerase transcribes RNA from the tissue sample to generate a cDNA. Further provided herein are methods, further comprising hybridizing the DNA barcodes to the cDNA. Further provided herein are methods, further comprising synthesizing a continuous DNA strand, wherein the continuous DNA strand is complementary to the cDNA and at least one of the DNA barcodes. Further provided herein are methods, wherein the continuous DNA strand is complementary to the cDNA and two or more of the DNA barcodes. Further provided herein are methods, wherein the synthesizing is by cross-junction synthesis. Further provided herein are methods, further comprising displacing the continuous DNA strand from the tissue sample. Further provided herein are methods, wherein the synthesizing and displacing occur simultaneously. Further provided herein are methods, wherein the displaced continuous DNA strands are pooled. Further provided herein are methods, wherein the pooled continuous DNA strands are amplified. Further provided herein are methods, wherein the pooled continuous DNA strands are sequenced. Further provided herein are methods, further comprising identifying targets associated with the continuous DNA strands. Further provided herein are methods, further comprising mapping the targets to the different locations within the fixed population of cells. Further provided herein are methods, wherein the depositing is performed manually, automatically, robotically, or any combination thereof. Further provided herein are methods, wherein the depositing is performed with a modified inkjet printer. Further provided herein are methods, wherein the depositing or washing is performed using microfluidics, passive diffusion, electrophoresis, digital microfluidics, an acoustic liquid handler, an inkjet printer, an automatic liquid handler, or any combination thereof. Further provided herein are methods, wherein the depositing or washing is performed with a pipettor. Further provided herein are methods, wherein the repeating is completed at least 1, at least 2, at least 3, at least 4, at least 5, at least 6, at least 7, at least 8, at least 9, at least 10, at least 15, at least 20, at least 25, at least 30, at least 35, at least 40, at least 45, at least 50, or more times. Further provided herein are methods, wherein at least 2, 3, 4, 5, 6, 7, 8, or 9 different barcode strands are deposited. Further provided herein are methods, further comprising imaging the population of cells after the washing step. Further provided herein are methods, wherein the washing comprises depositing a solution comprising a chemical denaturant and a detergent. Further provided herein are methods, wherein the chemical denaturant comprises formamide. Further provided herein are methods, wherein the formamide is present in an amount of from about 40% (v/v) to about 60% (v/v). Further provided herein are methods, wherein the formamide is present in an amount of from about 50% to about 60%. Further provided herein are methods, wherein the detergent comprises polysorbate 20, polysorbate 80, or Triton X-100. Further provided herein are methods, wherein the detergent is present in an amount between about 0.05% and about 5% (v/v). Further provided herein are methods, wherein the DNA barcodes further comprise a detectable label. Further provided herein are methods, wherein the photo-reactive nucleobase is 3-cyanovinylcarbazole phosphoramidite (CNVK). Further provided herein are methods, wherein the selectively radiating is performed with a photomask. Further provided herein are methods, wherein the photomask is varied in the different selectively radiating steps. Further provided herein are methods, wherein the photomask is generated manually. Further provided herein are methods, wherein the photomask is generated by machine. Further provided herein are methods, wherein the selectively radiating comprises applying radiation to a preselected region of interest (ROI). Further provided herein are methods, wherein the ROI is cell-specific or sub-cellular specific. Further provided herein are methods, wherein the ROI is based on morphology. Further provided herein are methods, wherein the selectively radiating step comprises administering radiation at a wavelength of about 300 nm up to 450 nm. Further provided herein are methods, wherein the selectively radiating step comprises administering radiation at a wavelength of about 350 nm up to 420 nm. Further provided herein are methods, wherein the selectively radiating step comprises administering radiation at a wavelength of about 365 nm up to 405 nm. Further provided herein are methods, wherein the step comprising washing the tissue sample is omitted.

Provided herein are methods of biological cell spatial information generation, the methods comprising: capturing an image of a population of cells, wherein the population of cells are fixed onto a substrate; reverse transcribing RNA from the population of cells to generate cDNA; depositing DNA barcodes onto the population of cells; hybridizing DNA barcodes to the cDNA, wherein the DNA barcodes comprise a photo-reactive nucleobase capable of crosslinking to another nucleobase; selectively radiating the population of cells to form crosslinked barcodes; washing to remove DNA barcodes that are not crosslinked; and repeating the depositing, hybridizing, selectively radiating, and washing steps, wherein the DNA barcodes in the depositing steps are varied. Further provided herein are methods, further comprising determining biological cell spatial information based at least in part on the cDNA and the DNA barcodes. Further provided herein are methods, wherein the crosslinked barcodes form a concatenation of barcodes. Further provided herein are methods, wherein up to about 55 unique cDNA molecules are generated per square micrometer ($\mu m^2$) of the population of cells. Further provided herein are methods, wherein up to about 10 unique cDNA molecules are generated per square micrometer ($\mu m^2$) of the population of cells. Further provided herein are methods, wherein up to about 5 unique cDNA molecules are generated per square micrometer ($\mu m^2$) of the population of cells. Further provided herein are methods, wherein up to about 5000 unique cDNA molecules are generated per cubic micrometer ($\mu m^3$) of the population of cells. Further provided herein are methods, wherein up to about 1000 unique cDNA molecules are generated per cubic micrometer ($\mu m^3$) of the population of cells. Further provided herein are methods, wherein up to about 500 unique cDNA molecules are generated per cubic micrometer ($\mu m^3$) of the population of cells. Further provided herein are methods, further comprising synthesizing a continuous DNA strand complementary to the cDNA and the crosslinked barcodes. Further provided herein are methods, wherein the synthesizing is by cross-junction synthesis. Further provided herein are methods, further comprising displacing the continuous DNA strand from the population of cells. Further provided herein are methods, wherein the synthesizing and displacing occur simultaneously. Further provided herein are methods, wherein the displaced continuous DNA strands are pooled. Further provided herein are methods, wherein the pooled continuous DNA strands are amplified. Further provided herein are methods, wherein the pooled continuous DNA strands are sequenced. Further provided herein are methods, further comprising identifying targets associated with the continuous DNA strands. Further provided herein are methods, further comprising mapping the targets to the different locations within the fixed population of cells. Further provided herein are methods, wherein the population of cells are contacted with an permeabilization agent. Further provided herein are methods, wherein the population of cells are contacted with one or more agents that generate a population of fixed cells. Further provided herein are methods, wherein the agent is formalin, formaldehyde, paraformaldehyde, methanol, acetic acid, or any combination thereof. Further provided herein are methods, wherein the fixed cells are formalin-fixed paraffin-embedded (FFPE) cells, paraformaldehyde fixed (PFA), or paraformaldehyde with Triton X-100 (PFA-Tx) fixed. Further provided herein are methods, wherein the population of cells comprises one of more of: cultured cells; a tissue obtained from a subject; or an engineered tissue. Further provided herein are methods, wherein the population of cells are retinal cells. Further provided herein are methods, wherein the depositing or washing is performed manually, automatically, robotically, or any combination thereof. Further provided herein are methods, wherein the depositing or washing is performed with a modified inkjet printer. Further provided herein are methods, wherein the depositing or washing is performed using microfluidics, digital microfluidics, an acoustic liquid handler, an inkjet printer, an automatic liquid handler, or any combination thereof. Further provided herein are methods, wherein the depositing or washing is performed with a pipettor. Further provided herein are methods, wherein the repeating is completed at least 1, at least 2, at least 3, at least 4, at least 5, at least 6, at least 7, at least 8, at least 9, at least 10, at least 15, at least 20, at least 25, at least 30, at least 35, at least 40, at least 45, at least 50, or more times. Further provided herein are methods, wherein at least 2, 3, 4, 5, 6, 7, 8, or 9 different barcode strands are deposited. Further provided herein are methods, further comprising imaging the permeabilized cells after the washing step. Further provided herein are methods, wherein the washing comprises depositing a solution comprising a chemical denaturant and a detergent. Further provided herein are methods, wherein the chemical denaturant comprises formamide. Further provided herein are methods, wherein the formamide is present in an amount of from about 40% (v/v) to about 60% (v/v). Further provided herein are methods, wherein the formamide is present in an amount of from about 50% to about 60%. Further provided herein are methods, wherein the detergent comprises polysorbate 20, polysorbate 80, or Triton X-100. Further provided herein are methods, wherein the detergent is present in an amount between about 0.05% and about 5% (v/v). Further provided herein are methods, wherein the DNA barcodes further comprise a detectable label. Further provided herein are methods, wherein the hybridizing is at the 5' end of the transcribed cDNA. Further provided herein are methods, wherein the hybridizing is at the 3' end of the transcribed cDNA. Further provided herein are methods, wherein the photo-reactive nucleobase is 3-cyanovinylcarbazole phosphoramidite (CNVK). Further provided herein are methods, wherein the selectively radiating is performed with a photomask. Further provided herein are methods, wherein the photomask is varied in the different selectively radiating steps. Further provided herein are methods, wherein the photomask is generated manually. Further provided herein are methods, wherein the photomask is generated by machine. Further provided herein are methods, wherein the selectively radiating comprises applying radiation to a preselected region of interest (ROI). Further provided herein are methods, wherein the ROI is cell-specific or sub-cellular specific. Further provided herein are methods, wherein the ROI is based on morphology. Further provided herein are methods, wherein the population of cells comprise retinal cells. Further provided herein are methods, wherein the selectively radiating step comprises administering radiation at a wavelength of about 300 nm up to 450 nm. Further provided herein are methods, wherein the selectively radiating step comprises administering radiation at a wavelength of about 350 nm up to 420 nm. Further provided herein are methods, wherein the selectively radiating step comprises administering radiation at a wavelength of about 365 nm up to 405 nm. Further provided herein are methods, wherein the washing is omitted.

Provided herein are methods of biological cell spatial information generation, the methods comprising: depositing DNA barcodes onto a population of cells, wherein the DNA barcodes hybridize to a target region, and wherein the DNA barcodes comprise a photo-reactive nucleobase capable of crosslinking to another nucleobase; selectively radiating the population of cells at a region of interest to form covalently linked DNA barcode-target complexes, wherein the radiating is selectively varied by intensity or duration; washing the population of cells to remove the DNA barcodes that are not complexed to the target region; and repeating the depositing, selectively radiating, and washing steps, wherein the DNA barcodes in a first of the depositing steps comprise a different sequence than the DNA barcodes in a second of the depositing steps. Further provided herein are methods, further comprising determining biological cell spatial information based at least in part on the target region and the DNA barcodes. Further provided herein are methods, further comprising synthesizing a continuous DNA strand complementary to covalently linked barcodes. Further provided herein are methods, further comprising collecting the continuous DNA strand or its amplification product. Further provided herein are methods, further comprising sequencing the continuous DNA strand or its amplification product. Further provided herein are methods, wherein the step comprising washing the population of cells is omitted.

Further to methods described herein are methods, wherein the population of cells is present on a synthetic substrate. Further provided herein are methods, wherein the synthetic substrate comprises a hydrogel. Further provided herein are methods, wherein the synthetic substrate comprises an extracellular matrix protein. Further provided herein are methods, wherein the synthetic substrate comprises collagen or fibronectin.

Provided herein are methods of biological information generation, the methods comprising: depositing a primer on a population of nucleic acids that hybridizes to a target sequence of the nucleic acid to form nucleic acid primer-complexes; depositing DNA barcodes on the nucleic acid-primer complexes, wherein the DNA barcodes hybridize to the primer to form a nucleic acid concatemers, and wherein the DNA barcodes comprise a photo-reactive nucleobase capable of crosslinking to another nucleobase; radiating the nucleic acid concatemers to form covalently linked concatemers; and removing the DNA barcodes that are not in covalently linked concatemers. Further provided herein are methods, wherein the depositing DNA barcodes, radiating, and removing steps are repeated, wherein the DNA barcodes in a first of the depositing steps comprise a different sequence than the DNA barcodes in a second of the depositing steps. Further provided herein are methods, wherein the primer is attached to an affinity molecule, a scaffold, a substrate, a surface, a bead, or a column.

Further to methods described herein are methods, wherein the selectively radiating is varied in intensity or duration to provide for generation of a preselected fraction of DNA barcode-amplification product complexes or crosslinked barcodes.

Further to methods described herein are methods, further comprising comparing information collected from a disease state sample compared to a non-disease state sample.

Further to methods described herein are methods, further comprising contacting the sample with a reagent for intervention, wherein the reagent for intervention comprises a compound, nucleic acid, or cell; and comparing information collected from contacted versus non-contacted sample regions.

Provided herein are methods of biological cell information generation, the methods comprising: depositing DNA barcodes on a population of cells, wherein the DNA barcodes comprise a photo-reactive nucleobase capable of crosslinking to another nucleobase; forming concatemers via light-based steps comprising repeating the steps below: selectively radiating the population of cells at a first wavelength to form covalently linked complexes of DNA barcode hybridized to a substrate nucleic acid sequence; and selectively radiating the population of cells at a second wavelength to de-link the DNA barcode hybridized to a substrate nucleic acid sequence; and collecting the concatemers, wherein the collecting step is before or after the selectively radiating the population of cells at a second wavelength, and wherein the concatemers comprise information about the population of cells.

Provided herein are methods of spatial tissue information generation, the methods comprising: at least partial removal of paraffin from a sample comprising paraffin embedded tissue; heating the sample to at least a temperature of about 50° C.; contacting the sample with a nucleic acid polymerase and a primer to generate amplification products; depositing DNA barcodes onto the sample, wherein the DNA barcodes comprise a region complementary to a region of the amplification products, and wherein the DNA barcodes comprise a photo-reactive nucleobase capable of crosslinking to another nucleobase; selectively radiating the sample to form covalently linked DNA barcode-amplification product complexes, wherein the selectively radiating occurs at different locations for a first selectively radiating step and a second selectively radiating step; washing the sample to remove the DNA barcodes that are not complexed to amplification products; and determining spatial tissue information based at least in part on the generate amplification products and the DNA barcodes. Further provided herein are methods, wherein heating the sample is of a temperature from 50° C. to 120° C. Further provided herein are methods, further comprising determining biological cell spatial information based at least in part on the generate amplification products and the DNA barcodes. Further provided herein are methods, further comprising synthesizing a continuous DNA strand, wherein the synthesizing comprises contacting the DNA barcode-amplification product complexes with a polymerase. Further provided herein are methods, wherein the synthesizing comprises a cross-junction synthesis. Further provided herein are methods, further comprising displacing the continuous DNA strand from the population of cells. Further provided herein are methods, wherein the synthesizing and displacing occur simultaneously. Further provided herein are methods, wherein the synthesizing occurs prior to the displacing. Further provided herein are methods, wherein the synthesizing occurs after the displacing. Further provided herein are methods, wherein the displaced continuous DNA strands are pooled. Further provided herein are methods, wherein the pooled continuous DNA strands are amplified. Further provided herein are methods, wherein the pooled continuous DNA strands are sequenced. Further provided herein are methods, further comprising identifying targets associated with the continuous DNA strands. Further provided herein are methods, further comprising mapping the targets to the different locations.

Provided herein are methods of biological cell spatial information generation, the methods comprising: depositing DNA barcodes, wherein the DNA barcodes comprise a photo-reactive nucleobase capable of crosslinking to another nucleobase onto a population of cells, and wherein the DNA barcodes hybridize to a target region; selectively radiating the population of cells at at least one region of interest (ROI) to form covalently linked DNA barcode-target complexes, wherein the radiating is selectively varied by intensity or duration; washing the population of cells to remove the DNA barcodes that are not complexed to the target region; and repeating the depositing, selectively radiating, and washing steps, wherein the DNA barcodes in a first of the depositing steps comprise a different sequence than the DNA barcodes in a second of the depositing steps and wherein the second selectively radiating step is applied at a same or different duration or intensity than the first selectively radiating step. Further provided herein are methods, wherein the first selectively radiating step, the second selectively radiating step, or both are applied as an intensity gradient across the at least one ROI. Further provided herein are methods, wherein the second intensity gradient is applied parallel, orthogonal, perpendicular, or at another angle relative to the first intensity gradient.

Provided herein are nucleic acid libraries produced according to methods described herein.

EXAMPLES

The examples below further illustrate the described embodiments without limiting the scope of this disclosure.

Example 1: Fixation of Samples

Samples are fixed according to the following method. MRC-5 (human, ATCC CCL-171) and HEK293T cells (human, ATCC CRL-1573) are grown in Dulbecco's modified Eagle medium (Gibco #10564) supplemented with 10% (vol/vol) serum (Gibco #10437 for MRC-5 and Peak Serum PS-FB2 for HEK293 Ts), 50 U/mL penicillin, and 50 μg/mL streptomycin (Gibco #15070). EY.T4 embryonic fibroblasts (mouse) 49 are grown in Dulbecco's modified Eagle medium supplemented with 15% (vol/vol) serum, 50 U/mL penicillin, and 50 μg/mL streptomycin. Cells are cultured at 37 degrees C. in the presence of 5% C02.

Cells are pre-washed with phosphate buffer (PBS), 0.1% TWEEN® 80 in PBS, 0.1% polysorbate 20 (TWEEN® 20) in PBS or Hank's Balanced Salt Solution (HBSS). Samples are fixed in 1-10% formaldehyde followed by washes with PBS or HBSS. Cells are optionally permeabilized with 0%-2.5% Triton X-100+0.1% TWEEN® 20. The fixed sample can be maintained at a temperature of 4 to 45 degrees Celsius. Samples are fixed at room temperature (20 to 25 degrees C.) for approximately 5 to 20 minutes prior to barcode hybridization. Alternatively, samples are fixed at lower temperatures at 4 degrees C. and stored for up to two weeks before barcoding. After fixation, the samples are washed with PBS or 0.1% TWEEN® 20 in PBS. Bovine serum albumin (BSA) is used as a blocking agent to reduce non-specific detection of the target nucleic acids and proteins. Other blocking agents or detergents can be used. When blocking, the cells are incubated in the BSA or detergent at room temperature.

Example 2: Barcode Hybridization and Imaging

To a fixed tissue sample, such as that generated in Example 1, barcodes are hybridized to the target nucleic acids using the reagents listed in Table 1. The reagent conditions include exemplary ranges of concentrations that permit DNA barcode hybridization to a target.

TABLE 1

| Barcode Hybridization Reagents | | |
|---|---|---|
| Reagent Type | Reagents | Reagent Concentration Ranges |
| Salt | Phosphate buffer solution (PBS) | 0.1X to 1X |
| | Sodium Chloride (NaCl); | 0 to 1M |
| | Magnesium Chloride (MgCl₂) | 10 mM to 100 mM |
| Detergents | Triton X-100 and | 0% to 2.5% (w/v) |
| | polysorbate 20 (TWEEN ® 20) | 0% to 1% (w/v) |
| Blocking | dextran sulfate | 0 to 20% (w/v) |
| | bovine serum albumin (BSA) | 1% to 10% (w/v) |
| | sheared salmon sperm DNA | 0% to 15% (w/v) |
| Additional agents | tRNA, yeast tRNA | 0.1 pg to 5 μg |
| Barcode | Barcode 1 strand and/or Barcode 2 strand | 100 nM to 500 nM |

TABLE 1-continued

| Barcode Hybridization Reagents | | |
|---|---|---|
| Reagent Type | Reagents | Reagent Concentration Ranges |
| RNAse | Rnase H (New England Biolabs ®) | 200 to 300 U/ml |
| Cross-junction Synthesis Buffer | ThermoPol Reaction buffer (New England Biolabs) | 1X |
| | dNTP (New England Biolabs) | 100 uM |
| | BST LF polymerase (New England Biolabs) | 800 U/ml |

A barcoding solution consisting of 250 nM Barcode 1 strand is admixed in PBS and TWEEN® 20 (PBST) with 2 mg/ml sheared salmon sperm DNA (Invitrogen AM9680), 10% dextran sulfate (wt/vol, Sigma Aldrich S4030), and 500 mM NaCl is applied to the fixed tissue sample for 20 min up to 1 hour. Samples are washed with PBST with 1 M NaCl 3 times for approximately 1 min each. Fixed samples can be maintained in the barcoding solution at a temperature of approximately 20 up to 60 degrees Celsius prior to irradiation.

Using microscopy, the desired regions on the tissue sample are visually identified in brightfield images. Hand-drawn masks are set as photostimulation regions. A high-power liquid light guide coupled LED source is applied at 365 nm to a selected region of interest on the sample per barcoding round. The microscope focus is set to a desired layer on the sample and photomask regions are manually selected. Samples are photo-stimulated, imaged and then washed with approximately 0.1×-1×PBS; 25 to 80% formamide; and 0% up to 1% TWEEN® 20.

Additional barcode strands can be added to the barcoding solution after finding the same cell area within the fixed sample. After barcoding, samples are optionally treated with a cross-junction synthesis solution consisting of Rnase H, and reverse transcription buffer. cDNAs can be extracted by washing the cells with PBST and collecting the supernatant in a tube for amplification and/or next generation sequencing. cDNAs can be pooled together or in separate in sequential barcoding steps for sequencing analysis.

Example 3: Binary Encoding

Figures 8, 9, 10:
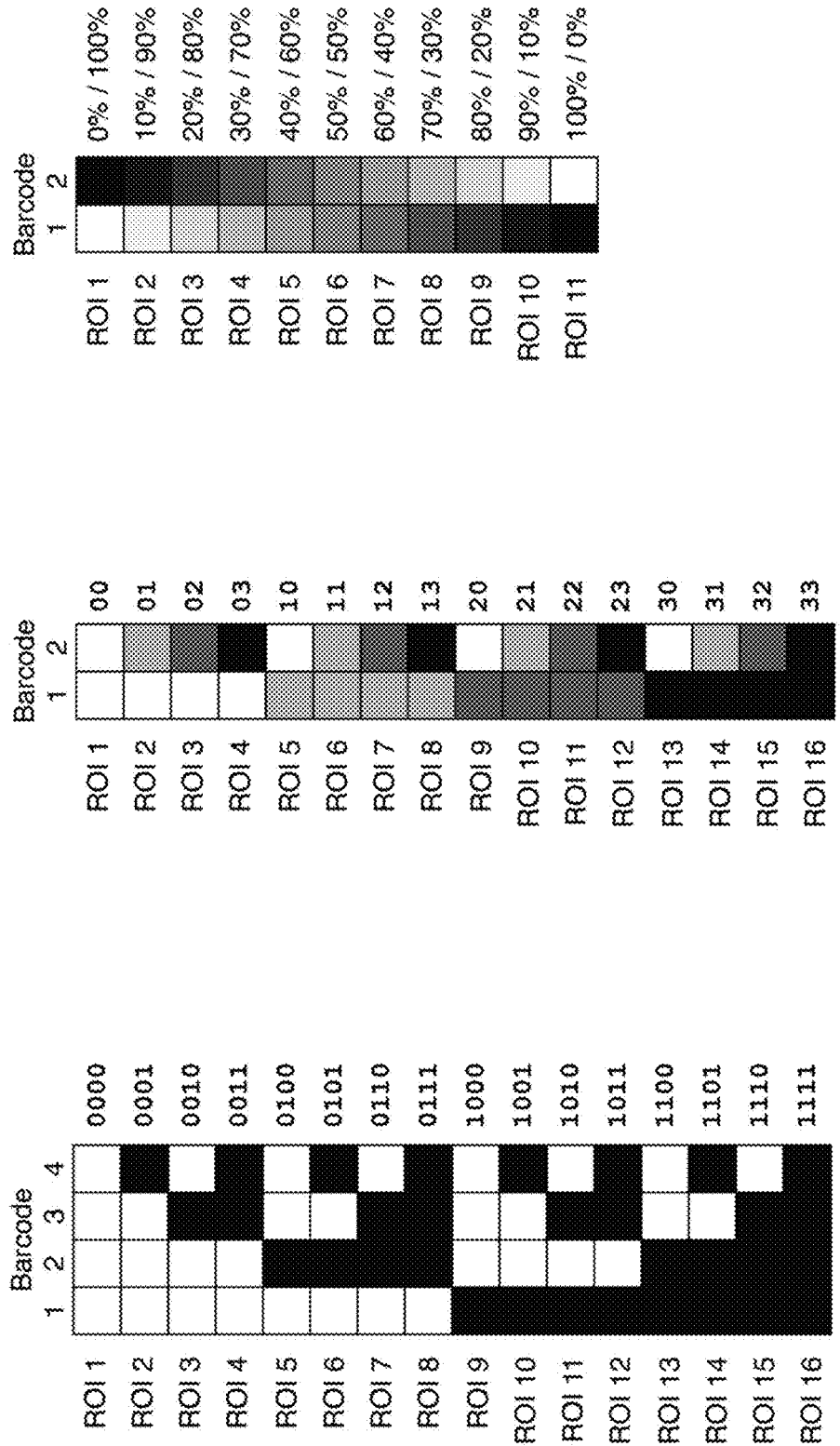
FIG. 8 illustrates coding combinations with 4 barcode strands using a binary encoding method.
FIG. 9 illustrates coding combinations with 2 barcode strands using a quaternary encoding method.
FIG. 10 illustrates coding combinations with 2 barcode strands using a fractional encoding method.

A combination of four barcodes can define 16 distinct ROIs using on/off binary encoding. A sample is spatially defined with 16 regions of interest (ROI). Four unique barcodes are applied in 4 rounds of crosslinking iterations. In each of the four crosslinking rounds, light is applied to half the ROI. Any illuminated fraction in each round comprises approximately ¼ (25%) or less saturation, providing for 24=16 possible combinations of the 4 barcode strands being crosslinked or not crosslinked in each region. This is represented in FIG. 8, with a filled square representing some fraction of reads in a region containing the barcode corresponding to that column, and an empty white square representing no illumination during that barcoding round. As shown on the right of the figure, a binary encoding is assigned for the four barcodes, allowing for 16 possible combinations.

Example 4: Quaternary Encoding

A combination of two barcodes can define 16 distinct ROIs using quaternary encoding. A sample is spatially defined with 16 regions of interest (ROI). Two unique barcodes are applied in two rounds of crosslinking iterations. In each of the two crosslinking rounds, light is applied to 75% of the ROI at one of three different power levels such that the most illuminated fraction in each round comprises approximately ½ (50%) or less crosslink saturation of sites. This provides for $4^2=16$ distinct combinations of the 2 barcode strands crosslinked fractions. Combinations are illustrated in FIG. 9, with gradations of filled squares representing different fraction of reads in a region containing the barcode corresponding to that column, and an empty white square representing there was no illumination during that barcoding round. On the right, a quaternary encoding for the two barcodes can be assigned to each of these cases.

Example 5: Fractional Encoding

Fractional barcoding provides for a vastly larger number of possible distinct identification encodings. For example, illumination at 11 different power levels using only two barcodes, can define 121 distinct ROI. A sample is spatially defined with 11 regions of interest (ROI). Two unique barcodes are applied in two rounds of crosslinking iterations. In each of the crosslinking rounds, light is applied to each ROI at 10 different gradations such that there is a unique ratio of barcode fractions. Light is applied at gradations providing for 0%, 10%, 20%, 30%, 40%, 50%, 60%, 70%, 80%, 90%, and 100% barcoded fraction. These 11 ratios of the two barcode strands are illustrated in FIG. 10, with gradations of filled squares representing different fractions of reads in a region containing the barcode corresponding to that column, and empty white squares representing there was no illumination during that barcoding round. This allows for 121 (=11*11) distinct combinations of the 2 barcode strands crosslinked fractions. On the right, a ratio-based encoding for the two barcodes can be assigned to each of these cases. FIG. 10 shows only a fraction of the 121 possible combinations of barcode fractions.

Example 6: Spatial Barcoding Method Across Multiple Tissues and Tissue Fixation Protocols Robustness of the method to different tissue fixation protocols is an important feature of the spatial sequencing method described herein. It was found that consistent sequencing results were successfully generated from tissues prepared under different fixation conditions.

Fixation

Brain, spleen, and liver samples were collected from mice using three different fixation conditions. Fixation condition 1 (PFA) comprised transfer of freshly dissected organs into 4% PFA in 1×PBS for 30 min at room temperature, followed by transfer to PBS and cryopreservation at −80° C. Fixation condition 2 (PFA-Tx) comprised transfer of freshly dissected organs into 4% PFA with 0.25% Triton X-100 in 1×PBS for 30 min at RT followed by three 5 min washes in PBS, transfer to 7% sucrose in 1×PBS for 10 min, and then a final transfer to a 1:1 mixture of optimal cutting temperature (OCT) compound+30% sucrose in 1×PBS. Samples were then cryopreserved at −80° C. Fixation condition 3 (Formalin or FFPE) comprised transfer of freshly dissected organs into 10% Neutral Buffered Formalin for fixation overnight at room temperature, followed by transfer into PBS and cryopreservation at −80° C.

Frozen tissue blocks were sectioned at 15 μm onto microscope coverslips and separated using well chambers for individually contained liquid exchanges.

Washing and Barcoding

Samples were washed with 1×PBS, 0.1% Tween-20 with 60% formamide three times, followed by two washes with 1×PBS, 0.1% Tween-20, 1M NaCl, followed by 1×PBS, 0.1% Tween-20 twice. A-tailing of the cDNAs was then performed in situ using 1× ThermoPol Buffer, 1 mM dATP, and 1000 U/mL terminal transferase enzyme. Sections were incubated with this solution for 45 minutes at 37° C. before washing with 1×PBS, 0.1% Tween-20 three times.

Light-directed barcoding of cDNAs was performed using a Nikon Ti2-E microscope with a Mightex Polygon 1000 DMD connected to a 380 nm LED. The samples were incubated with Barcoding Solution, including a fluorophore (Cy5) labeled, UMI-containing, CNVK-containing barcode strand at 250 nM, 500 mM NaCl, and 10% dextran sulfate in 1×PBS, 0.1% Tween-20 for 30 minutes at room temperature. Barcoding Solution was then removed and samples were washed with 1×PBS, 0.1% Tween-20, 1M NaCl.

Photomasking

Figure 11:
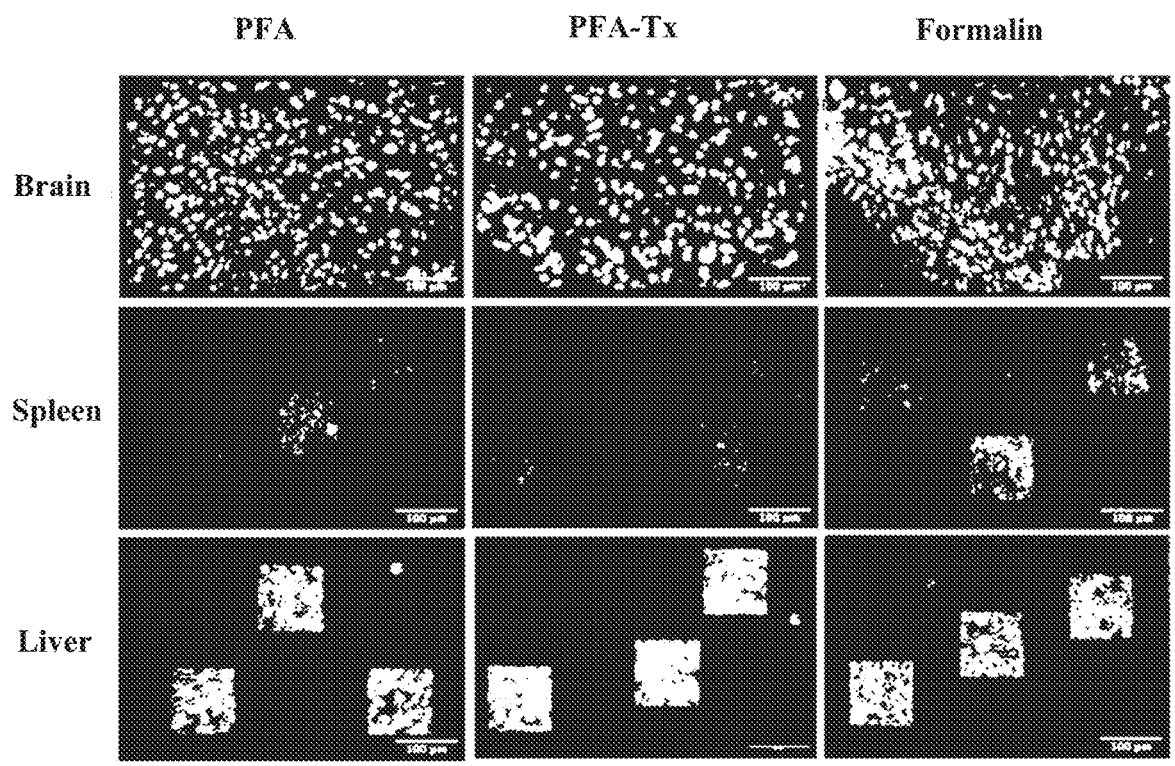
FIG. 11 shows representative images of brain, spleen, and liver sections fixed with paraformaldehyde (PFA), paraformaldehyde with Triton X-100 (PFA-Tx) and Formalin fixed-paraffin embedded (Formalin) after light-directed transcriptome barcoding with fluorescently labeled barcodes, showing transcriptome barcoding is comparable across tissue types and fixation conditions; bar in lower right corner of images corresponds to 100 µm.

Square regions of interest for illumination were hand drawn within the Nikon Elements Software and the DMD was used to selectively direct the light to the regions. Brain tissues were illuminated with a single large rectangular mask, while other tissues were illuminated with three individual square regions. Illumination was carried out for 10 seconds at 20% 380 nm LED power. Samples were then washed with 60% formamide in 1×PBS, 0.1% Tween-20 eight times, followed by two washes in 1×PBS, 0.1% Tween-20 with NaCl. The barcode signal was then imaged after washing, with the fluorescently labeled barcode strand visible in the regions of interest (ROI)s representing successful light-directed barcoding. FIG. 11 shows representative images of brain, spleen, and liver sections after light-directed transcriptome barcoding. Samples were prepared according to Fixation conditions 1 (PFA), 2 (PFA-Tx), and 3 (Formalin) as described herein. In the brain, barcode deposition was largely restricted to cell bodies and little signal was observed in the axon-dense regions, consistent with the majority of transcribed in situ transcribed cDNA being localized to cell bodies. Successful transcriptome barcoding was observed in all tissue types and all fixation conditions.

Extraction and Sequencing

Barcoded cDNAs were then extracted from the samples by treating with RNase H at 250 U/mL in 1× ThermoPol reaction buffer and incubated at 37° C. for 45 minutes. Barcoded cDNAs were then transferred to a PCR tube for copying and amplification for next-generation sequencing.

Extracted cDNAs were copied using a polyT primer that hybridized to the A tails of the cDNA sequences. Copies of linked cDNA-barcode sequences were created by mixing the extracted cDNAs with primer sequences, and adding strand displacing Bst polymerase to 800 U/mL, 1× ThermoPol buffer, dNTPs to 100 uM, and the polyT primer to 20 nM for 45 min at 37° C. Samples were heat inactivated at 80° C. for 20 minutes.

Concentration of cDNA libraries were quantified and libraries were amplified in a PCR with a 1:1 ratio of a PCR mix with of Sybr Green I, Kapa HiFi Buffer, forward and reverse primers at 600 nM each, dNTPs at 600 μM, and Kapa HiFi Hot Start Polymerase in a qPCR machine: 8° C. for 3 min, followed by 30 cycles of: 98° C. for 20 sec, 72° C. for 2 min. Amplified libraries were then tagmented and prepared for next-generation sequencing using standard library preparation. Sequencing was performed on an Illumina MiniSeq machine, using a custom RI and index 2 primer.

Data Analysis

To analyze the next-generation sequencing data, sequences were parsed using unique molecular identifier (UMI)-tools. cDNA sequences were mapped to the mouse genome (vM27) using the STAR aligner. All reads that multi-mapped to the genome were discarded, and the single-mapped reads were then mapped to annotated transcripts using a FeatureCounts tool. Unique cDNA sequences within the library were identified by deduplication, based on the UMI attached to the cDNA via the barcode oligo during the light-directed barcoding step. Only a single UMI/mapped cDNA pair was retained for all cases, yielding a matrix of unique cDNA molecule counts across all genes. This is further referred to as the RNA count vector for each sample, and the RNA count matrix refers to the matrix containing multiple RNA count vectors.

Next-generation sequencing data from brain and liver samples fixed in Formalin and PFA were analyzed for differential expression of genes, to evaluate consistency of the transcriptome sequencing data across fixation conditions. Briefly, DESeq2 was used for the differential expression analysis across samples, with significantly differentially expressed genes called as those with adjusted p-values of <0.05 (after Benjamini-Hochberg correction for multiple hypothesis testing). Count matrices were generated with the number of unique barcoded cDNAs detected in each spatially-targeted region per gene. Table 2 shows the generated matrix.

Comparing expression levels detected in PFA-fixed brains to Formalin-fixed brains as shown in Table 2, there was only a single significantly differentially expressed gene. Similarly, there were zero significantly differentially expressed genes across liver samples that were fixed with formalin versus PFA. In contrast, these same samples showed hundreds to >1000 significantly differentially expressed genes when cross-organ comparisons were made, for all pairs of fixation conditions. These data support that the spatial transcriptomics method yields consistent results across fixation conditions from the same organ, and reproducible organ-specific results across organs.

TABLE 2

Differential gene expression across tissues and fixation conditions

| | Brain, Formalin | Brain, PFA | Liver, Formalin | Liver, PFA |
|---|---|---|---|---|
| Brain, Formalin | 0 | 1 | 1008 | 673 |
| Brain, PFA | 1 | 0 | 511 | 816 |
| Liver, Formalin | 1008 | 511 | 0 | 0 |
| Liver, PFA | 673 | 816 | 0 | 0 |

FIG. 11 demonstrates successful barcode deposition across tissue samples from brain, spleen, and liver tissue prepared with three different fixation conditions. Gene expression data shows that sequencing libraries from the same tissue were very similar to one another, independent of the different fixation conditions. Differential expression analysis demonstrated hundreds-to-thousands of statistically differentially expressed genes when compared across organ types. At most, a single differentially expressed gene was found when compared across fixation conditions for the same organ.

Example 7: Spatial Barcoding and Transcriptome Sequencing can be Applied to FFPE and PFA-TX Fixed Tissues Historically, it has been extremely difficult to sequence RNA from Formalin-fixed paraffin-embedded (FFPE) tissues. However, many samples have routinely been preserved using FFPE and being able to generate data from FFPE samples as described herein provides a major advantage. Light-directed transcriptome barcoding in FFPE liver tissue was demonstrated with an image-based readout. It was further demonstrated that when FFPE liver sequencing results were compared (in the form of the gene count matrix), the detected expression of genes were consistent among FFPE and PFA-Tx fixed livers. The FFPE liver gene counts were also well-correlated with PFA-Tx gene counts, and not correlated with brain counts.

For PFA-Tx samples, mouse liver was fixed with 4% PFA, 0.25% Triton-X-100 in 1×PBS solution by intracardiac perfusion, followed by dissection and overnight incubation at 4° C. in fixative. Tissues were then washed with 1×PBS and were immersed in 7.5% sucrose in 1×PBS. Tissues were then immersed in a 1:1 solution of 30% sucrose in 1×PBS and OCT cryoprotectant solution. Tissues were then stored at −80° C. until use. For FFPE liver tissue, tissues were submerged in fresh 10% neutral buffered formalin solution long enough to ensure adequate fixation, between 4 and 72 hours. Tissue was then embedded in paraffin and stored at 4° C. until use. For PFA Brain tissue samples, brains were dissected from the post-mortem animal and dropped into a 4% PFA, 0.25% Triton-X-100 in 1×PBS solution for 30 minutes at room temperature, and then immersed in 7.5% sucrose in 1×PBS. Tissues were then immersed in a 1:1 solution of 30% sucrose in 1×PBS and OCT cryoprotectant solution. Tissues were then stored at −80° C. until spatial sequencing.

Fifteen micron sections were sliced and placed onto microscope slides and baked at 60° C. for 1 hour. For the FFPE samples, sections were deparaffinized and antigen retrieval was performed in decloaking buffer at 90° C. for 15 minutes, followed by 70° C. for 30 seconds, followed by cooling to room temperature. Sections were then washed twice with water and slides were air dried before rehydrating with 1×PBS, 0.1% Tween before proceeding to reverse transcription steps below. For non-FFPE brain and liver tissues, sections were washed with 1×PBS, 0.1% Tween-20 thrice and incubated with antigen retrieval buffer (Tris-EDTA, pH 8) for 30 minutes at 70° C. Samples were then returned to 1×PBS, 0.1% Tween before proceeding to reverse transcription steps below.

All tissue sections underwent the same processing steps for cDNA library generation, barcoding, and sequence library preparation. Tissue sections were washed three times with 1×PBS, 0.1% Tween-20, followed by incubation with reverse transcription mix (300 μM dNTPs, 0.5% Triton-X-100, 6 mM RNaseOUT, 1 μM RT primer, and 8 U/μl Maxima RT enzyme in RT buffer, and incubated for 30 min at 22° C., followed by 12 cycles of 8° C. for 30 sec, 15° C. for 30 sec, 25° C. for 30 sec, 30° C. for 1 min, 37° C. for 1 min, and 42° C. for 2 min, followed by 42° C. for 30 min.

Sample washing and barcoding was performed as described in Example 6.

Figure 12A:
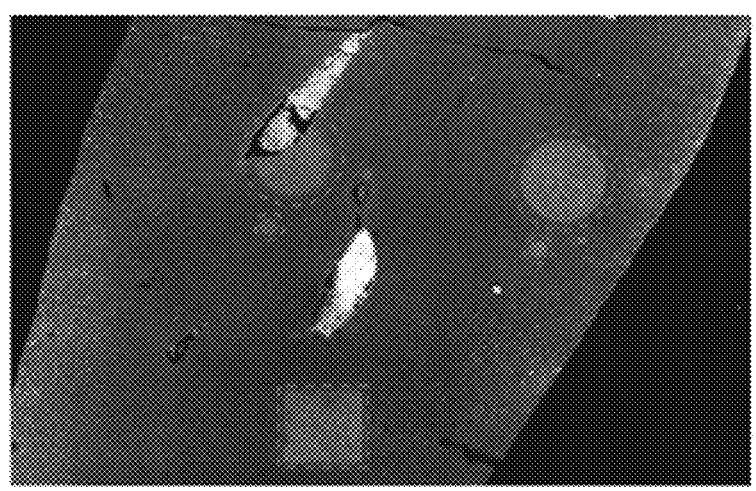
FIG. 12A is an image of FFPE liver section showing fluorescently-labelled barcoding in regions of interest marked by dashed lines.

Regions of interest for illumination were hand drawn within the Nikon Elements Software and the DMD was used to direct the light selectively to the regions. Illumination was carried out for 10 seconds at 20% LED power. Three section replicates of each HIER condition (both 95° C. and 70° C.) were treated as "no UV controls", and did not receive illumination with the 380 nm LED, but were otherwise treated identically. Samples were then washed eight times with 60% formamide in 1×PBS, and 0.1% Tween-20, followed by 2 washes in 1×PBS, 0.1% Tween-20, and NaCl. The barcode signal was then imaged after washing, with the fluorescently labeled barcode strand visible in the ROIs representing successful light-directed barcoding. FIG. 12A shows a representative image of light-directed spatial transcriptome barcoding in an FFPE liver section, with circular and square regions of interest for illumination as described. This figure depicts successful light-directed transcriptome barcoding in an FFPE sample Extraction and sequencing of samples was performed as described in Example 6.

Figure 12B:
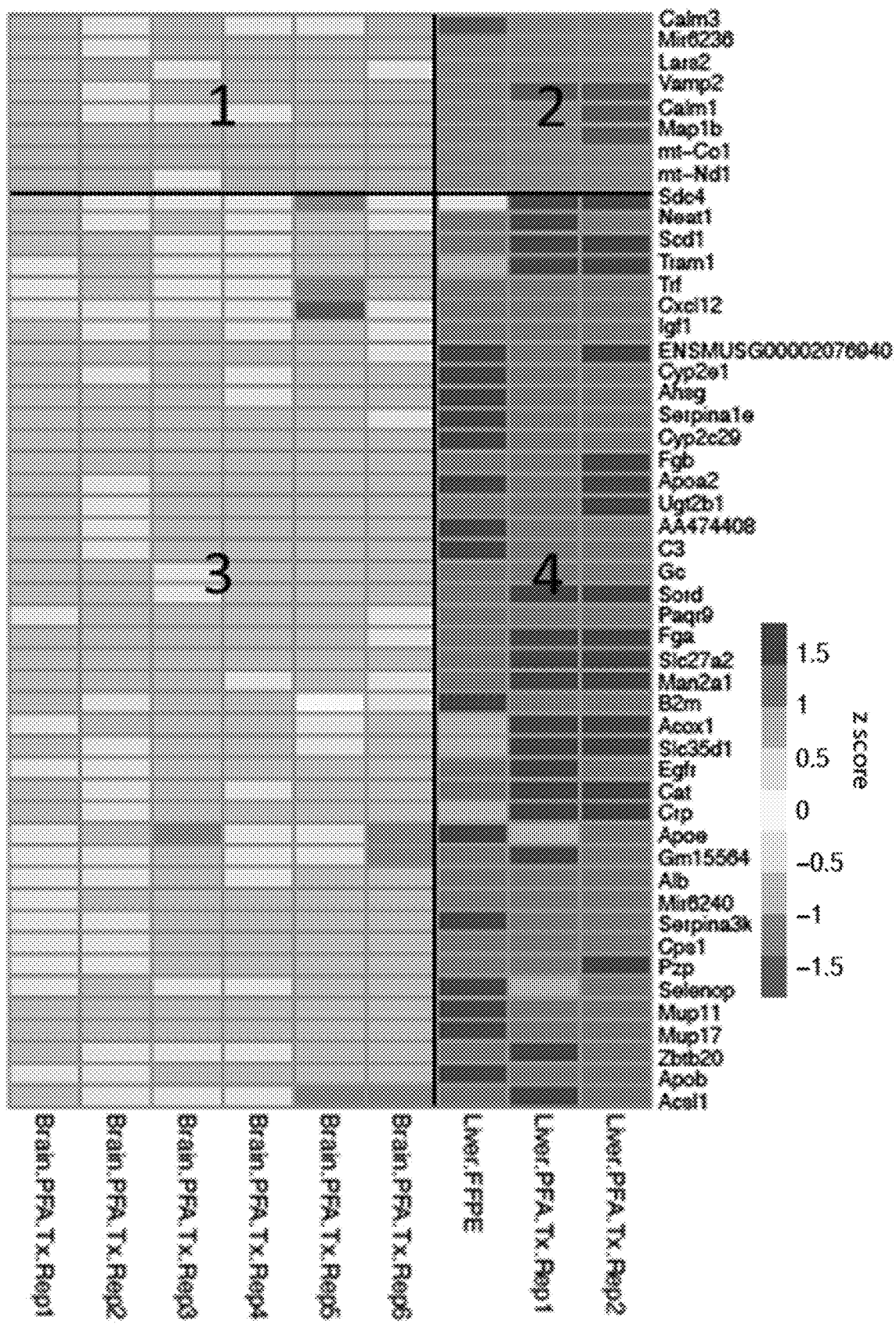
FIG. 12B is a heatmap showing z scores of detected expression in 50 genes in PFA-Tx-fixed brain sections and PFA-Tx and FFPE-fixed liver samples, indicating increased expression of canonical organ marker genes and consistent detection levels across preparation methods.

Sequencing data analysis was carried out as described in Example 6. The top 50 differentially expressed genes from full transcriptome sequencing data derived from spatially barcoded brain samples (n=6 replicates) fixed with PFA-Tx versus liver samples (n=3, with two fixed with PFA-Tx perfusion and drop fixation and one with standard FFPE fixation procedure) were compiled in the heatmap in FIG. 12B from calculated z scores. Differential expression analysis revealed gene expression patterns across the two organs, and consistent expression patterns of the top differentially expressed genes were found across liver samples with different fixation conditions. Region 1 of FIG. 12B shows z scores of expression levels of canonically brain-expressed genes as detected in fixed brain samples, indicating high expression levels. Region 2 of FIG. 12B shows z scores of expression levels of canonically brain-expressed genes as detected in fixed liver samples, indicating low expression levels. Region 3 of FIG. 12B shows z scores of expression levels of canonically liver-expressed genes as detected in fixed brain samples, indicating low expression levels. Region 4 of FIG. 12B shows z scores of expression levels of canonically liver-expressed genes as detected in fixed liver samples, indicating high expression levels.

Figure 12C:
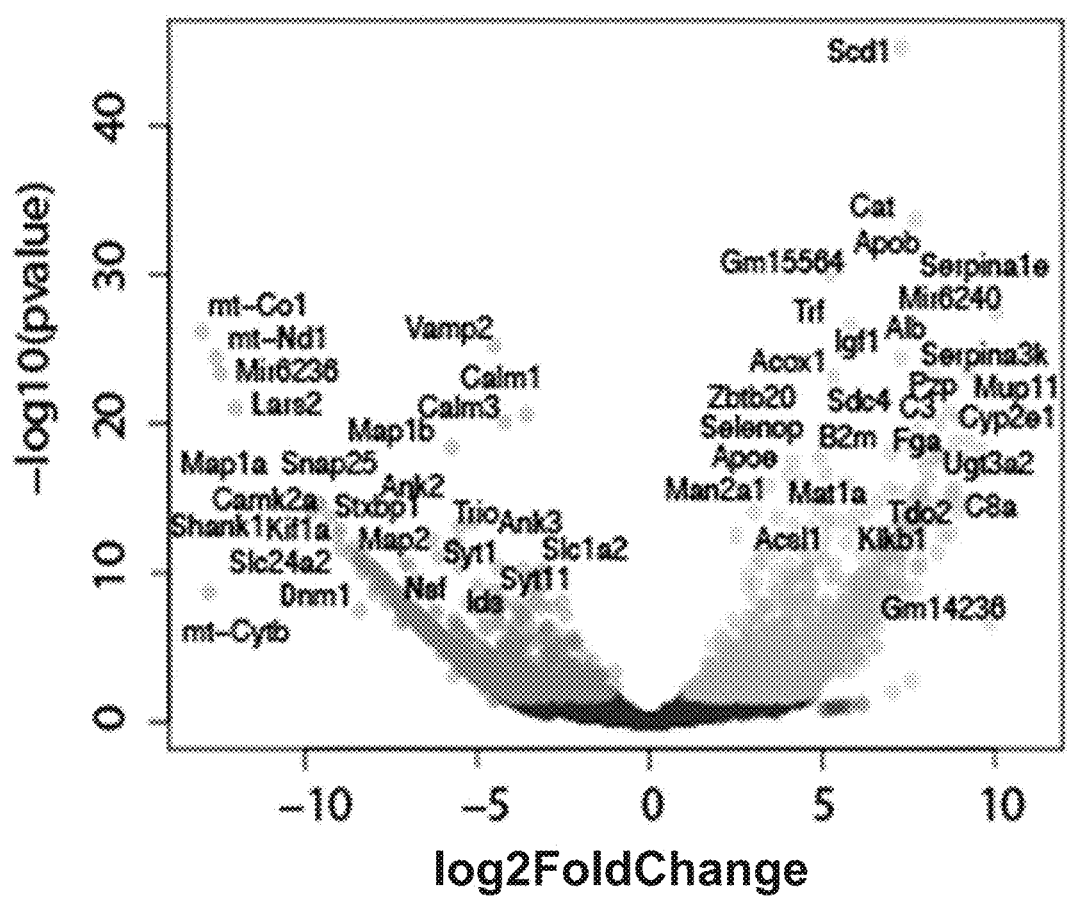
FIG. 12C is a volcano plot showing relative expression levels of select gene sets with canonical organ-specific expression in samples as described in FIG. 12B.

Differential expression results among liver and brain samples were compiled in the volcano plot in FIG. 12C. Liver data is from two PFA-Tx fixed and one FFPE fixed sections. Brain data is from six PFA-TX fixed sections. Data is derived from the same differential expression data used in FIG. 12B. Regardless of fixation conditions in liver samples, differential expression was well-powered to recover thousands of differentially expressed genes between the organs, with p-values<<0.05 after correction for multiple hypothesis testing (y-axis) and log 2FoldChanges with absolute values of up to 10 (x-axis). Select genes are displayed, composed of gene sets with canonical organ-specific expression, as expected.

Figure 12D:
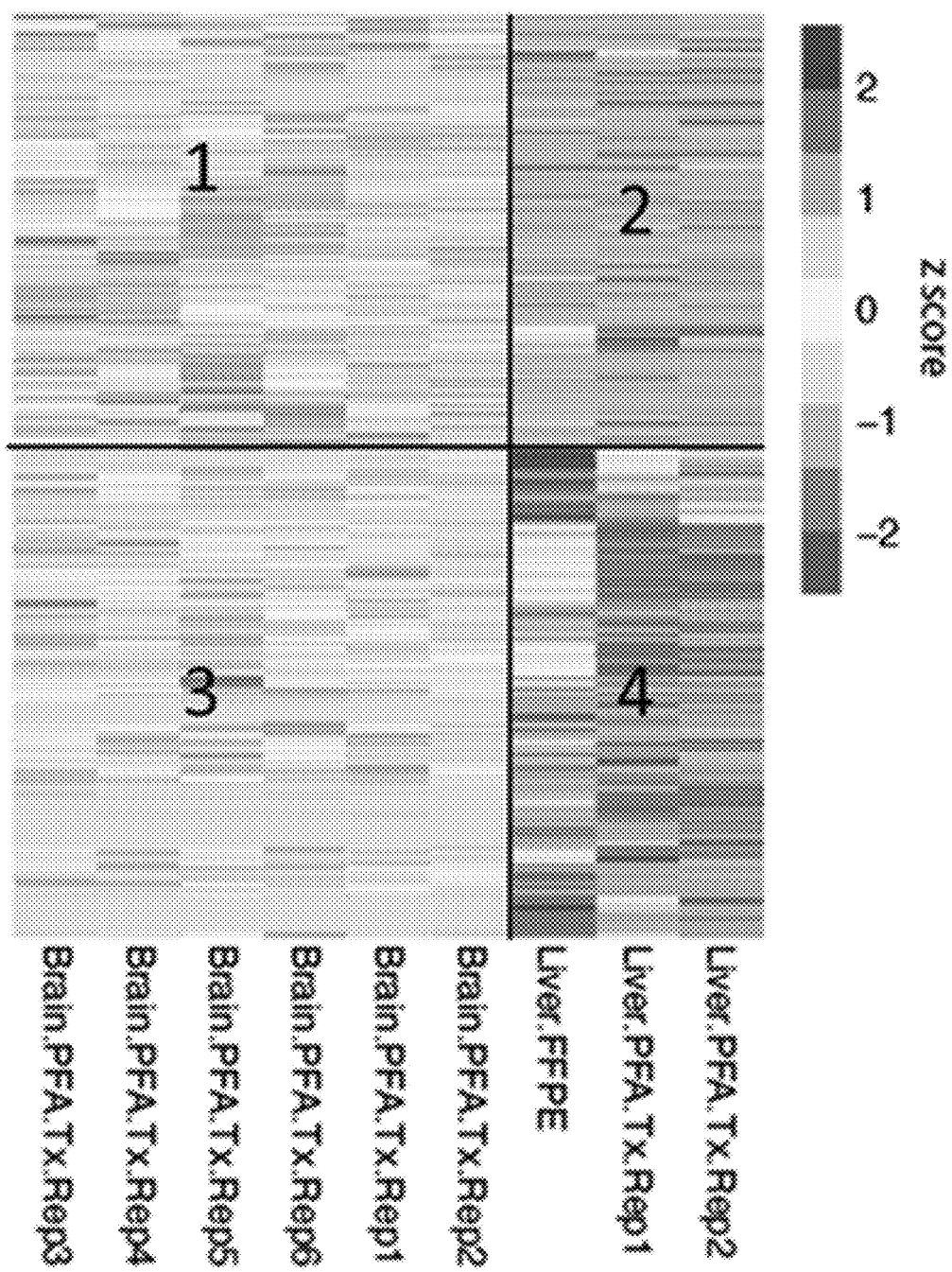
FIG. 12D is a heatmap showing z scores of relative expression levels of 2,653 differentially-expressed genes, indicating increased detected expression in canonical organ marker genes.

A heatmap generated from z scores of DESeq2 analysis of the full cohort of 2,653 differentially expressed genes is shown in FIG. 12D. Rows display individual genes, and columns represent individual samples (the same samples as analyzed in FIG. 12B and FIG. 12C). Color reflects z-score of normalized transcript counts. Region 1 of FIG. 12D shows z scores of expression levels of canonically brain-expressed genes as detected in fixed brain samples, indicating generally higher expression levels relative to a mean across all samples. A higher z-score (darker color) displays enrichment of that gene in that sample, relative to the average of all sample. Explicitly, the z-score is the: ((Gene expression value in sample of interest)−(Mean expression across all samples))/Standard Deviation across all samples. Region 2 of FIG. 12D shows z scores of expression levels of canonically brain-expressed genes as detected in fixed liver samples, indicating generally lower expression levels relative to a mean. Region 3 of FIG. 12D shows z scores of expression levels of canonically liver-expressed genes as detected in fixed brain samples, indicating generally lower expression levels relative to a mean. Region 4 of FIG. 12D shows z scores of expression levels of canonically liver-expressed genes as detected in fixed liver samples, indicating higher expression levels relative to a mean. The high number of significantly differential genes across the brain versus liver samples and the consistency of the expression of genes relative to the brain samples (represented as color, z-score) further supports the consistency of FFPE-fixed liver sample transcriptomes with the PFA-Tx-fixed liver transcriptomes.

Figure 12E:
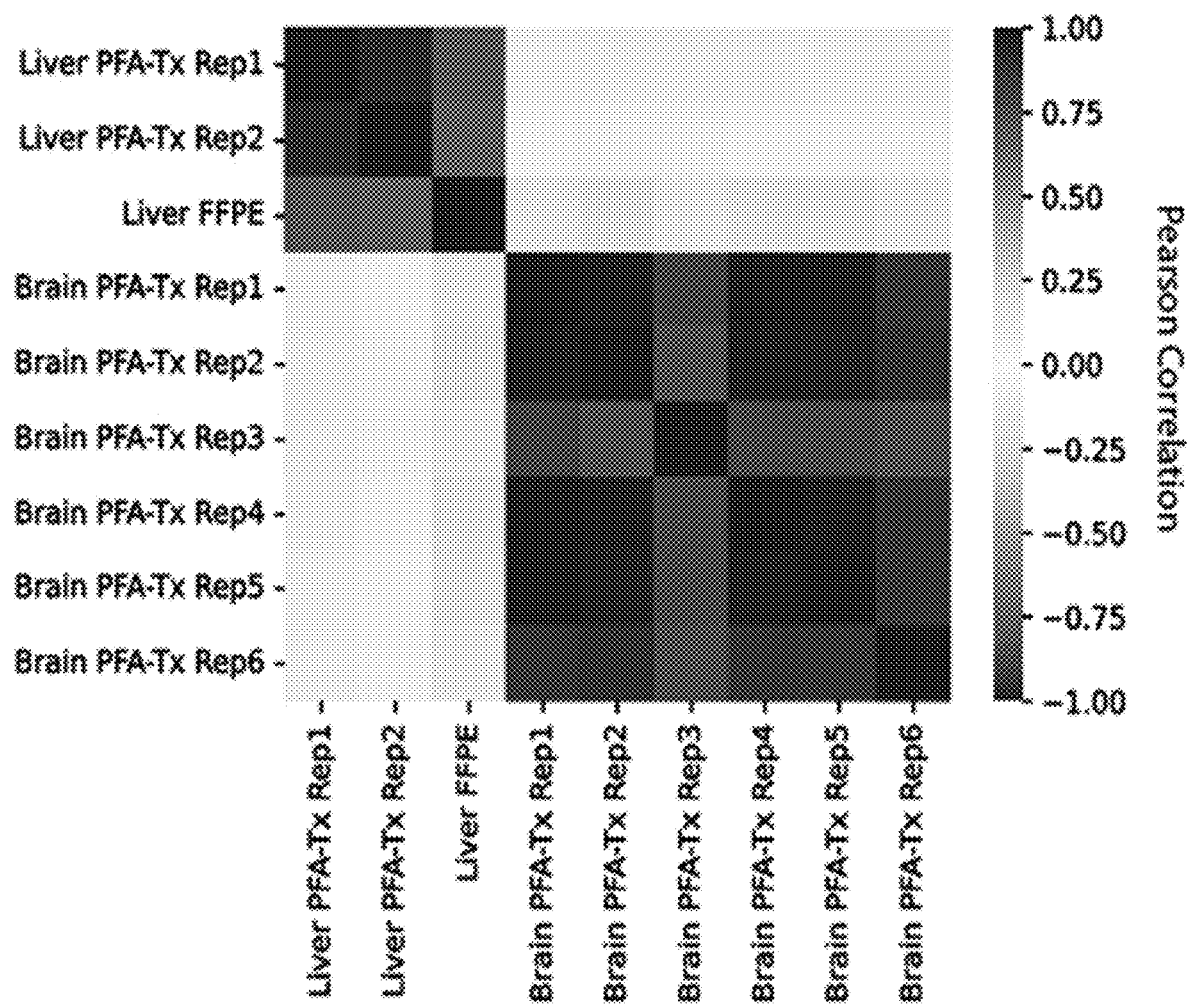
FIG. 12E is a heatmap showing Pearson Correlations computed to compare mRNA expression values in FFPE versus PFA-Tx-fixed tissue, showing high correlation among liver or brain samples and low correlation when comparing liver versus brain samples.

To directly assess consistency of spatially barcoded and sequenced transcriptomes for FFPE versus PFA-Tx fixed tissue, the pairwise Pearson Correlations were computed to compare the unique mRNA gene expression vectors for each pair of samples, alternately referred to as mRNA count vectors. Resulting Pearson Correlation numbers are compiled in a heatmap shown in FIG. 12E. This metric directly assesses the concordance of gene expression across all genes in the genome. The color represents the Pearson correlation coefficient between the paired samples. For FFPE liver versus PFA-Tx liver, the Pearson correlation coefficient was >0.7 in all cases, indicating strong correlation among liver samples despite different fixations. The Pearson correlation coefficient for all inter-organ comparisons was <0.3.

Example 8: Heat-Induced Epitope Retrieval (HIER) to Increase Barcoded cDNA Recovery Protocol optimization for the tissue pretreatment steps was performed to increase the amount of barcoded cDNAs that can be recovered from a given tissue area. This example tested heat induced epitope retrieval conditions at two different temperatures, and found that the higher temperature results in higher amounts of barcoded cDNA. Quantification of the fluorescent barcode images and Cq values of the qPCR show where the library was amplified. When samples were treated with 95° C. heat step, the intensity of barcoding increased the image data and lowered the Cq values. Both of these measurements indicated that more cDNA was barcoded when this tissue pretreatment step was added.

Mouse livers were fixed with 4% PFA, 0.25% Triton-X-100 in 1×PBS solution by intracardiac perfusion, followed by dissection and overnight incubation at 4° C. in fixative. Tissues were then washed with 1×PBS and were immersed in 7.5% sucrose in 1×PBS. Tissues were then immersed in a 1:1 solution of 30% sucrose in 1×PBS and O.C.T. cryoprotectant solution. Tissues were then stored at −80° C. until use. Tissues were then immersed in a 1:1 solution of 30% sucrose in 1×PBS and O.C.T. cryoprotectant solution. Tissues were then stored at −80° C. until spatial sequencing was performed.

Frozen tissue blocks were then sectioned at 15 µm onto microscope coverslips and separated using well chambers for individually contained liquid exchanges. Slides were baked at 60° C. for 1 hour. Sections were then washed with 1×PBS, 0.1% Tween-20 thrice and incubated with antigen retrieval buffer (Tris-EDTA, pH 8) at either 70° C. or 95° C. for 30 minutes for heat induced epitope retrieval (HIER) to compare the two conditions directly. Then, all tissue sections underwent the same processing steps for cDNA library generation, barcoding, and sequence library preparation. Tissue sections were washed thrice with 1×PBS 0.1% with Tween-20, followed by incubation with reverse transcription mix (300 µM dNTPs, 0.5% Triton-X-100, 6 mM RNase-OUT, 1 µM RT primer, and 8 U/µl Maxima RT enzyme in RT buffer, and incubated for 30 min at 22° C., followed by 12 cycles of 8° C. for 30 sec, 15° C. for 30 sec, 25° C. for 30 sec, 30° C. for 1 min, 37° C. for 1 min, and 42° C. for 2 min, followed by 42° C. for 30 min.

Samples were washed with 1×PBS, 0.1% Tween-20 with 60% formamide three times, followed by two washes with 1×PBS, 0.1% Tween-20, and 1M NaCl, followed by 1×PBS, 0.1% Tween-20 twice. A-tailing of the cDNAs was then performed in situ using 1× A-ThermoPol Buffer, 1 mM dATP, and 1000 U/mL terminal transferase enzyme. Sections were incubated with this solution for 45 minutes at 37° C. before washing with 1×PBS, 0.1% Tween-20 three times.

Light-directed barcoding of cDNAs was then performed using a Nikon Ti2-E microscope with a Mightex Polygon 1000 DMD connected to a 380 nm LED. The samples were incubated with Barcoding Solution, including a FITC-labeled, UMI-containing, CNVK-containing barcode strand at 250 nM, 500 mM NaCl, and 10% dextran sulfate in 1×PBS, 0.1% Tween-20 for 30 minutes at room temperature. Barcoding Solution was then removed and samples were washed with 1×PBS, 0.1% Tween-20, and 1 M NaCl.

Figure 13A:
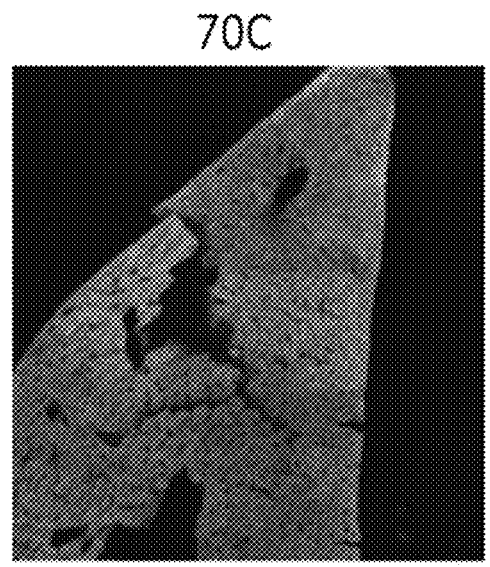
FIGS. 13A and 13B are images showing liver sections including a rectangular area of light-directed barcoding following heat induced epitope retrieval (HIER) treatment at 70° C.
Figure 13B:
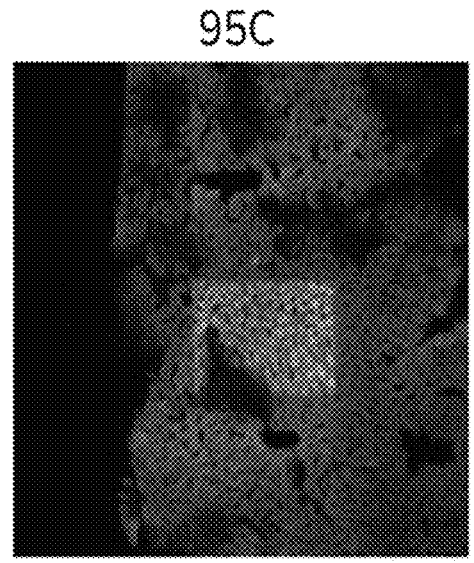

Regions of interest for illumination were hand drawn within the Nikon Elements Software and the DMD was used to direct the light selectively to the regions. Illumination was carried out for 10 seconds at 20% 385 nm LED power. Samples were then washed with 60% formamide in 1×PBS, 0.1% Tween-20 8 times, followed by 2 washes in 1×PBS, 0.1% Tween-20 with NaCl. The barcode signal was then imaged after washing, with the fluorescently labeled barcode strand visible in the ROIs representing successful light-directed barcoding. Images of barcoded liver sections following HIER treatment at 70° C. and 95° C. are depicted in FIG. 13A and FIG. 13B, respectively. Images show stronger barcoding signal in the higher temperature condition.

Figure 13C:
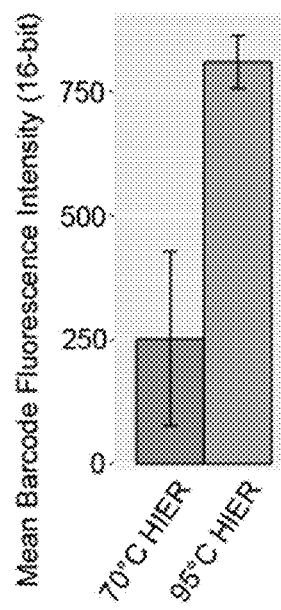
FIG. 13C is a bar plot of mean barcode fluorescence intensity in samples as shown in FIG. 13A and FIG. 13B, showing three-fold higher fluorescence intensity in samples treated at 95° C. compared to samples treated at 70° C.

The amount of barcode deposition was quantified based on fluorescent imaging of the tissue sections after transcriptome barcoding with FITC-labeled barcode strands. Mean intensity of fluorescence within the rectangular barcoded region, taken across n=3 replicates for each HIER condition was calculated. FIG. 13C shows a bar plot of the calculated means. Error bars represent standard deviation. These data demonstrate the efficiency of barcode deposition is increased after HIER at 95° C., relative to 70° C.

Extraction and sequencing of samples was performed as described in Example 6. Following thermocycling, the efficiency of light-directed barcoding was compared across the +/−UV conditions (expecting low signal from the −UV conditions relative to +UV) by comparing the Cq qPCR values.

Figure 13D:
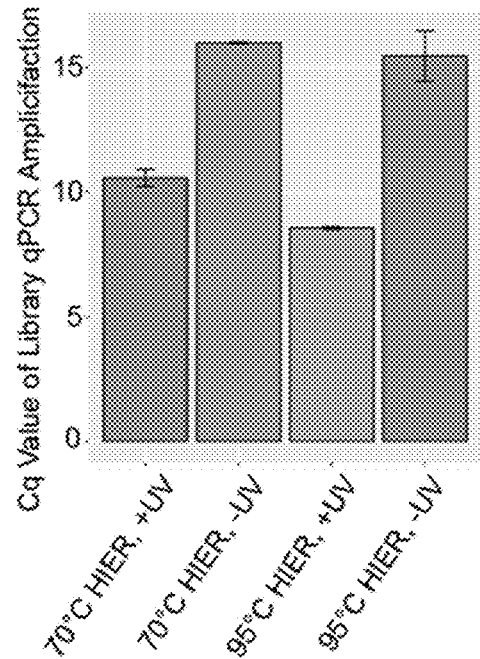
FIG. 13D is a bar plot of average Cq values of generated cDNA libraries collected from sections treated with HIER at 70° C. and 95° C. with and without UV treatment, showing samples treated at 95° C. amplified with fewer cycles than samples treated at 70° C., and control samples (not UV-treated) required at least 50% more amplification cycles than treated samples.

Quantification of the number of barcoded molecules in the barcoded cDNA libraries that were prepared from the different HIER and +/−UV conditions were assessed using qPCR, designed to use primers that only amplify barcoded cDNAs. The bar plot in FIG. 13D displays average Cq values across n=3 replicates, with standard deviation error bars. Samples +UV received spatially patterned UV illumination with a 380 nm LED for barcoding, while −UV samples did not. The 95° C. HIER condition +UV amplified approximately 2.5 cycles earlier than the 70° C. HIER +UV condition, consistent with a higher number of barcoded cDNA molecules in the 95° C. HIER condition. Taken together with the increased image intensity of barcoded regions after light-directed barcoding, these data support that 95° C. HIER enables more light-directed barcoding.

Example 9: Spatial Light-Directed Barcoding Using Distinct Optical Systems

The method for light-directed spatial barcoding was demonstrated across a wide range of optical parameters, including wavelengths, light delivery modalities (LED vs laser), illumination times, and illumination power. This was shown by representative image data where fluorescent DNA barcodes were deposited onto a tissue section that underwent reverse transcription in situ to introduce barcode dock sites on the 5' end of the cDNAs. The CNVK-containing, Cy5-labeled barcode strands were then hybridized to the sample and rectangular areas were illuminated with different optical parameters within the same tissue section. Light-directed barcoding was successful for the wide range of parameters, with some conditions yielding more efficient barcoding than others. These data emphasize the robustness of the method for light-directed spatial barcoding.

Mouse livers were fixed with 4% PFA, 0.25% Triton-X-100 in 1×PBS solution by intracardiac perfusion, followed by dissection and overnight incubation at 4° C. in fixative. Tissues were then washed with 1×PBS and were immersed in 7.5% sucrose in 1×PBS. Tissues were then immersed in a 1:1 solution of 30% sucrose in 1×PBS and OCT cryoprotectant solution. Tissues were then stored at −80° C. until spatial sequencing.

Fifteen micron sections were sliced, placed onto microscope slides, and baked at 60° C. for 1 hour. Sections were then washed with 1×PBS, 0.1% Tween-20 three times and incubated with antigen retrieval buffer (Tris-EDTA, pH 8) at 95° C. for 30 minutes.

Tissue sections underwent the following processing steps for cDNA library generation. Tissue sections were washed thrice with 1×PBS and 0.1% Tween-20, followed by incubation with reverse transcription mix (300 µM dNTPs, 0.5% Triton-X-100, 6 mM RNaseOUT, 1 µM RT primer, and 8 U/µl Maxima RT enzyme in RT buffer), and incubated for 30 min at 22° C., followed by 12 cycles of 8° C. for 30 sec, 15° C. for 30 sec, 25° C. for 30 sec, 30° C. for 1 min, 37° C. for 1 min, and 42° C. for 2 min, followed by 42° C. for 30 min.

Samples were washed with 1×PBS, 0.1% with 60% formamide Tween-20 thrice, followed by two washes with 1×PBS, 0.1% Tween-20, 1M NaCl, followed by 1×PBS, 0.1% Tween-20 twice. A-tailing of the cDNAs was then performed in situ using 1× A-ThermoPol Buffer, 1 mM dATP, and 1000 U/mL terminal transferase enzyme. Sections were incubated with this solution for 45 minutes at 37° C. before washing with 1×PBS, 0.1% Tween-20 thrice.

Light-directed barcoding of cDNAs was then performed using a Nikon Ti2-E microscope with two distinct optical systems. Optical System 1 was a Mightex Polygon 1000 DMD connected to a 380 nm LED. Optical System 2 was a 405 nm laser connected to an optimicroscanner. All illumination was performed through a 20× air objective. For barcoding, samples were incubated with Barcoding Solution, consisting of a fluorophore (Cy5) labeled, UMI-containing, CNVK-containing barcode strand at 250 nM, 500 mM NaCl, and 10% dextran sulfate in 1×PBS, 0.1% Tween-20 for 30 minutes at room temperature. Barcoding Solution was then removed and samples were washed with 1×PBS, 0.1% Tween-20, 1M NaCl before barcoding.

A rectangular region of interest was drawn within the Nikon Elements Software to guide the illumination. For Optical System 1, illumination power was sampled between 1-10% and time was sampled between 1-20 seconds. Conditions were also tested where 5% power was used and 1 s, 5 s, 10 s, and 20 s were used for a single illumination round versus two illumination rounds. For Optical System 2, illumination power was tuned between 0.1%, 0.5%, %, 21%, 5%, 10% crossed with dwell time variables of 10 µs, 100 µs, and 1000 µs. Together, this provided extensive sampling of the parameter space for illumination conditions.

Figures 14A, 14B, 14C:
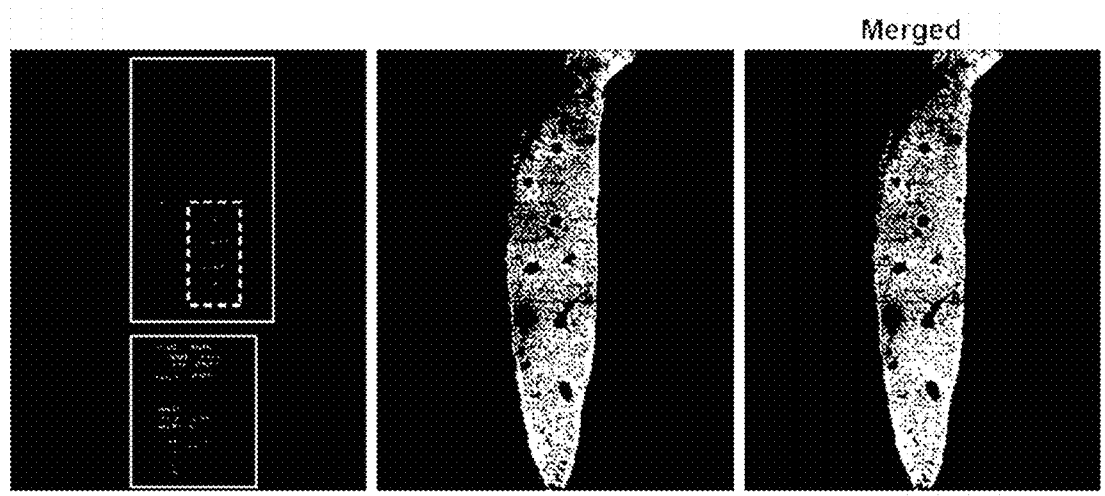
FIG. 14A is an image of mouse liver section with areas of light-directed barcoding following illumination with DMD using 380 nm LED (lower rectangle) or 405 nm laser (upper rectangle).
FIG. 14B is an image showing autofluorescence in the same liver section depicted in FIG. 14A.
FIG. 14C is an overlay of images from FIG. 14A and FIG. 14B.

After barcoding, samples were then washed with 60% formamide in 1×PBS, 0.1% Tween-20 8 times, followed by 2 washes in 1×PBS, 0.1% Tween-20 with NaCl. The barcode signal was then imaged after washing (FIG. 14A). Image capture of autofluorescence (FIG. 14B) of the same field was merged with barcode imaging (FIG. 14C), to show location and correlation of barcoding within the sample. Imaging shows fluorescently labeled barcode strands visible in the ROIs representing successful light-directed barcoding under both conditions.

FIG. 14A shows light-directed spatial barcoding with two optical modalities for UV light delivery: an optimicroscanner (Galvo) with a 405 nm laser light source (upper rectangle), and a DMD with a 380 nm LED light source (lower rectangle). Use of an optimicroscanner afforded higher precision of light delivery, enabling higher resolution. However, the time was much slower for the optimicroscanner because every individual pixel in the area of interest was illuminated sequentially. A 405 nm laser is more ubiquitous on most confocal systems, presenting an accessibility advantage. The DMD/380 nm LED set up is favorable because it permitted parallelized light delivery to arbitrary spatial patterns within the field of view (FOV). This provides for a shorter processing time of large regions of interest.

Figures 14D, 14E, 14F:
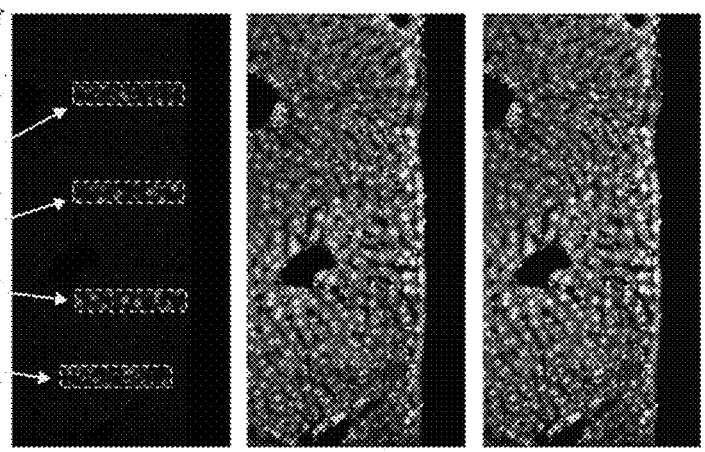
FIG. 14D is an enlargement of the dashed rectangle of FIG. 14A, showing intensity of barcoding of four areas exposed to different power levels of illumination from a 405 nm laser.
FIG. 14E is an image showing autofluorescence in the same liver section depicted in FIG. 14D.
FIG. 14F is an overlay of images from FIG. 14D and FIG. 14E.

FIG. 14D illustrates the relative intensity of 4 barcoded regions from the dashed rectangle region in FIG. 14A, labeled using the 405 nm laser with power and duration times as noted. Autofluoresence of the same area is shown in FIG. 14E. FIG. 14F illustrates the combined image of both barcoding and autofluorescence.

Example 10: Fractional Barcoding of Cellular Transcriptomes

The ability to tune the fraction of barcoded cDNA sequences within a cell or tissue region enables encoding of information. As described herein, fractional barcoding can be used to enable regional identification if the local fraction of barcoded transcripts can be read out. These data support that more than one spatial barcode can be deposited on the same cell/tissue region, and that tunable fractions of barcoded cDNA can be achieved in a deterministic manner.

Retina tissues were collected from mice and transferred into 4% PFA with 0.25% Triton X-100 in 1×PBS for 30 min at RT followed by three 5 min washes in PBS, transfer to 7% sucrose in 1×PBS for 10 min, then a final transfer to a 1:1 mixture of OCT+30% sucrose in 1×PBS. Samples were then cryopreserved at −80° C.

Frozen tissue blocks were then sectioned at 15 μm onto microscope coverslips and separated using well chambers for individually contained liquid exchanges. Then, tissue sections underwent the following processing steps for cDNA library generation. Tissue sections were washed thrice with 1×PBS 0.1% Tween-20, followed by incubation with reverse transcription mix (300 μM dNTPs, 0.5% Triton-X-100, 6 mM RNaseOUT, 1 μM RT primer, and 8 U/μl Maxima RT enzyme in RT buffer), and incubated for 30 min at 22° C., followed by 12 cycles of 8° C. for 30 sec, 15° C. for 30 sec, 25° C. for 30 sec, 30° C. for 1 min, 37° C. for 1 min, and 42° C. for 2 min, followed by 42° C. for 30 min.

Samples were washed with 1×PBS, 0.1% Tween-20 with 60% formamide thrice, followed by two washes with 1×PBS, 0.1% Tween-20, 1M NaCl, followed by 1×PBS, 0.1% Tween-20 twice. A-tailing of the cDNAs was then performed in situ using 1× A-ThermoPol Buffer, 1 mM dATP, and 1000 U/mL terminal transferase enzyme. Sections were incubated with this solution for 45 minutes at 37° C. before washing with 1×PBS, 0.1% Tween-20 thrice.

Light-directed barcoding of cDNAs was then performed using a Nikon Ti2-E microscope with a Mightex Polygon 1000 DMD connected to a 380 nm LED. The samples were incubated the first barcode in Barcoding Solution 1, consisting of a FITC-labeled, UMI-containing, CNVK-containing barcode strand at 250 nM, 500 mM NaCl, and 10% dextran sulfate in 1×PBS, 0.1% Tween-20 for 30 minutes at room temperature. Barcoding Solution 1 was then removed and samples were washed with 1×PBS, 0.1% Tween-20, 1 M NaCl.

Figure 15A:
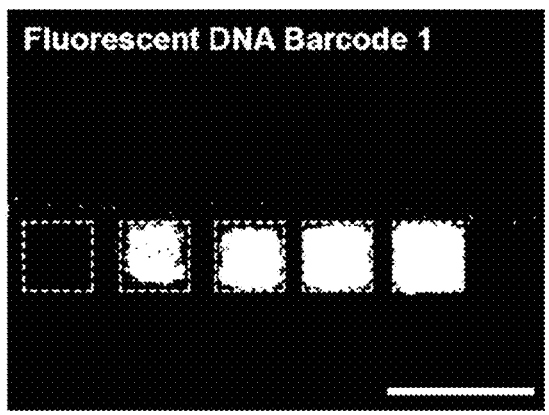
FIG. 15A is an image of mouse retina showing FITC labeled barcoding in 5 regions of interest (ROI) treated with increasing power levels of illumination in each ROI from left to right.
Figure 15B:
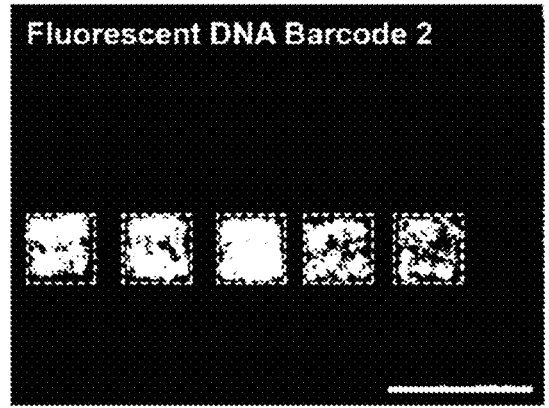
FIG. 15B is an image of the same retina section as FIG. 15A, showing Cy3 labeled barcoding in the same 5 ROI after treatment with a consistent power level of illumination across all ROI.
Figure 15C:
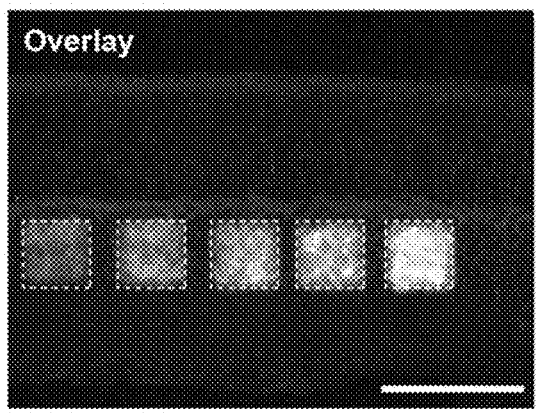
FIG. 15C is an overlay of images from FIG. 15A and FIG. 15B.

For the two-color barcoding shown in FIGS. 15A-FIG. 15C, square regions of interest for illumination were hand drawn within the Nikon Elements Software and the DMD was used to direct UV light selectively to the regions. The following illumination conditions were each used (n=3 replicates per condition) to deposit different amounts of Barcode 1 in distinct square regions, from left to right: 0% power/0 sec, 1% power/5 sec, 5% power/5 sec, 10% power/5 sec, 20% power/5 sec. Imaging of ROIs with Barcode 1 is shown in FIG. 15A, with increasing power in areas from left to right.

Barcode 2 was then incubated with the sections in a solution consisting of a fluorophore (Cy3) labeled, UMI-containing, CNVK-containing barcode strand at 250 nM, 500 mM NaCl, and 10% dextran sulfate in 1×PBS, 0.1% Tween-20 for 30 minutes at room temperature. Barcoding Solution was then removed and samples were washed with 1×PBS, 0.1% Tween-20, 1 M NaCl. Illumination was carried out for 10 seconds at 20% 380 nm LED power in all of the previously barcoded squares.

Samples were then washed with 60% formamide in 1×PBS, 0.1% Tween-20 8 times, followed by 2 washes in 1×PBS, 0.1% Tween-20 with NaCl. The barcode signal was then imaged after washing, as shown in FIG. 15B. Imaging shows the fluorescently labeled barcode strand visible in the ROIs represents successful light-directed barcoding. FIG. 15C shows an overlay of the two imaged ROIs.

Figure 15D:
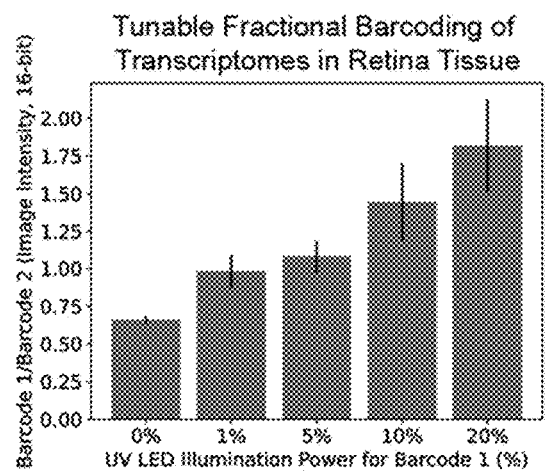
FIG. 15D is a bar plot of the ratio of image intensity of the ROI depicted in FIG. 15A and FIG. 15B.

Light-directed barcoding was quantified through analysis of the image data, by calculating the average intensity of the fluorescence within the barcoded region of interest in the channel corresponding to the barcode. Since the DNA barcodes were conjugated to distinct fluorophores (FITC and Cy3), the fluorescence in each channel could be quantified to evaluate deposition of the respective barcode. FIG. 15D depicts a bar graph showing the ratio of the average image intensity values of the FITC/Cy3 channels in each condition after barcoding.

Example 11: Small Molecule Stains Guide Spatial Barcoding

Barcoding of specific cells, subcellular features, and tissue regions can enable highly selective transcriptome sequencing. Our light-directed barcoding is capable of high-resolution barcode deposition, and can be guided based on small molecule stains. Here, we demonstrate pre-staining of a tissue section with a small molecule stain that stains cellular nuclei by intercalating into double-stranded DNA with high affinity (Deep Red Anthraquinone 5 (DRAQ5™), to guide photomasking for light-directed transcriptome barcoding to individual cells. The result demonstrates that barcoding can be guided by pre-stains and can be restricted to the regions of interest that are guided by the stain.

Mouse brains were dissected into 10% Neutral Buffered Formalin for fixation overnight at room temperature, followed by transfer into PBS and cryopreservation at −80° C. Frozen tissue blocks were then sectioned at 15 μm onto microscope coverslips and separated using well chambers for individually contained liquid exchanges. Slides were baked at 60° C. for 1 hour. Sections were then washed with 1×PBS, 0.1% Tween-20 thrice and incubated with antigen retrieval buffer (Tris-EDTA, pH 8) for 30 minutes at 70° C. Samples were then returned to 1× PBS, 0.1% Tween before proceeding to reverse transcription steps below.

Tissue sections underwent steps for cDNA library generation. Tissue sections were washed thrice with 1×PBS 0.1% with Tween-20, followed by incubation with reverse transcription mix (300 μM dNTPs, 0.5% Triton-X-100, 6 mM RNaseOUT, 1 μM RT primer, and 8 U/μl Maxima RT enzyme in RT buffer, and incubated for 30 min at 22° C., followed by 12 cycles of 8° C. for 30 sec, 15° C. for 30 sec, 25° C. for 30 sec, 30° C. for 1 min, 37° C. for 1 min, and 42° C. for 2 min, followed by 42° C. for 30 min.

Samples were washed with 1×PBS, 0.1% with 60% formamide Tween-20 thrice, followed by two washes with 1×PBS, 0.1% Tween-20, 1M NaCl, followed by 1×PBS, 0.1% Tween-20 twice. A-tailing of the cDNAs was then performed in situ using 1× ThermoPol Buffer, 1 mM dATP, and 1000 U/mL terminal transferase enzyme. Sections were incubated with this solution for 45 minutes at 37° C. before washing with 1×PBS, 0.1% Tween-20 thrice.

Light-directed barcoding of cDNAs was performed using a Nikon Ti2-E microscope with a Mightex Polygon 1000 DMD connected to a 380 nm LED and a 40× water immersion objective. The samples were incubated with Barcoding Solution 1, consisting of a fluorophore (FITC) labeled, UMI-containing, CNVK-containing barcode strand at 250 nM, 500 mM NaCl, and 10% dextran sulfate in 1×PBS, 0.1% Tween-20 for 30 minutes at room temperature. Barcoding Solution was then removed and samples were washed with 1×PBS, 0.1% Tween-20, 1M NaCl. The DRAQ5 nuclear stain was included in this wash solution, which remained on the sample during light-directed barcoding to label cellular nuclei. Imaging of the nuclear-stained cells is shown in FIG. 16A.

Figure 16A:
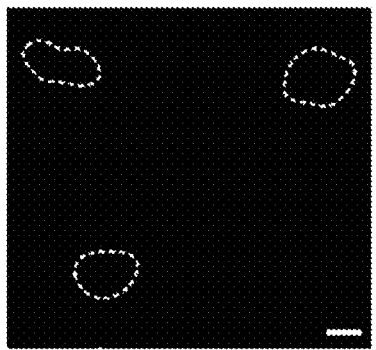
FIG. 16A is an image of a mouse brain section stained with DRAQ5 used for generating a photomask, dashed lines show areas drawn to generate a photomask.

Photomasks were generated based on the nuclear stain to outline three specific cells, shown as dashed lines in FIG. 16A. Illumination was carried out for 10 seconds at 10% 380 nm LED power. Samples were then washed with 60% formamide in 1×PBS, 0.1% Tween-20 8 times, followed by 2 washes in 1×PBS, 0.1% Tween-20 with NaCl.

Figure 16B:
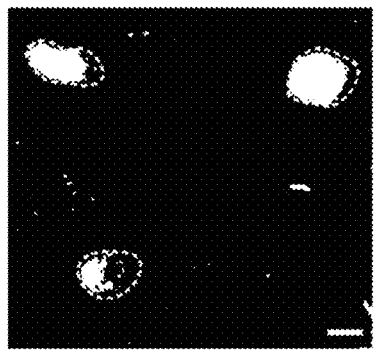
FIG. 16B is an image of the same mouse brain section from FIG. 16A, showing bound fluorescently barcoded areas after light-directed barcoding using the photomask generated from the image in FIG. 16A.
Figure 16C:
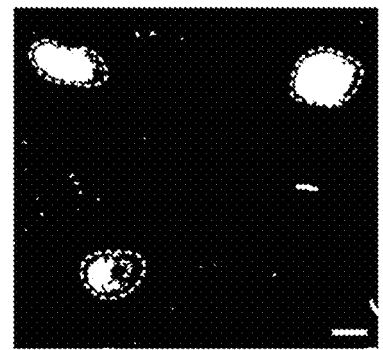
FIG. 16C is an overlay of images from FIG. 16A and FIG. 16B, showing barcoded regions relative to the nuclear-stained features on the sample.

The barcode signal was then imaged after washing, as shown in FIG. 16B. Appearance of fluorescently labeled barcode strands in the ROIs represents successful light-directed barcoding. FIG. 16C is a representative overlay of the small-molecule nuclear stain and the fluorescent DNA barcode images.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of biological cell spatial information generation, the method comprising:
   depositing DNA barcodes onto a population of cells, wherein the DNA barcodes hybridize to a target region, and wherein the DNA barcodes comprise a photo-reactive nucleobase capable of crosslinking to another nucleobase, wherein the population of cells is present on a synthetic substrate;
   selectively radiating the population of cells at a region of interest (ROI) to form covalently linked DNA barcode-target complexes, wherein the radiating is selectively varied by intensity or duration;
   washing the population of cells to remove the DNA barcodes that are not complexed to the target region; and
   repeating the depositing, selectively radiating, and washing steps, wherein the DNA barcodes in a first of the depositing steps comprise a different sequence than the DNA barcodes in a second of the depositing steps.

2. The method of claim 1, further comprising determining biological cell spatial information based at least in part on the target region and the DNA barcodes.

3. The method of claim 2, further comprising synthesizing a continuous DNA strand complementary to the covalently linked barcodes.

4. The method of claim 3, wherein the synthesizing comprises a cross junction synthesis.

5. The method of claim 4, further comprising displacing the continuous DNA strand from the population of cells.

6. The method of claim 5, wherein the displaced continuous DNA strands are further pooled, amplified, sequenced, or any combination thereof.

7. The method of claim 6, further comprising identifying targets associated with the continuous DNA strands.

8. The method of claim 7, further comprising mapping the targets to the different locations.

9. The method of claim 1, wherein the step comprising washing the population of cells is omitted.

10. The method of claim 1, wherein the photo-reactive nucleobase is 3-cyanovinylcarbazole phosphoramidite (CNVK).

11. The method of claim 1, wherein the synthetic substrate comprises a hydrogel.

12. The method of claim 1, wherein the synthetic substrate comprises an extracellular matrix protein.

13. The method of claim 1, wherein the synthetic substrate comprises collagen or fibronectin.

14. The method claim 1, wherein the second selectively radiating step is applied at a same or different duration or intensity than the first selectively radiating step.

15. The method of claim 14, wherein the first selectively radiating step, the second selectively radiating step, or both are applied as an intensity gradient across the at least one ROI.

16. The method of claim 15, wherein the second intensity gradient is applied parallel, orthogonal, perpendicular, or at another angle relative to the first intensity gradient.

17. The method of claim 1, wherein the selective radiating is performed in two dimensions or in three dimensions.

18. The method of claim 1, wherein the selectively radiating is performed using a photomask.

19. The method of claim 18, wherein the photomask is varied in the different selectively radiating steps.

20. The method of claim 18, wherein the photomask is generated manually or mechanically.

21. The method of claim 1, wherein the selectively radiating step comprises administering radiation at a wavelength of about 300 nm up to 450 nm.

22. The method of claim 1, wherein the depositing is performed manually, automatically, robotically, or any combination thereof.

23. The method of claim 1, wherein the repeating is completed at least 1, at least 2, at least 3, at least 4, at least 5, at least 6, at least 7, at least 8, at least 9, at least 10, at least 15, at least 20, at least 25, at least 30, at least 35, at least 40, at least 45, at least 50, or more times.

24. The method of claim 1, wherein at least 2, 3, 4, 5, 6, 7, 8, or 9 different DNA barcode strands are deposited.

25. The method of claim 1, further comprising contacting the population of cells with a cell permeabilization agent.

26. The method of claim 1, wherein the population of cells comprises one or more of:
   cultured cells;
   a tissue obtained from a subject;
   an engineered tissue; or
   an organoid.

27. The method of claim 1, further comprising imaging the population of cells before depositing the DNA barcodes, after the washing step, or any combination thereof.

28. The method of claim 1, wherein the washing comprises depositing a solution comprising a chemical denaturant and a detergent.

29. The method of claim 1, wherein the DNA barcodes further comprise a detectable label.

* * * * *

SEQUENCE LISTING

```
Sequence total quantity: 3
SEQ ID NO: 1              moltype = DNA  length = 18
FEATURE                   Location/Qualifiers
source                    1..18
                          mol_type = other DNA
                          organism = synthetic construct
SEQUENCE: 1
taatacgact cactatag                                                 18

SEQ ID NO: 2              moltype = DNA  length = 18
FEATURE                   Location/Qualifiers
source                    1..18
                          mol_type = other DNA
                          organism = synthetic construct
SEQUENCE: 2
aattaaccct cactaaag                                                 18

SEQ ID NO: 3              moltype = DNA  length = 18
FEATURE                   Location/Qualifiers
source                    1..18
                          mol_type = other DNA
                          organism = synthetic construct
SEQUENCE: 3
atttaggtga cactatag                                                 18
```